(12) United States Patent
Mizusawa

(10) Patent No.: US 10,383,125 B2
(45) Date of Patent: Aug. 13, 2019

(54) TERMINAL DEVICE AND WIRELESS COMMUNICATION DEVICE

(71) Applicant: SONY CORPORATION, Tokyo (JP)

(72) Inventor: Nishiki Mizusawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/743,314

(22) PCT Filed: Aug. 4, 2016

(86) PCT No.: PCT/JP2016/072915
§ 371 (c)(1),
(2) Date: Jan. 10, 2018

(87) PCT Pub. No.: WO2017/038368
PCT Pub. Date: Mar. 9, 2017

(65) Prior Publication Data
US 2018/0220406 A1    Aug. 2, 2018

(30) Foreign Application Priority Data

Sep. 3, 2015   (JP) .................................. 2015-173664

(51) Int. Cl.
*H04B 7/02*       (2018.01)
*H04W 72/04*      (2009.01)
(Continued)

(52) U.S. Cl.
CPC ............ *H04W 72/046* (2013.01); *H04B 7/04* (2013.01); *H04B 7/0413* (2013.01);
(Continued)

(58) Field of Classification Search
CPC ... H04W 72/046; H04W 16/28; H04W 24/10; H04L 5/0048; H04B 7/0413; H04B 17/309; H04B 17/24; H04B 7/10; H04B 7/04
(Continued)

(56) References Cited

U.S. PATENT DOCUMENTS

2012/0213113 A1   8/2012   Zhao et al.
2014/0016497 A1   1/2014   Seo et al.
(Continued)

FOREIGN PATENT DOCUMENTS

| JP | 2013-511169 A | 3/2013 |
| JP | 2013-123141 A | 8/2013 |
| JP | 2014-513483 A | 5/2014 |
| JP | 2015-109692 A | 6/2015 |

OTHER PUBLICATIONS

International Search Report dated Oct. 25, 2016, in PCT/JP2016/072915, filed Aug. 4, 2016.
(Continued)

*Primary Examiner* — Dhaval V Patel
(74) *Attorney, Agent, or Firm* — Xsensus LLP

(57) ABSTRACT

To provide a terminal device which can make communication processing efficient by a reference signal being beamformed in FD-MIMO. Provided is a terminal device including a control unit configured to select part of antenna ports among antenna ports of a reference signal beamformed with a plurality of beams from a wireless communication device and generate a channel state report which reports states of channels at the selected antenna ports to the wireless communication device.

20 Claims, 28 Drawing Sheets

(51) Int. Cl.
    *H04B 7/04* (2017.01)
    *H04B 7/10* (2017.01)
    *H04W 16/28* (2009.01)
    *H04W 24/10* (2009.01)
    *H04B 17/309* (2015.01)
    *H04B 7/0413* (2017.01)
    *H04B 7/06* (2006.01)
    *H04L 5/00* (2006.01)
    *H04B 17/24* (2015.01)
    *H04B 17/318* (2015.01)

(52) U.S. Cl.
    CPC ......... *H04B 7/0621* (2013.01); *H04B 7/0695* (2013.01); *H04B 7/10* (2013.01); *H04B 17/309* (2015.01); *H04L 5/0091* (2013.01); *H04W 16/28* (2013.01); *H04W 24/10* (2013.01); *H04B 17/24* (2015.01); *H04B 17/318* (2015.01); *H04L 5/0023* (2013.01); *H04L 5/0048* (2013.01)

(58) Field of Classification Search
    USPC ........................................................ 375/267
    See application file for complete search history.

(56) References Cited

U.S. PATENT DOCUMENTS

| | | | |
|---|---|---|---|
| 2015/0029875 A1* | 1/2015 | Zhu | H04W 4/70 370/252 |
| 2016/0190707 A1* | 6/2016 | Park | H01Q 1/246 370/334 |
| 2016/0212643 A1* | 7/2016 | Park | H04B 7/0626 |
| 2017/0164226 A1* | 6/2017 | Wei | H04L 5/0023 |
| 2017/0264405 A1* | 9/2017 | Gao | H04B 7/04 |

OTHER PUBLICATIONS

LG Electronics, "Enhancements on beamformed CSI-RS based CSI reporting", R1-154279, 3GPP TSG RAN WG1 Meeting #82, Aug. 24-28, 2015, 12 pages.

LG Electronics, "Beamformed CSI-RS related enhancements based on the identified approaches", R1-154274, 3GPP TSG RAN WG1 Meeting #82, Aug. 24-28, 2015, 15 pages.

Sony, "Beamformed CSI-RS Implementation for FD-MIMO", R1-154218. 3GPP TSG RAN WG1 #82, Aug. 24-28, 2015, 11 pages.

* cited by examiner

FIG. 19

| CSI reference signal configuration | Number CSI reference signals configured | | | | | | |
|---|---|---|---|---|---|---|---|
| | 1 or 2 | | 4 | | 8 | | 16 |
| | (k',l') | $n_s$ mod 2 | (k',l') | $n_s$ mod 2 | (k',l') | $n_s$ mod 2 | (k',l') | $n_s$ mod 2 |
| 0 | (9,5) | 0 | (9,5) | 0 | (9,5) | 0 | | |
| 1 | (11,2) | 1 | (11,2) | 1 | (11,2) | 1 | (11,2) | 1 |
| 2 | (9,2) | 1 | (9,2) | 1 | (9,2) | 1 | (9,2) | 1 |
| 3 | (7,2) | 1 | (7,2) | 1 | (7,2) | 1 | | |
| 4 | (9,5) | 1 | (9,5) | 1 | (9,5) | 1 | | |
| 5 | (8,5) | 0 | (8,5) | 0 | | | | |
| 6 | (10,2) | 1 | (10,2) | 1 | | | | |
| 7 | (8,2) | 1 | (8,2) | 1 | | | | |
| 8 | (6,2) | 1 | (6,2) | 1 | | | | |
| 9 | (8,5) | 1 | (8,5) | 1 | | | | |
| 10 | (3,5) | 0 | | | | | | |
| 11 | (2,5) | 0 | | | | | | |
| 12 | (5,2) | 1 | | | | | | |
| 13 | (4,2) | 1 | | | | | | |
| 14 | (3,2) | 1 | | | | | | |
| 15 | (2,2) | 1 | | | | | | |
| 16 | (1,2) | 1 | | | | | | |
| 17 | (0,2) | 1 | | | | | | |
| 18 | (3,5) | 1 | | | | | | |
| 19 | (2,5) | 1 | | | | | | |
| Frame structure 1 and 2 | | | | | | | | |

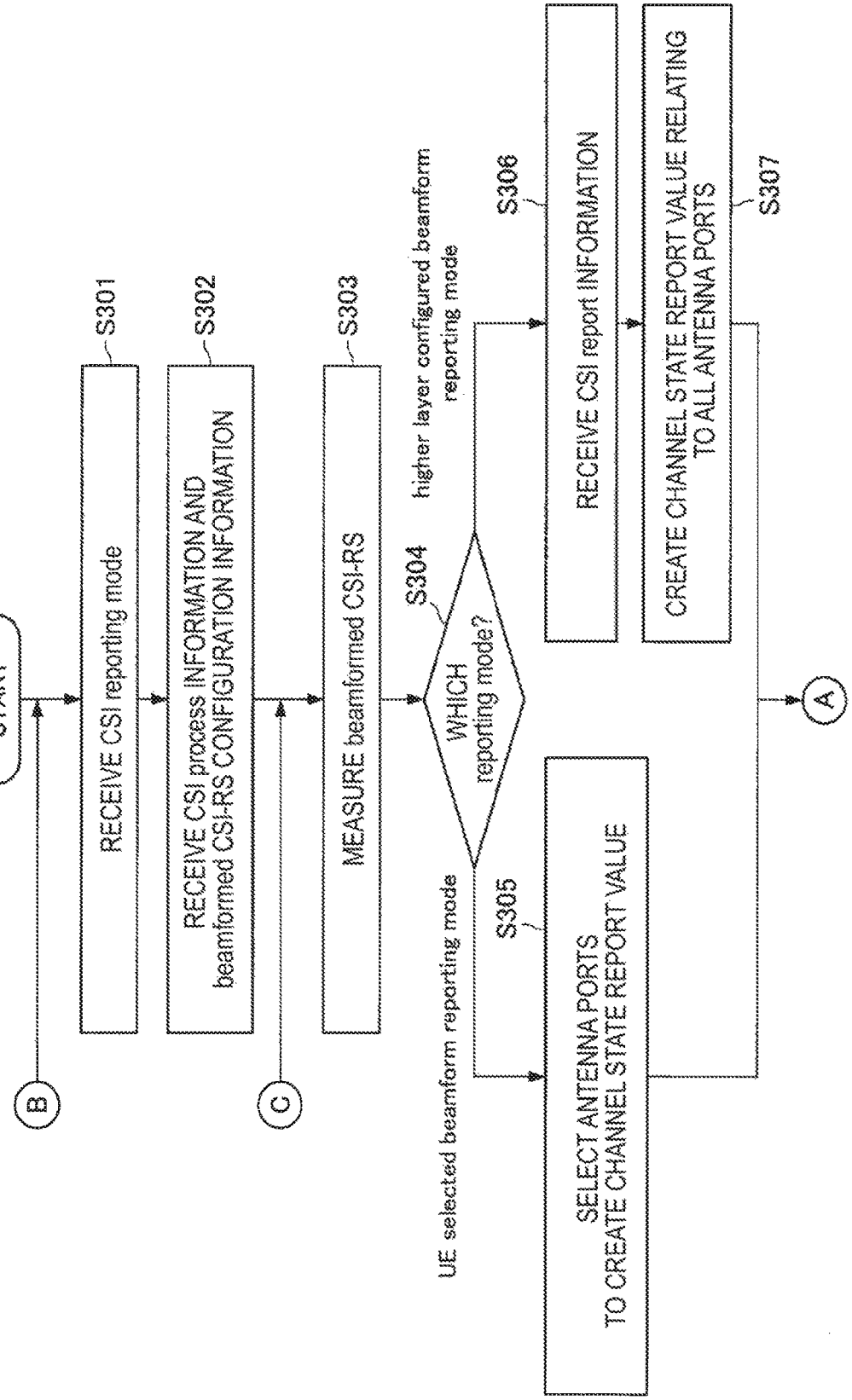

TERMINAL DEVICE AND WIRELESS COMMUNICATION DEVICE

TECHNICAL FIELD

The present disclosure relates to a terminal device and a wireless communication device.

BACKGROUND ART

The improvement of wireless access performance is urgently needed due to a recent sharp increase in data traffic. It is considered to overlay and dispose macro cells, which use relatively low frequencies in the ultra-high frequency (UHF) band, and small cells, which use relatively high frequencies, in order to build a high-speed and large-capacity wireless access network. Full-dimension (FD) multi-input multi-output (MIMO), which compensates for high propagation losses, is considered for small cells, which use high frequency bands. FD-MIMO is a technique of two-dimensionally disposing base station antennas in the horizontal and vertical directions for MIMO communication (For example, see Patent Literature 1).

CITATION LIST

Patent Literature

Patent Literature 1: JP 2015-109692A

DISCLOSURE OF INVENTION

Technical Problem

In FD-MIMO in which a sharp beam is formed to transmit a signal using an array antenna configured with a number of antenna elements, employment of a configuration of a sub array scheme and a beamformed reference signal, or the like, is studied in view of overhead upon transmission of a number of reference signals, increase in processing at a base station and a terminal, increase in cost of the base station, or the like.

Therefore, the present disclosure proposes new and improved terminal device and wireless communication device which can make communication processing efficient by a reference signal being beamformed in FD-MIMO.

Solution to Problem

According to the present disclosure, there is provided a terminal device including: a control unit configured to select part of antenna ports among antenna ports of a reference signal beamformed with a plurality of beams from a wireless communication device and generate a channel state report which reports states of channels at the selected antenna ports to the wireless communication device.

According to the present disclosure, there is provided a wireless communication device including: a control unit configured to acquire from a terminal device a channel slate report reporting states of channels at part of antenna ports among all antenna ports of a reference signal beamformed With a plurality of beams and cause downlink data to the terminal device to be beamformed using antenna ports selected by the terminal device.

According to the present disclosure, there is provided a terminal device including: a control unit configured to perform measurement including measurement of reception power or reception quality of a reference signal relating to reference signal configuration information transmitted from a wireless communication device which beam forms a reference signal with a plurality of beams, and transmit a measurement result to the wireless communication device in a case where a predetermined condition for a trigger event is satisfied.

According to the present disclosure, there is provided a wireless communication device including: a control unit configured to notify a terminal device in a connected state of configuration information of a reference signal beamformed by the wireless communication device with a plurality of beams and configuration information of a reference signal to be beamformed by an adjacent cell with a plurality of beams.

Advantageous Effects of Invention

As described above, according to the present disclosure, it is possible to provide new and improved terminal device and wireless communication device which can make communication processing efficient by a reference signal being beamformed in FD-MIMO.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 19 is an explanatory diagram illustrating an example of CSI Reference Signal Configuration 1 in which a case of 16 antenna ports is added.

FIG. 22A is a flowchart illustrating an operation example of the terminal device 100 according to the present embodiment.

MODE(S) FOR CARRYING OUT THE INVENTION

Figure 1:
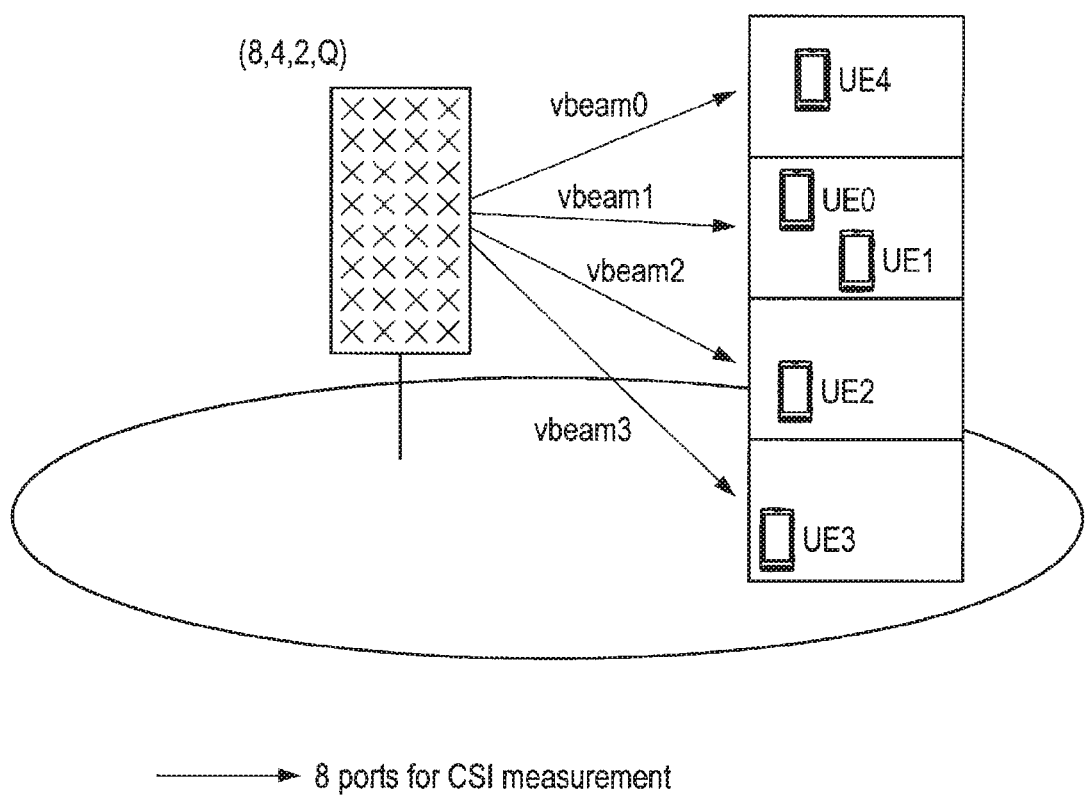
FIG. 1 is an explanatory diagram illustrating a usage example of FD-MIMO.

Hereinafter, (a) preferred embodiments) of the present disclosure will be described in detail with reference to the appended drawings. Note that, in this specification and the appended drawings, constituent elements that have substantially the same function and structure are denoted with the same reference numerals, and repeated explanation of these constituent elements is omitted.

Note that description will be provided in the following order.
1. Embodiment of present disclosure
1.1. Background
1.2. Configuration Examples
1.2.1. Configuration example of communication system
1.2.2. Configuration example of terminal device
1.2.3. Configuration example of base station
1.2.4. Configuration example of control entity
1.3. Operation examples
2. Application examples
3. Conclusion <1. Embodiment Of Present Disclosures>
[1.1. Background]

First, a background of an embodiment of the present disclosure will be described before the embodiment of the present disclosure is described in detail.

Recent wireless communication environments have been confronted with a sharp increase in data traffic. The improvement of wireless access performance is then urgently needed due to a sharp increase in data traffic. It is considered to overlay and dispose macro cells, which use relatively low frequencies in the ultra-high frequency (UHF) band, and small cells, which use relatively high frequencies, in order to build a high-speed and large-capacity wireless access network. Full-dimension (FD) multi-input multi-output (MIMO), which compensates for high propagation losses, is considered for small cells, which use high frequency bands. FD-MIMO is a technique of two-dimensionally disposing base station antennas in the horizontal and vertical directions for MIMO communication.

FD-MIMO enables a sharp beam to be directed to upper floors of a building by an array antenna in which a number of antenna elements are two-dimensionally disposed, and a use case is also studied which improves coverage of the building by the use of a beam sectored for each tilt angle, or the like. FIG. 1 is an explanatory diagram illustrating a usage example of FD-MIMO. In FIG. 1, an example of a use case is illustrated which improves coverage of a building by emitting beams in four directions toward the building and improving reception efficiency of terminals (user equipment; UE) located within the building.

In FD-MIMO in which a sharp beam is formed to transmit a signal using an array antenna configured with a number of antenna elements, employment of a configuration of FD-MIMO in a sub array scheme and a beamformed reference signal, or the like, is studied in order to address overhead upon transmission of a number of reference signals, increase in processing at a base station and a terminal, increase in cost of a wireless device at the base station, or the like.

FD-MIMO includes quite a large number of antenna elements in an antenna array. It is then considered to simplify a baseband (BB) circuit and decrease the cost of a wireless device by installing a fixed analog phase shifter between a transceiver unit (TXRU) that supplies signals to antenna elements and each antenna element (see 3GPP TR36.897 v0.1.1). Further, installing a fixed analog phase shifter between a transceiver unit (TXRU) that supplies signals to antenna elements and each antenna element limits the size of a weighting matrix for adjusting a sharp beam for each user while maintaining the sharp beam, and requires lighter processing than adjusting the weighting factors of all the antenna elements.

Figure 2:
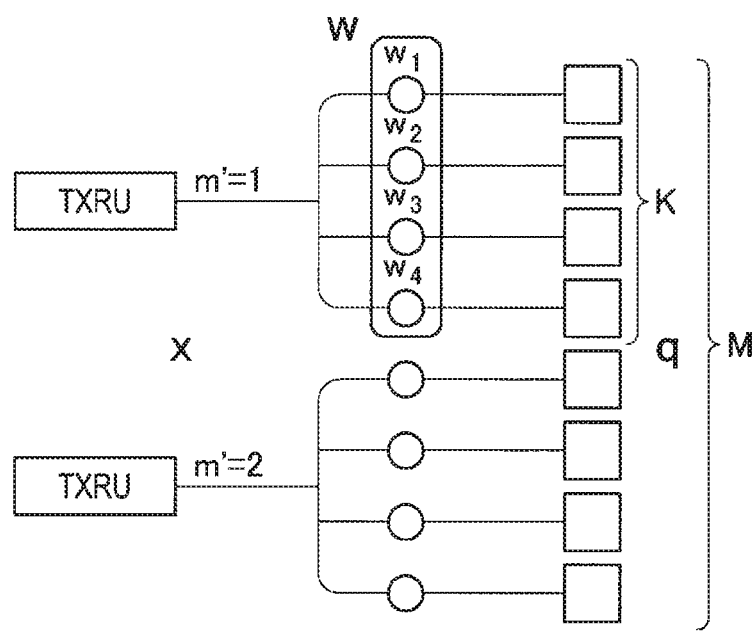
FIG. 2 is an explanatory diagram illustrating a connection example of TXRUs.

FIG. 2 is an explanatory diagram illustrating a connection example of the TXRUs. For example, in an antenna array configured with M×N antenna elements, to the case where M antenna elements in a vertical direction are divided into sub arrays and connected to the TXRUs, if the number of TXRUs in the vertical direction is $M_{TXRU}$, the total number of TXRUs becomes $M_{TXRU} \times N$. If a tilt angle of a beam emitted from the TXRU is $\theta_{etilt}$, w between the TXRU and the antenna element can be expressed with the following equation 1.

[Math. 1]

$$w_k = \frac{1}{\sqrt{K}} \exp\left(-j\frac{2\pi}{\lambda}(k-1)d_v\cos\theta_{etilt}\right) \quad \text{(equation 1)}$$

for $k = 1, \ldots, K$

Figure 3:
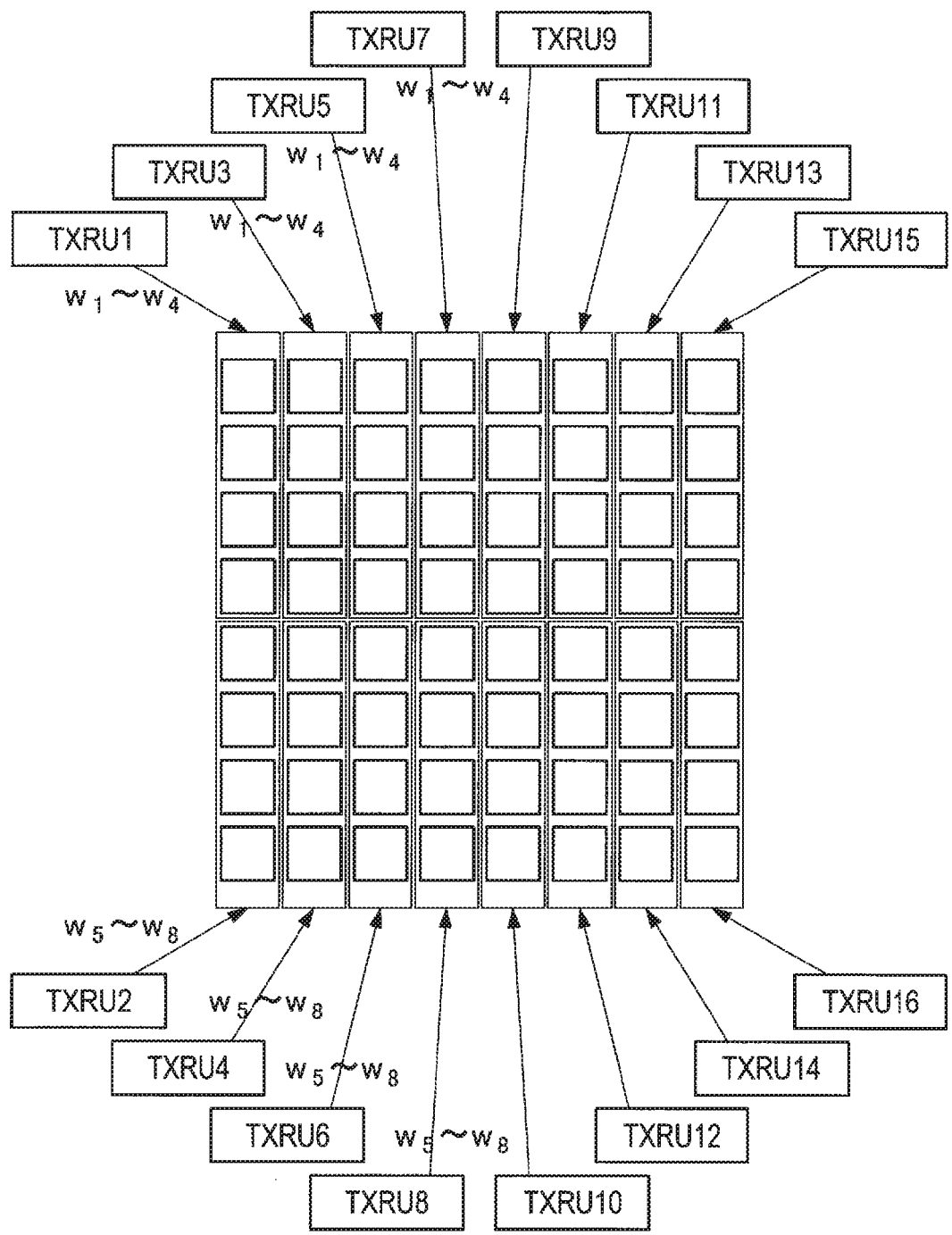
FIG. 3 is an explanatory diagram illustrating a configuration example of mi antenna array configured with 64 elements and an antenna array configured with 16 TXRUs.

FIG. 3 is an explanatory diagram illustrating a configuration example of an antenna array configured with 64 elements and an antenna array configured with 16 TXRUs. The 16 TXRUs are connected to 16 sub arrays one to one via cell specific weighting matrices. Two sub arrays and TXRUs are disposed in the vertical direction. Weighting factors $W_1$ to $W_4$ and $W_5$ to $W_8$ used by two TXRUs in the vertical direction are different, and beams are generated in different directions. Eight sub arrays and TXRUs are disposed in the horizontal direction (column direction). These eight TXRUs in the horizontal direction use the same weighting matrix, and generate beams in the same direction.

Figure 4:
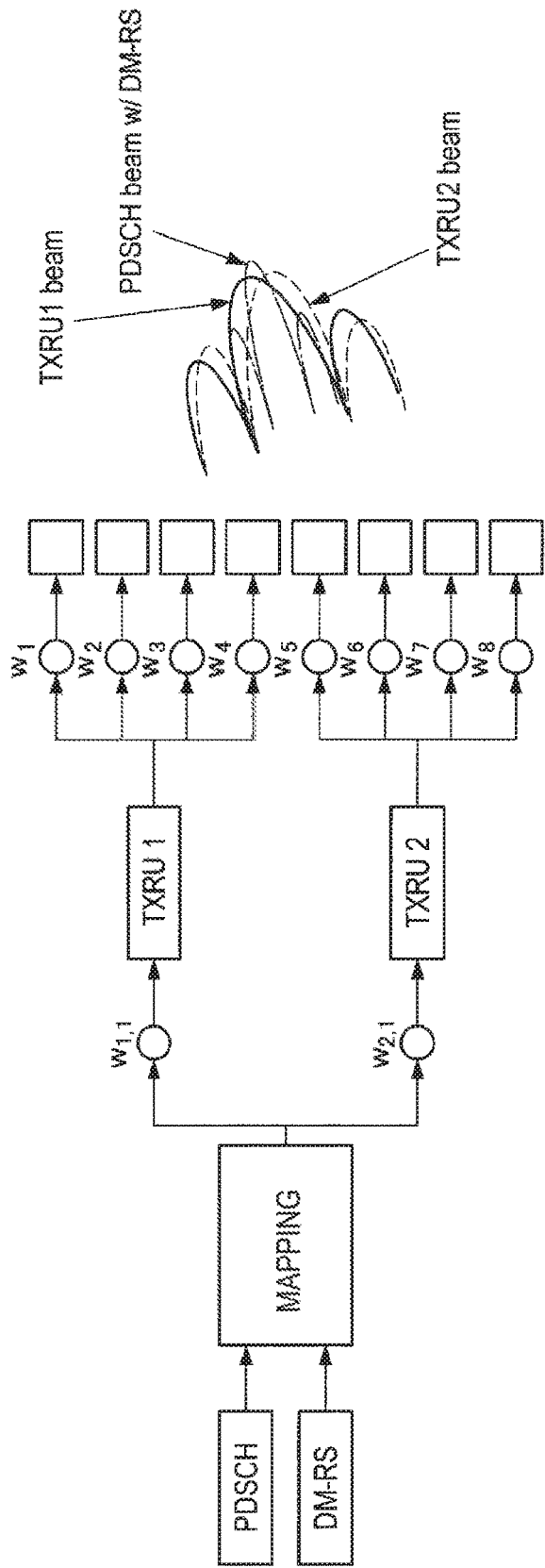
FIG. 4 is an explanatory diagram illustrating an example where a sharp PDSCH beam is generated using cell specific weighting matrices and a terminal specific weighting matrix.

FIG. 4 is an explanatory diagram illustrating an example where sharp physical downlink shared channel (PDSCH) beams are generated by cell specific weighing matrices and a terminal specific weighting matrix. The base station 200 maps PDSCHs and DM-RSs (demodulation reference signals) to resource elements, provide terminal specific weighting factors $W_{1,1}$, $W_{2,1}$, $W_{2,2}$, $W_{1,3}$, $W_{2,3}$, $W_{1,4}$, $W_{2,4}$, $W_{1,5}$, $W_{2,5}$, $W_{1,6}$, $W_{2,6}$, $W_{1,7}$, $W_{2,7}$, $W_{1,8}$, and $W_{2,8}$, and respectively emit beams from 16 sub arrays via TXRU 1 to TXRU 16.

Figure 5:
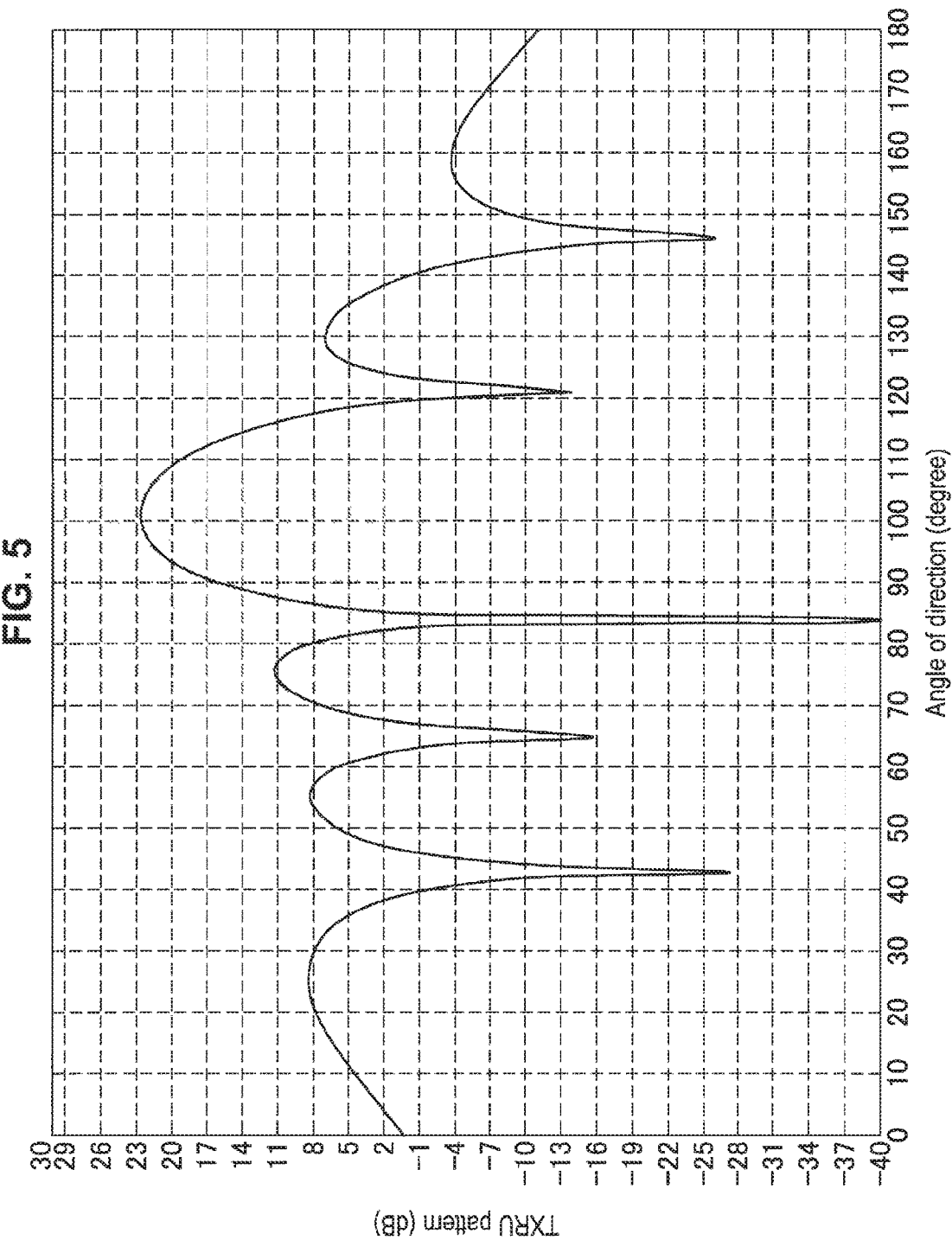
FIG. 5 is an explanatory diagram illustrating an example of a beam pattern emitted from TXRUs.
Figure 6:
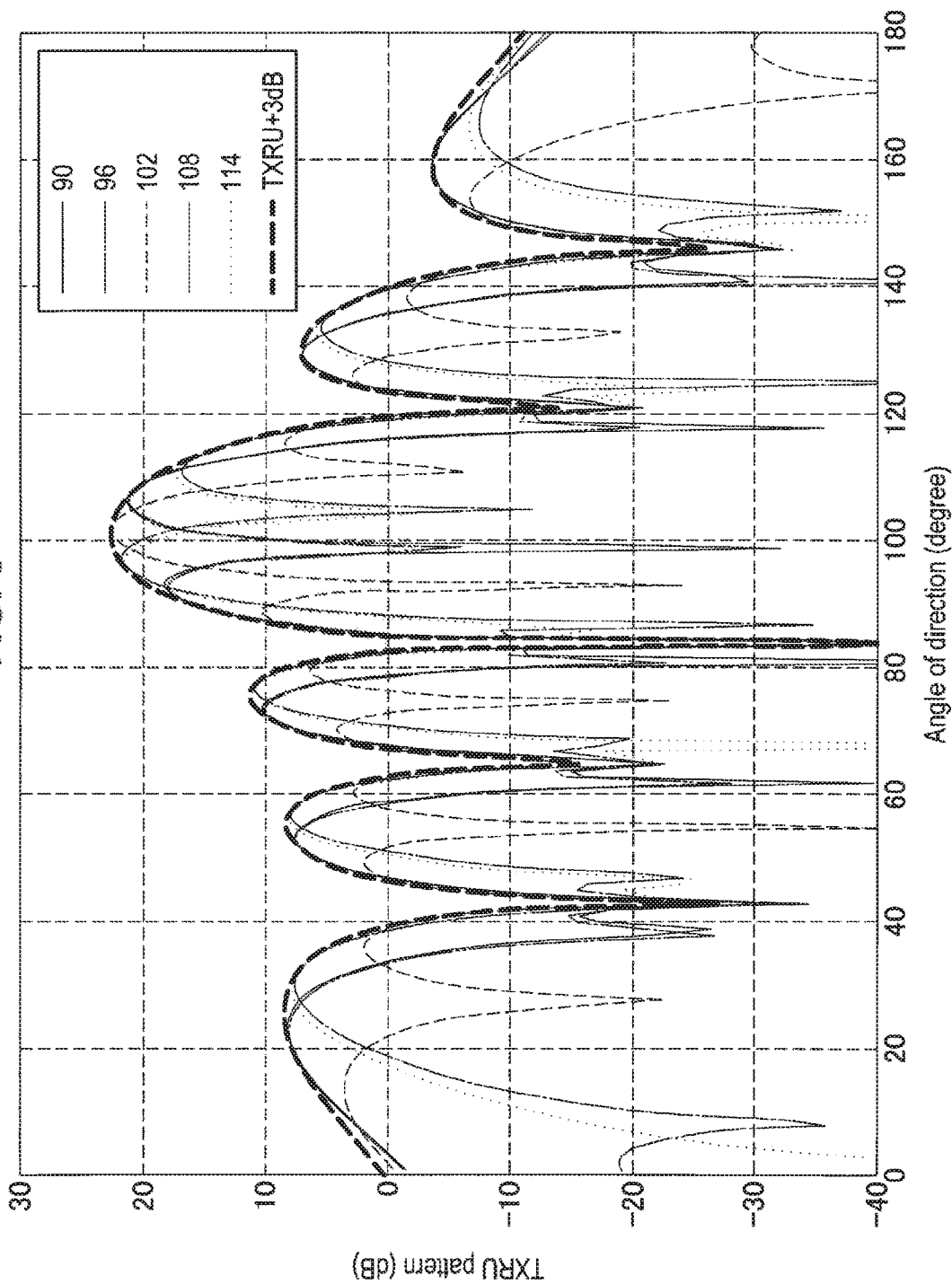
FIG. 6 is an explanatory diagram illustrating an example of a PDSCH beam.

FIG. 5 is an explanatory diagram illustrating an example of a beam pattern emitted from TXRUs in the case where $M_{TXRU}=2$ in an antenna array configured with 64 elements of M=8 and N=8. FIG. 6 is an explanatory diagram illustrating an example of a beam of a PDSCH. If a pre-weight for inserting an appropriate weight into each TXRU is disposed, the beam of the PDSCH becomes sharp as illustrated in FIG. 6. For example, the base station can estimate an angle of a terminal from a sounding reference signal (SRS) transmitted from the terminal and can adjust a pre-weight to be disposed in the preceding stage of the TXRU so that the beam of the PDSCH faces an optimum direction.
(Reference Signal for Channel Estimation in Related Art)

A channel state information reference signal (CSI-RS) is a reference signal for estimating a channel in downlink, such as for determination of a modulation scheme and determination of an antenna weighting factor of MIMO and beamforming. The terminal receives a CSI-RS from the base station and reports the channel estimation result to the base station as a channel state report in accordance with reception of the CSI-RS. Antenna ports 15 to 22 are used in accordance with the number of reference signals (1,2,4, 8) which form the CSI-RS.

The terminal is notified of antenna ports to which the CSI-RS is to be transmitted, a position of a resource element into which the CSI-RS is to be inserted, information relating to a subframe into which the CSI-RS is to be inserted, or the like, using a CSI Reference Signal Configuration (CSI-RS configuration information) notified through RRC signaling.

The CSI reference signal configuration includes an Antenna Port Count, a CSI reference Signal Configuration, a Subframe configuration, or the like.

The Antenna Port Count indicates the number of antenna ports (1, 2, 4 or 8) forming the CSI-RS.

The CSI reference Signal configuration is indicated with a value from 0 to 31, and a resource element (k, l) and a time slot to be used by the CSI-RS are determined from a look-up table defined in 3GPP TS36.211 table 6.10.5.2-1, or the like. In a case of 8 antenna ports, resource elements of antenna ports 15 and 16 are defined in the look-up table, and frequency offset values of resource elements to be used by other antenna ports are as indicated in Table 1.

TABLE 1

(Frequency offset values of resource elements)

| Antenna Ports | Normal Cyclic Prefix | Extended Cyclic Prefix |
|---|---|---|
| 15, 16 | 0 | 0 |
| 17, 18 | −6 | −3 |
| 19, 20 | −1 | −6 |
| 21, 22 | −7 | −9 |

The Subframe configuration is indicated with a value from 0 to 154, and CSI-RS periodicity and a CSI-RS subframe offset are provided from a look-up table defined in 3GPP TS36.211 table 6.10.5.3-1. In a resource 12, up to three CSI Reference Signal configurations can be allocated to the terminal.

However, the terminal needs to make a channel state report for each CSI reference signal configuration notified from the base station. There is no mechanism for making a channel state report for part of antenna ports of one CSI Reference Signal Configuration or transmitting a channel state report collectively for antenna ports of a plurality of CSI Reference Signal Configurations.

As described above, a resource position of each CSI-RS is determined by the number of antenna ports, a CSI Reference Signal Configuration value, and a Subframe configuration value. For example, in the case where the CSI-RS is transmitted using eight antenna ports with normal CP, and with CSI Reference Signal Configuration 0, resource element positions to be used by the antenna ports 15 to 22 are respectively, (9, 5), (9, 5), (3, 5), (3, 5), (8, 5), (8, 5), (2, 5) and (2, 5).

The base station only has to notify the terminal of the CSI Reference Signal Configuration 0 to cause the terminal to make a channel state report relating to these eight antenna ports. However, although the base station notifies the terminal of part of these antenna ports, for example, the antenna ports 15, 17, 19 and 21, among these antenna ports to cause the terminal to make a channel state report relating to the four antenna ports, there has been no method for notifying the terminal of the four antenna ports.
(Channel State Report in Related Art)

In related art, types of the channel state report include whether Periodic (periodic) or Aperiodic (aperiodic), whether wideband or sub-band, and whether or not a report of precoding matrix indicator (PMI) is necessary. The channel state report is distinguished as a CSI reporting mode. The CSI reporting mode is indicated in CQI-Report Config signaled to the terminal in an RRC message.

A timing of the channel state report is triggered by, for example, a CSI Request by DCI format 0 and 4 on a physical downlink control channel (PDCCH) in a case of Aperiodic CSI reporting. The terminal which receives the CSI Request from the base station using a frequency division duplex (FDD) scheme transmits a CSI report four subframes after the CSI request is received.

Further, as the timing of the channel state report, a period of Reporting is signaled to the terminal in the RRC message as a CQI-PMI Configuration Index in a case of Periodic CSI reporting.

The channel state report from the terminal is made in a form in which channel quality indicators (CQI), PMI, precoding type indicators (PTI), and rank indicators (RI) are included in uplink control information (UCI) in response to a request from the base station.

Resources of a plurality of types of CSI-RSs, timings of a plurality of reports, or the like, can be set for each CSI-Process. The CSI Reference Signal Configuration and the CQI-PMI Configuration Index are associated with a CSI-Process ID.

The channel state report in related art is a channel state report relating to an antenna port notified from the base station, and there has been no method for a channel state report relating to part of antenna ports among antenna ports notified from the base station.

(Handover and Interference Relating to FD-MIMO)

Handover between cells of the terminal in an RRC_CONNECTED state in related art is performed by the terminal measuring reception strength of common reference signals (CRSs) inserted into all resource blocks of a serving cell and an adjacent cell, and by the terminal reporting the measurement result and a cell ID of the adjacent cell to the base station in the case where the CRS reception strength of the adjacent cell becomes large.

Figure 7:
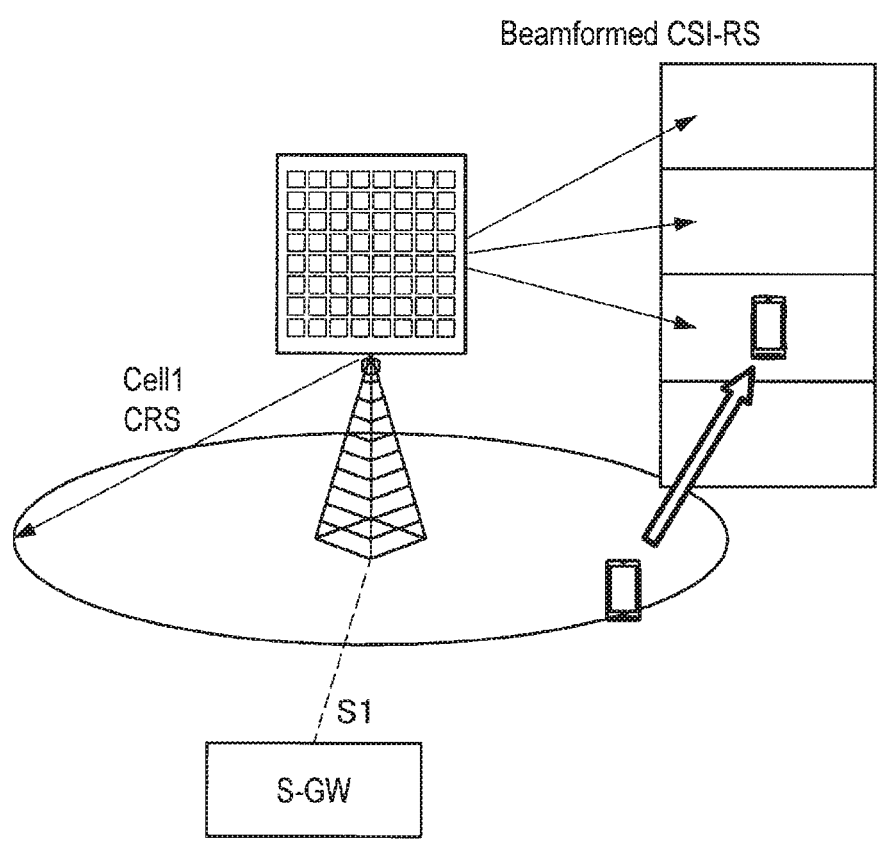
FIG. 7 is an explanatory diagram illustrating an example of aspect where a terminal in an RRC_CONNECTED state moves within a serving macro cell.

FIG. 7 is an explanatory diagram illustrating an example of aspect where the terminal in the RRC_CONNECTED slate moves within a serving macro cell. As illustrated in FIG. 7, a case will be considered where the terminal in the RRC_CONNECTED state moves within the serving macro cell and is served in the serving macro cell or detects a beam of FD-MIMO (beamformed CSI-RS) served in a small cell within the serving macro cell. In this case, by reporting part of the CSI-RS configuration information of the CSI-RS delected by the terminal to the base station, a macro cell which manages the CSI-RS configuration information can perform operation (handover to the beam) of transferring user data to the beam of FD-MIMO detected by the terminal.

However, in the cell which serves FD-MIMO, coverage of a CRS which is not beamformed is largely different from coverage of a beamformed CSI-RS and a PDSCH.

Figure 8:
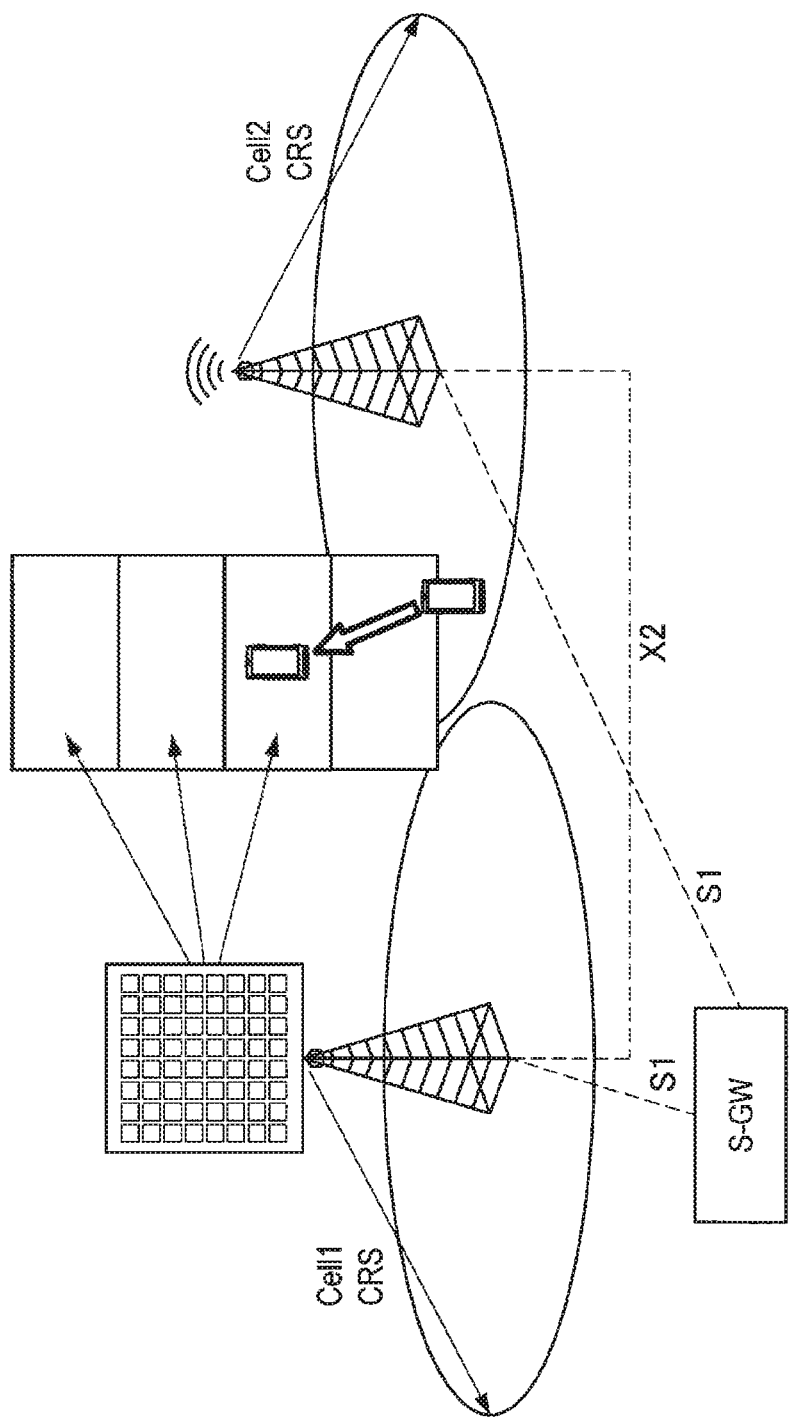
FIG. 8 is an explanatory diagram illustrating an example of aspect where a terminal in an RRC_CONNECTED state moves within a serving macro cell.

FIG. 8 is an explanatory diagram illustrating an example of aspect where the base station and the terminal in the RRC_CONNECTED state move within the serving macro cell. For example, as illustrated in FIG. 8, a case occurs where, by the base station and the terminal in the RRC_CONNECTED state moving within a coverage area of Cell 2 at Cell 2 which is a macro cell, it is desirable that the terminal is served with a beam of FD-MIMO of Cell 1 which is an adjacent macro cell or a small cell within Cell 1. The beam of FD-MIMO is not a beam obtained by beamforming the CRS and a cell ID, and Cell 2 does not manage the CSI-RS configuration information of the adjacent cell. Therefore, for the reason of the terminal being not notified of the CSI-RS configuration information of the adjacent cell from Cell 2, or the like, there is no method for direct handover from Cell 2 to the beam of FD-MIMO of Cell 1 which is the adjacent cell.

Figure 9:
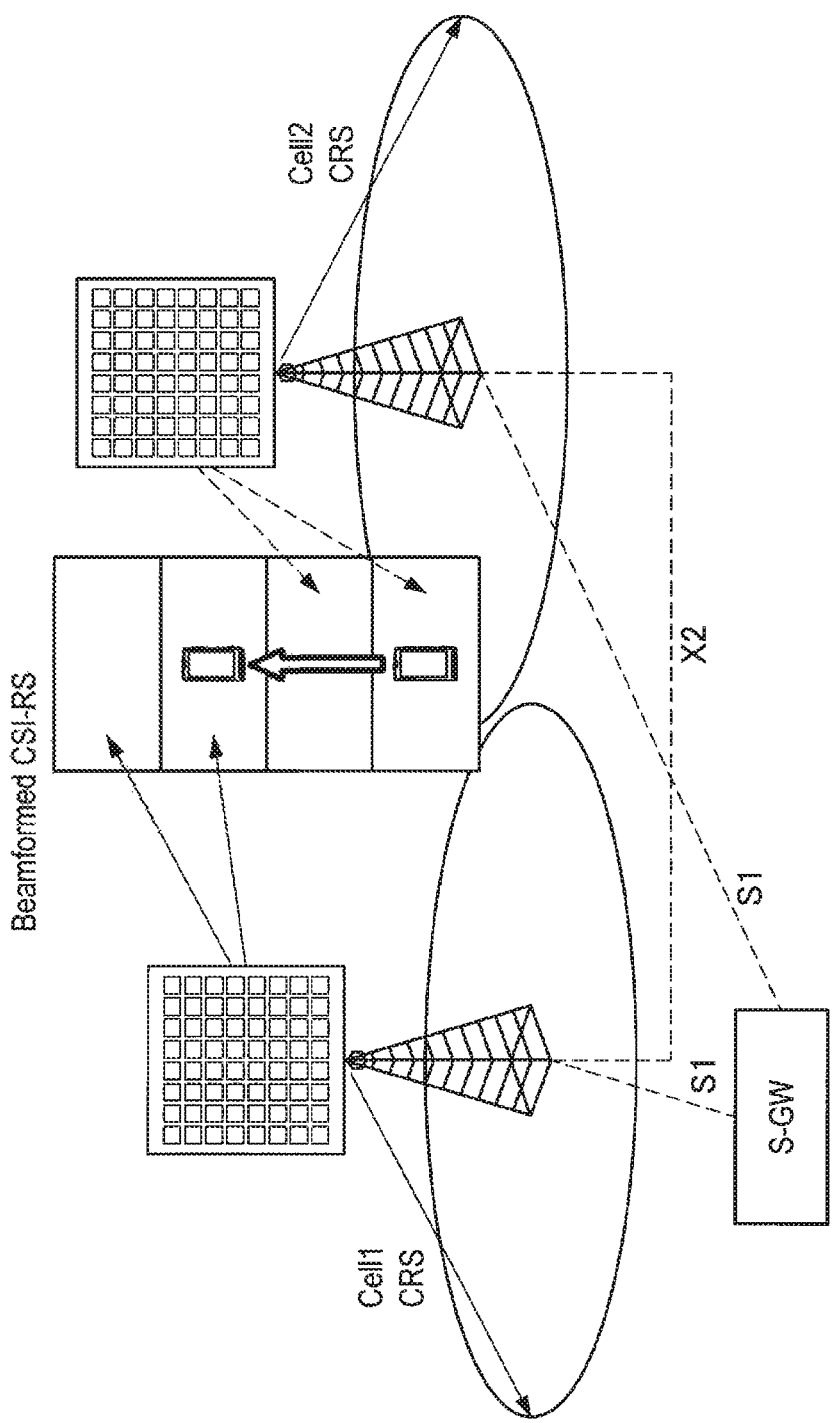
FIG. 9 is an explanatory diagram illustrating an example of aspect where a terminal in an RRC_CONNECTED state moves within a serving macro cell.

FIG. 9 is an explanatory diagram illustrating an example of aspect where the base station and the terminal in the RRC_CONNECTED state move within the serving macro cell. As illustrated in FIG. 9, in the case where the terminal to which sendee of FD-MIMO has been provided in Cell 2 moves and goes out from an area of a beam, there is a case where it had better directly handover to other beams of an adjacent cell (for example, Cell 1 in FIG. 9) rather than handover to the same serving cell. While there is a possibility that beams of FD-MIMO are directed to a tall building from a plurality of cells, and a mechanism for handover to a beam of the adjacent cell is required, there is no method for handover to a beam of the adjacent cell in the existing method.

Figure 10:
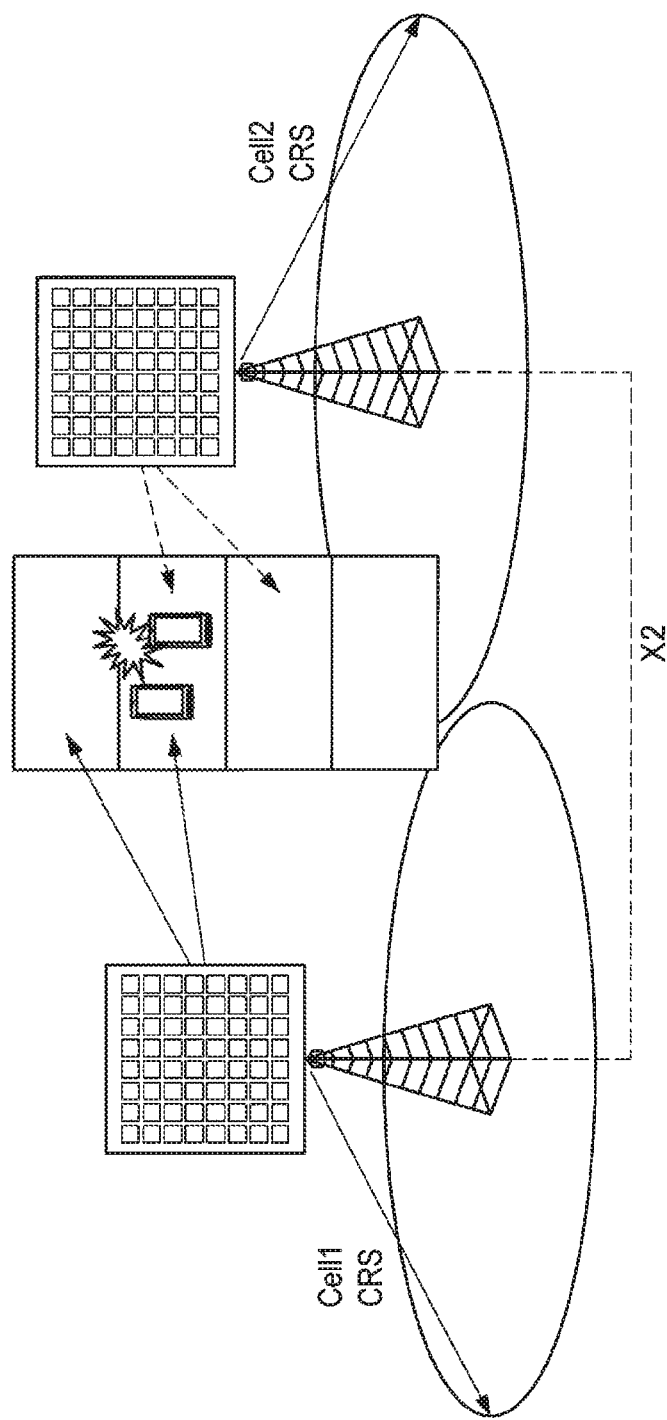
FIG. 10 is an explanatory diagram illustrating an example where beams of FD-MIMO are directed to the same building from a plurality of cells.

Further, in FD-MIMO, it is assumed that beams are directed to upper floors of a building. FIG. 10 is an explanatory diagram illustrating an example where beams of FD-MIMO are directed to the same building from a plurality of cells. As illustrated in FIG. 10, in the case where beams of FD-MIMO are directed to the same building from a plurality of cells, if the same resource is used by a plurality of beams, large interference occurs. There is no method for reducing interference among beams of FD-MIMO across cells.

Therefore, in view of the above-described background, the present discloser has studied hard a technology which solves an event which can occur by a reference signal being beamformed, and which is capable of making communication processing efficient in the case where a reference signal is beamformcd. As a result, the present discloser achieves a technology which solves an event which can occur by a reference signal being beamformed and which is capable of making communication processing efficient in the case where a reference signal is beamformed as will be described below, The background of the embodiments of the present disclosure has been described above. Next, a configuration example of an embodiment of the present disclosure will be described.

[1.2. Example of Configuration]

(1.2.1. Configuration Example of Communication System)

Figure 11:
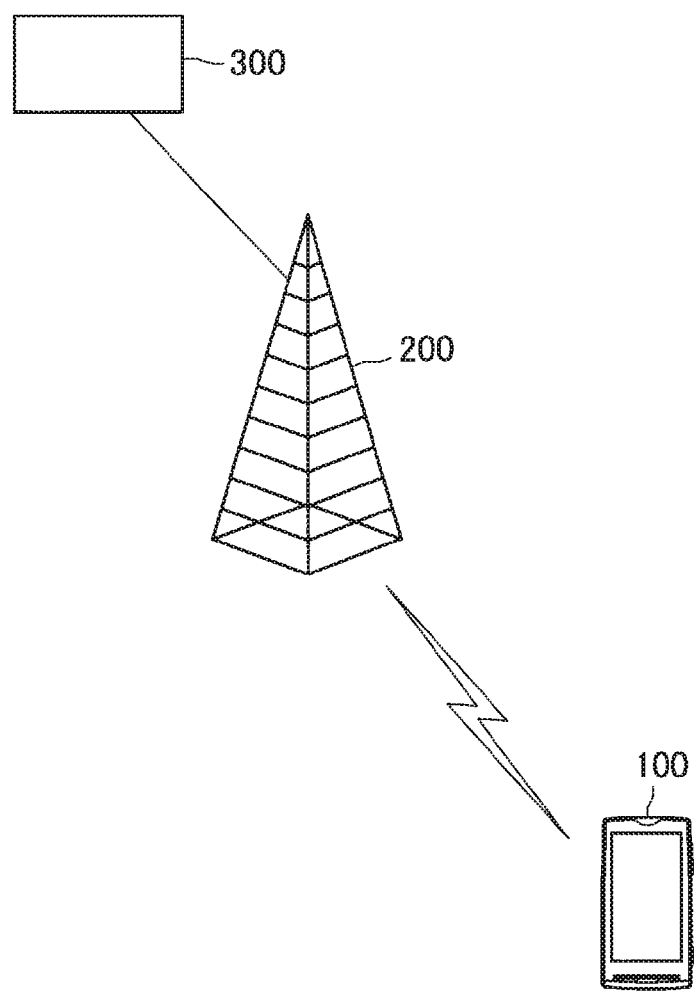
FIG. 11 is an explanatory diagram illustrating an example of a schematic configuration of a communication system I according to an embodiment of the present disclosure.

First, the schematic configuration of a communication system 1 according to an embodiment of the present disclosure will be described. FIG. 11 is an explanatory diagram illustrating an example of the schematic configuration of the communication system 1 according to an embodiment of the present disclosure. FIG. 11 illustrates that the communication system 1 includes a terminal device 100, a base station 200, and a control entity 300. The communication system 1 is compliant with, for example, LTE, LTE-Advanced, or a communication scheme equivalent thereto.

The terminal device 100 performs wireless communication with the base station 200. Further, the terminal device 100 performs measurements for cells (such as a serving cell and an adjacent cell). Further, the terminal device 100 reports a measurement (i.e., reports a measurement result) to the base station 200.

The base station 200 performs wireless communication with one or more terminal devices including the terminal device 100. Further, the base station 200 decides the handover of a terminal device on the basis of a measurement result reported by the terminal device. The base station 200 may be a base station in a macro cell (i.e., macro base station) or a base station in a small cell (i.e., small base station).

The control entity 300 performs control according to each embodiment of the present disclosure. For example, the control entity 300 is an existing or a new core network node. Alternatively, the control entity 300 may be a base station. As an example, in a case where the base station 200 is a small base station, the control entity 300 may be a macro base station.

Additionally, for example, the "on-state" of a cell (such as a small cell) means the stale in which a base station in the cell transmits and receives signals (data signals and control signals) in the cell in an embodiment of the present disclosure. In contrast, for example, the "off-state" of a cell (such as a small cell) means the state in which a base station in the cell transmits and receives no signals but some control signals (such as DRSs) in the cell. Alternatively, the "off-state" of a cell may mean the state in which a base station in the cell does not transmit or receive any signals.

The example of the schematic configuration of the communication system 1 according to the embodiment of the present disclosure has been described above using FIG. 11. Next, a configuration example of the terminal device 100 according to the embodiment of the present disclosure will be described.

( 1.2.2. Configuration Example of Terminal Device)

Figure 12:
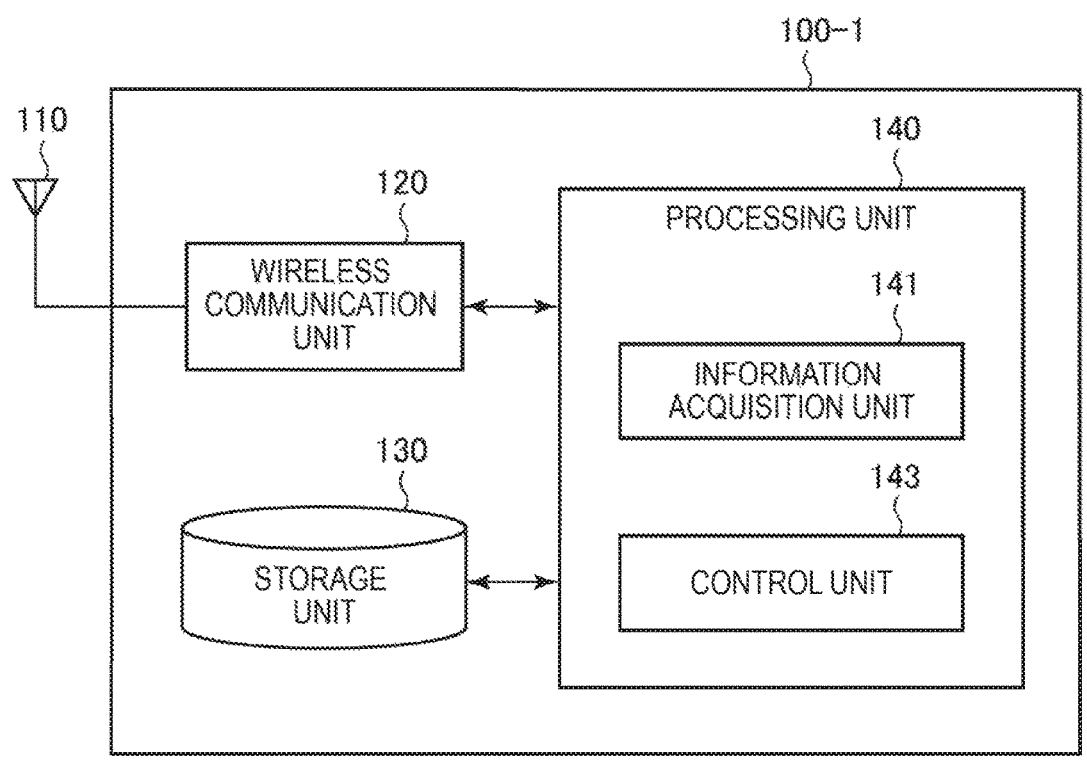
FIG. 12 is a block diagram illustrating an example of a configuration of a terminal device 100 according to the embodiment of the present disclosure.

FIG. 12 is a block diagram illustrating an example of a configuration of the terminal device 100 according to the embodiment of the present disclosure. Referring to FIG. 12, the terminal device 100 includes an antenna unit 110, a wireless communication unit 120, a storage unit 130, and a processing unit 140.

(Antenna Unit 110)

The antenna unit 110 emits a signal output by the wireless communication unit 120 to a space as a radio wave. In addition, the antenna unit 110 converts a radio wave in a space into a signal and outputs the signal to the wireless communication unit 120.

(Wireless Communication Unit 120)

The wireless communication unit 120 receives a signal. For example, the wireless communication unit 120 receives a downlink signal from a base station and transmits an uplink signal to a base station.

(Storage Unit 130)

The storage unit 130 temporarily or permanently stores programs and data for operations of the terminal device 100.

(Processing Unit 140)

The processing unit 140 provides various functions of the terminal device 100. The processing unit 140 includes an information acquisition unit 141 and the control unit 143. Note that the processing unit 140 can further include other constituent elements in addition to these constituent elements. That is, the processing unit 140 can perform other operations in addition to operations of the constituent elements.

(Information Acquisition Unit 141)

The information acquisition unit 141 acquires various kinds of information from signals acquired from radio waves received by the antenna unit 110. The information acquisition unit 141 acquires beamformed reference signals transmitted from the base station 200 or data placed on data channels in the present embodiment. The information acquisition unit 141 acquires, for example, cell specific beam configuration information. The cell specific beam configuration information may be an antenna port of a cell specific beam included in a PDSCH beam, or information regarding a terminal specific weighting matrix generated by the base station 200.

(Control Unit 143)

The control unit 143 controls the operation of the terminal device 100. For example, the control unit 143 measures the reference signals transmitted on beams for all the terminal devices from the base station 200, and generates a channel state report on the basis of an instruction from the base station 200 in the present embodiment. The channel state report reports the state of the channel of each beam. The control unit 143 may also include information of the reception strength of each reference signal for channel estimation when generating a channel state report. Further, the control unit 143 performs measurement including measurement of reception power or reception quality of the CSI-RS relating to the CSI-RS configuration information transmitted from the base station 200 which beamforms a reference signal with a plurality of beams.

Further, the control unit 143 selects part of antenna ports among antenna ports for the beamformed reference signal from the base station 200 and generates a channel state report which reports stales of channels at the selected antenna ports to the base station 200. Further, the control unit 143 reports information of the selected antenna ports (antenna port selection information) to the base station 200.

Further, the control unit 143 may receive a PDSCH beam and cell specific beam configuration information from the base station 200, and use the cell specific beam configuration information to separate a PDSCH for each cell specific beam received by the antenna unit 110.

The functional configuration example of the terminal device 100 according to an embodiment of the present disclosure has been described above. Next, a functional configuration example of the base station 200 according to an embodiment of the present disclosure will be described.

(1.2.3. Configuration Example of Base Station)

Figure 13:
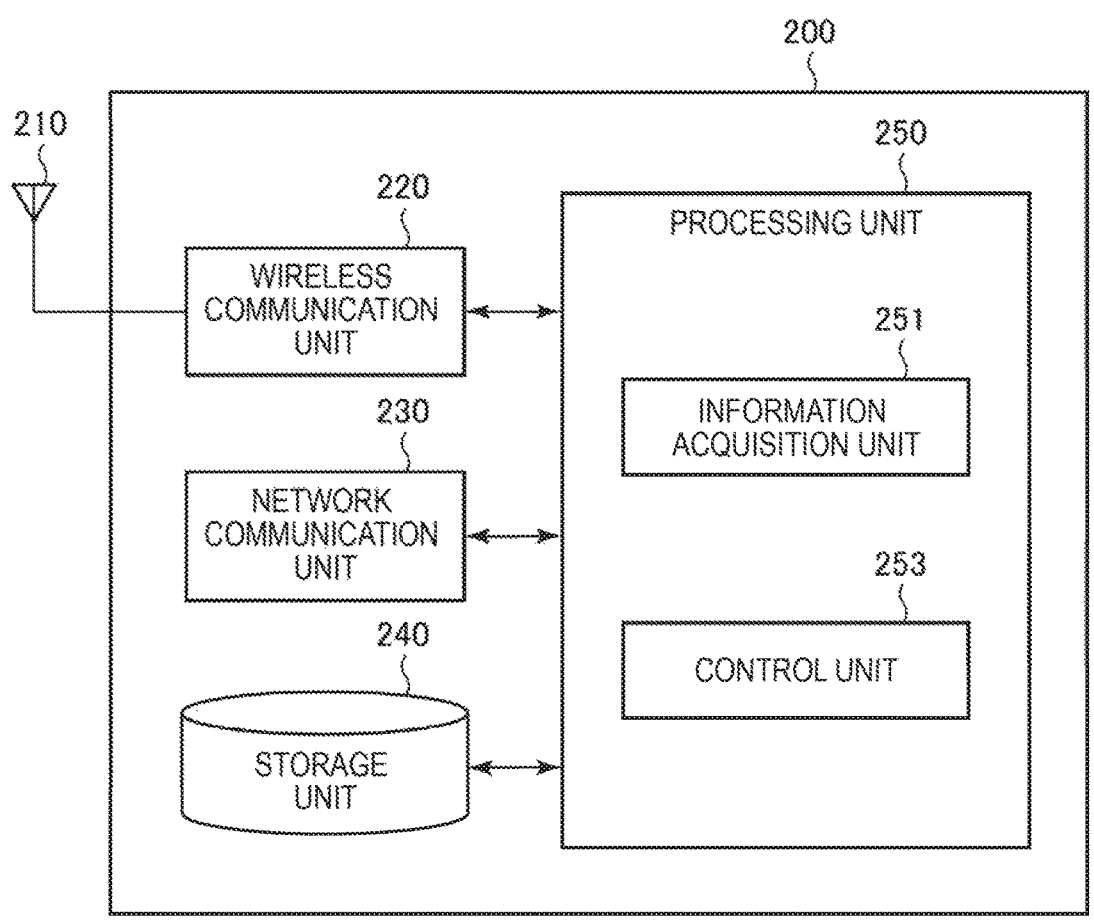
FIG. 13 is a block diagram illustrating a functional configuration example of a base station 200 according to an embodiment of the present disclosure.

FIG. 13 is a block diagram illustrating a functional configuration example of the base station 200 according to an embodiment of the present disclosure. As illustrated in FIG. 13, the base station 200 according to the embodiment of the present disclosure includes an antenna unit 210, a wireless communication unit 220, a network communication unit 230, a storage unit 240, and a processing unit 250.

(Antenna Unit 210)

The antenna unit 210 emits a signal output by the wireless communication unit 220 to a space as a radio wave. In addition, the antenna unit 210 converts a radio wave of a space into a signal and outputs the signal to the wireless communication unit 220.

The antenna unit 210 includes a directional antenna in the present embodiment. For example, the directional antenna is a directional antenna that can be used for FD-MIMO.

For example, 16 TXRUs illustrated in FIG. 3 are connected to 16 sub arrays one to one via cell specific weighting matrices. Two sub arrays and TXRUs are disposed in the vertical direction. Weighting factors $W_1$ to $W_4$ and $W_5$ to $W_8$ used by two TXRUs in the vertical direction are different, and beams are generated in different directions. Eight sub arrays and TXRUs are disposed in the horizontal direction (column direction). These eight TXRUs in the horizontal direction use the same weighting matrix, and generate beams in the same direction.

(Wireless Communication Unit 220)

The wireless communication unit 220 transmits and receives signals. For example, the wireless communication unit 220 transmits a downlink signal to a terminal device and receives an uplink signal from a terminal device.

(Network Communication Unit 230)

The network communication unit 230 transmits and receives information. For example, the network communication unit 230 transmits information to another node and receives information from another node. The other node includes, for example, a core network and another base station. The other node includes the control entity 300 as an example.

(Storage Unit 240)

The storage unit 240 temporarily or permanently stores programs and data that are necessary for the operation of the base station 200.

(Processing Unit 250)

The processing unit 250 provides the various functions of the base station 200. The processing unit 250 includes an information acquisition unit 251 and a control unit 253 Note that the processing unit 250 can further include other components in addition to these components. That is, the processing unit 250 cart perform other operations in addition to the operations of the components.

(Information Acquisition Unit 251)

The information acquisition unit 251 acquires information and programs for operation of the base station 200 and information received from other nodes. The information acquisition unit 251 can acquire information and programs for operation of the base station 200 from the storage unit 240.

The information acquisition unit 251 acquires information (channel state report) transmitted from each terminal device 100 in accordance with a reference signal output from the antenna unit 210 in the present embodiment. The content of a channel state report transmitted from each terminal device 100 in accordance with a reference signal will be described below. Further, the information acquisition unit 251 acquires a channel state report which reports states of channels at part of antenna ports among all the antenna ports for the beamformed reference signal from the base station 200.

(Control Unit 253)

The control unit 253 controls the operation of the base station 200. The control unit 253 outputs a reference signal from the antenna unit 210, for example, on a first beam generated with at least two or more different first weighting matrices (cell specific weighting matrices) in the present embodiment. Further, the control unit 253 generates a second weighting matrix (terminal specific weighting matrix) specific to each terminal device in accordance with information that is transmitted from each terminal device 100 in accordance with a reference signal output from the antenna unit 210 and acquired by the information acquisition unit 251. The control unit 253 then outputs data for each terminal device 100 from the antenna unit 210 on a second beam generated with the first weighting matrices and the second weighting matrix.

Further, the control unit 253 selects part of antenna ports among all the antenna ports for the beamformed reference signal, acquires a channel state report which reports states of channels at the selected part of antenna ports, and executes processing for beam forming downlink data to the terminal device 100 from the antenna unit 210 using the antenna ports selected at the terminal device 100. Further, the control unit 253 notifies the terminal device 100 in the RRC_CONNECTED state of the CSI-RS configuration information beamformed by the base station 200 with a plurality of beams and the CSI-RS configuration information to be beamformed by the adjacent cell with a plurality of beams. The control unit 253 acquires the CSI-RS configuration information to be beamformed by the adjacent cell with a plurality of beams using, for example, an X2 interface.

The functional configuration example of the base station 200 according to an embodiment of the present disclosure has been described above. Next, a functional configuration example of the control entity 300 according to an embodiment of the present disclosure will be described.

(1.2.4. Configuration Example of Control Entity)

Figure 14:
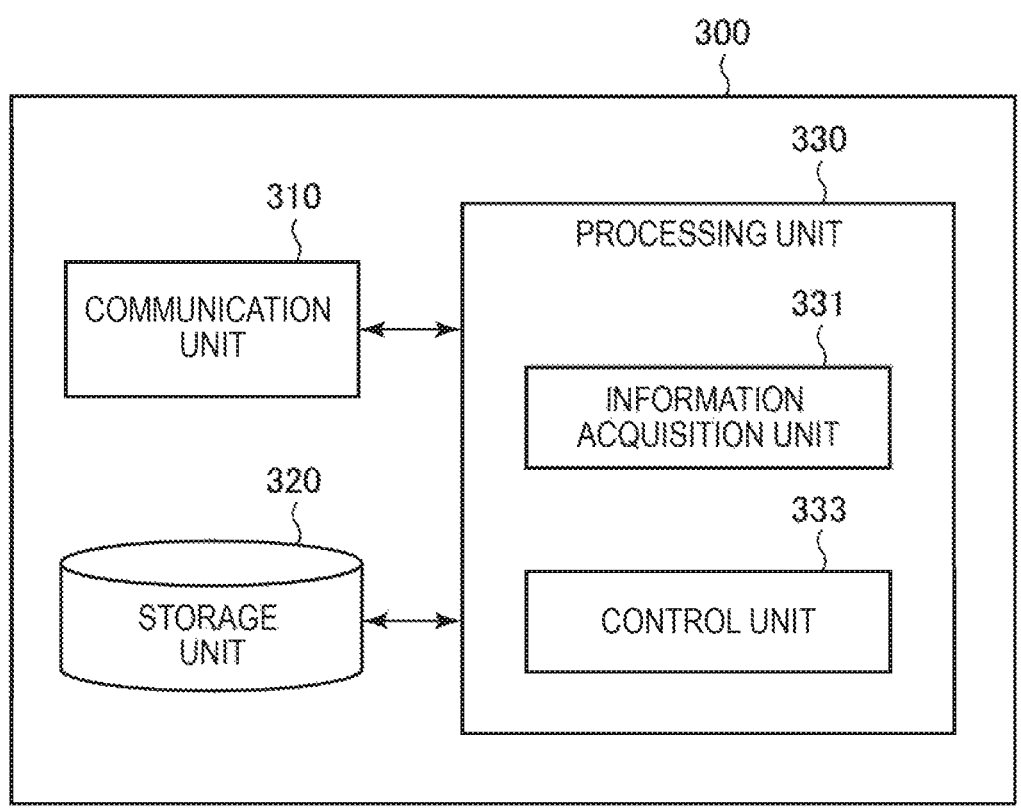
FIG. 14 is a block diagram illustrating a functional configuration example of a control entity 300 according to an embodiment of the present disclosure.

FIG. 14 is a block diagram illustrating a functional configuration example of the control entity 300 according to an embodiment of the present disclosure. As illustrated in FIG. 14, the control entity 300 according to the embodiment of the present disclosure includes a communication unit 310, a storage unit 320, and a processing unit 330.

(Communication Unit 310)

The communication unit 310 transmits and receives information. For example, the communication unit 310 transmits information to another node and receives information from another node. The other node includes, for example, a core network and a base station. The other node includes the base station 200 as an example.

(Storage Unit 320)

The storage unit 320 temporarily and permanently stores programs and data that are necessary for the operation of the control entity 300.

(Processing Unit 330)

The processing unit 330 provides the various functions of the control entity 300. The processing unit 330 includes an information acquisition unit 331 and a control unit 333. Note that the processing unit 330 can further include other components in addition to these components. That is, the processing unit 330 can perform other operations in addition to the operations of the components.

(Information Acquisition Unit 331)

The information acquisition unit 331 acquires information for the operation of the control entity 300 and information received from another node The information acquisition unit 331 can acquire information and programs for the operation of the control entity 300 front the storage unit 320.

(Control Unit 333)

The control unit 333 controls the operation of the control entity 300. The control unit 333 can operate on the basis of information acquired by the information acquisition unit 331.

The functional configuration example of the control entity 300 according to an embodiment of the present disclosure has been described above. Next, an operation example of the communication system 1 according to an embodiment of the present disclosure will be described.

[1.3. Operation Examples]

(Operation Example 1) Channel State Report in the Case Where Terminal Selects Antenna Port First, a channel stale report in the case where the terminal device 100 selects an antenna port will be described. Here, as illustrated in FIG. 15, a case will be described where die antenna unit 210 of the base station 200 is configured such that an antenna array configured with 8*8 antenna elements and eight transceiver units (TXRUs) are disposed with analog fixed phase shifters put therebetween, and the base station 200 in which (he antenna unit 210 is configured in this manner provides FD-MIMO.

Figure 15:
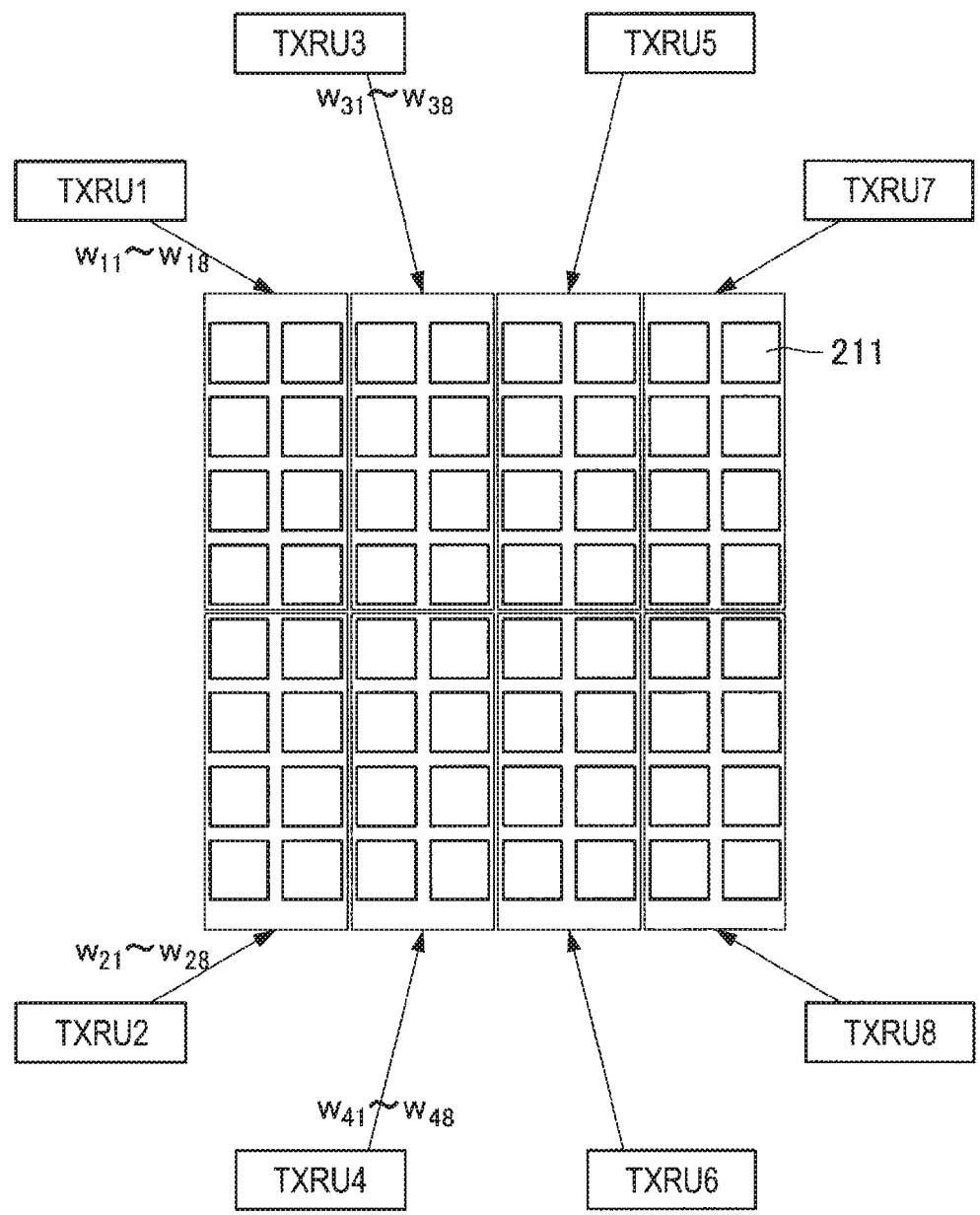
FIG. 15 is an explanatory diagram illustrating a configuration example of an antenna unit 210 of the base station 200.
Figure 16:
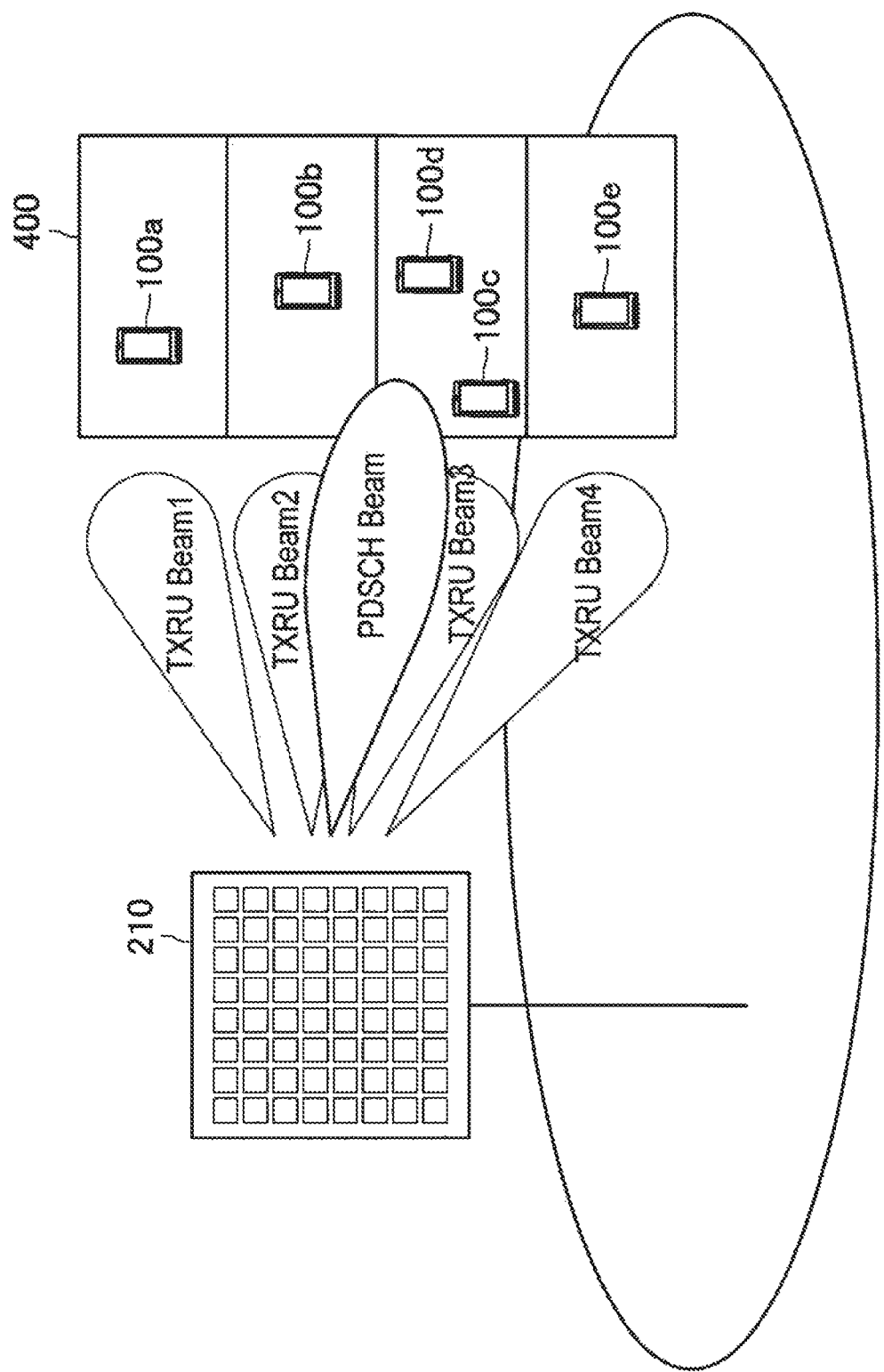
FIG. 16 is an explanatory diagram illustrating an example of a CSI-RS beam transmitted from the antenna unit 210 configured as illustrated in FIG. 15.

FIG. 16 is an explanatory diagram illustrating an example of a CSI-RS beam transmitted from the antenna unit 210 configured as illustrated in FIG. 15. FIG. 16 illustrates only four beams (TXRU Beams 1 to 4) among eight CSI-RS beams transmitted from eight TXRUs. The remaining four CSI-RS beams may be directed to other angles. Further, FIG. 16 also illustrates five terminal devices 100a to 100e located in the building 400.

The terminal device 100c can receive a CSI-RS beam 2 (TXRU Beam 2) and a CSI-RS beam 3 (TXRU Beam 3). In the present embodiment, the terminal device 100c makes a channel state report relating to the CSI-RS beam 2 and the CSI-RS beam 3 to the base station 200. The base station 200 can know an optimum weighting factor to be multiplied by a preceding stage of the TXRU 2 and the TXRU 3 for the PDSCH to be allocated to the terminal device 100c from the channel state report from the terminal device 100c. The base station 2(H) can then, as illustrated in FIG. 4, form a PDSCH beam of the terminal device 100c and transmit the PDSCH beam.

(Notification of CSI Reporting Mode from Base Station to Terminal)

The base station 200 notifies the terminal device 100 which supports FD-MIMO, and which makes an RRC connection request, of CQI-ReportConfig through RRC signaling. The CQI-ReportConfig includes s CSI reporting mode, CQI-PMI a Configuration Index, or the like. Whether Periodic or Aperiodic, whether wideband or sub-band, whether or not a report of PMI is necessary, and whether beamformed CSI-RS or Non-beamformed CSI-RS are indicated by a type of the CSI reporting mode. Table 2 is an explanatory diagram illustrating an example of the CSI reporting mode.

TABLE 2

(Example of CSI reporting mode)

|  |  |  |  | Reporting mode |
|---|---|---|---|---|
| aperiodic | wideband | PMI | Non-beamformed | 1-2 |
|  |  |  | UE selected beamform | 4-0 |
|  |  |  | higher layer configured beamform | 4-1 |
|  | UE selected sub-band | no PMI | Non-beamformed | 2-0 |
|  | UE selected sub-band | PMI | Non-beamformed | 2 2 |
|  |  |  | UE selected beamform | 4-2 |
|  |  |  | higher layer configured beamform | 4-3 |
|  | higher layer configured sub-band | no PMI | Non-beamformed | 3-0 |
|  | higher layer configured sub-band | PMI | Non-beamformed | 3-1 |
|  |  |  | UE selected beamform | 4-4 |
|  |  |  | higher layer configured beamform | 4-5 |
| periodic | wideband | no PMI | Non-beamformed | 1-0 |
|  |  | PMI | Non-beamformed | 1-1 |
|  | UE selected sub-band | no PMI | Nor-beamformed | 2-0 |
|  |  | PMI | Non-beamformed | 2-1 |

In the present embodiment, 4-0 to 4-5 are added to the CSI reporting mode. In this operation example 1, the base station 200 makes a notification of Reporting mode 4-0. The Reporting mode 4-0 indicates Aperiodic, wideband, PML and UE selected beamform CSI-RS. In a case of Aperiodic CSI reporting, for example, reporting is triggered by a CSI Request by DCI format 0 and 4 on a PDCCH. The terminal device 100 transmits a CSI report four subframes after the CSI request is received.

Table 3 is an explanatory diagram illustrating an example of a transmission mode. In the present embodiment, as the transmission mode, for example, transmission mode 11 is added for transmitting a downlink signal of FD-MIMO. Of course, a value of a mode to be added for transmitting a downlink signal of FD-MIMO is not limited to 11.

TABLE 3

(Example of transmission mode)

| Transmission mode | Transmission scheme of PDSCH |
|---|---|
| 1 | Single-antenna port, port 0 |
| 2 | Transmit diversity |
| 3 | Transmit diversity if the associated rank indicator is 1, otherwise large delay CDD |

TABLE 3-continued (Example of transmission mode)

| Transmission mode | Transmission scheme of PDSCH |
|---|---|
| 4 | Closed-loop spatial multiplexing |
| 5 | Multi-user MIMO |
| 6 | Closed-loop spatial multiplexing with a single transmission layer |
| 7 | If the number of PBCH antenna ports is one, Single-antenna port, port 0; otherwise Transmit diversity |
| 8 | If the UE is configured without PMI/RI reporting: if the number of PBCH antenna ports is one, single-antenna port, port 0; otherwise transmit diversity If the UE is configured with PMI/RI reporting: closed-loop spatial multiplexing |
| 9 | If the UE is configured without PMI/RI reporting: if the number of PBCH antenna ports is one, single-antenna port, port 0; otherwise transmit diversity If the UE is configured with PMI/RI reporting: if the number of CSI-RS ports is one, single-antenna port, port 7; otherwise up to 8 layer transmission, ports 7-14 (see subclause 7.1.5B) |
| 10 | If a CSI process of the UE is configured without PMI/RI reporting: if the number of CSI-RS ports is one, single-antenna port, port7; otherwise transmit diversity If a CSI process of the UE is configured with PMI/RI reporting: if the number of CSI-RS ports is one, single-antenna port, port 7; otherwise up to 8 layer transmission, ports 7-14 (see subclause 7.1.5B) |
| 11 | FD-MIMO |

The base station 200 notifies the terminal device 100 in the RRC_CONNECTED state which supports FD-MIMO of a downlink transmission mode through RRC signaling. Instead of adding a UE selected beamform reporting mode and a higher layer configured beamform reporting mode to the CSI reporting mode, the terminal device 100 may judge that the CSI reporting mode is a reporting mode of the beamformed CSI-RS in the case where the terminal device 100 is notified of Transmission mode 11.

(Notification of CSI-RS Configuration Information from Base Station to Terminal)

The base station 200 notifies the terminal device 100 which supports FD-MIMO of a CSI Reference Signal Configuration (CSI-RS configuration information) through RRC signaling. The CSI Reference Signal Configuration includes an Antenna port count, a CSI reference Signal configuration, a Subframe configuration, or the like.

The Antenna port count indicates the number of antenna ports forming the CSI-RS. In the operation example 1, it is assumed that the number of antenna ports forming the beamformed CSI-RS is eight.

The CSI reference signal configuration is indicated with a value from 0 to 31, and a resource element (k. I) and a time slot to be used by the CSI-RS are determined from a look-up table defined in 3GPP TS36.211 table 6.10.5.2-1, or the like. In the operation example I, for example, CSI reference Signal configuration 0 is notified, and resource element positions to be used by the antenna ports 15 to 22 are respectively (9, 5), (9, 5), (3, 5), (3, 5), (8. 5), (8, 5), (2, 5) and (2, 5) on even-numbered slots.

The Subframe configuration is indicated with a value from 0 to 154, and CSI-RS periodicity and a CSI-RS subframe offset are provided from a look-up table defined in 3GPPTS36.211 table 6.10.5.3-1.

In this operation example 1, the base station 200 notifies the terminal device 100 of the CSI-RS configuration information indicating a resource with which the beamformed CSI-RS is to be transmitted with the number of antenna ports forming the CSI-RS set at eight.

(Notification of CSI Request from Base Station to Terminal)

A timing of the channel state report is triggered by the CSI Request by, for example, DCI format 0 and 4 on a PDCCH in a case of Aperiodic CSI reporting, in the present embodiment, it is assumed that the CSI Request is a total of three bits by, for example, bits corresponding to the beamformed CSI-RS being added. Table 4 is an explanatory diagram illustrating an example of the CSI request.

TABLE 4

(Example of CSI request)

| CSI request | |
|---|---|
| 000 | No aperiodic CSI report is triggered |
| 001 | Aperiodic CSI report is triggered for serving cell 'c' |
| 010 | Aperiodic CSI report is triggered for the 1$^{st}$ set of serving cells |
| 011 | Aperiodic CSI report is triggered for the 2nd set of serving cells |
| 100 | Aperiodic beamformed CSI report 0 is triggered for serving cell 'c' |
| 101 | Aperiodic beamformed CSI report 1 is triggered for serving cell 'c' |

The terminal device 100 confirms content of the CSI request indicated in Table 4 and can recognize that the request is a request for a channel state report with respect to the beamformed CSI-RS in the case where a most significant bit is "1". Further, the terminal device 100 is made to be able to also support a case where there are a plurality of types of CSI process.

(Channel State Report)

A channel state report from the terminal device 100 is made four subframes after the CSI Request from the base station 200 in a form in which CQI, PMI, PTI, RI and selection information of antenna ports are included in the UCI. The terminal device 100 may display selection information of antenna ports in a bit map of eight bits in the case where, for example, the beamformed CSI-RS is notified at eight antenna ports. Further, the terminal device 100 may generate a bit map of selection information of antenna ports and notify the base station 200 of the bit map in an RRC message.

Figure 17:
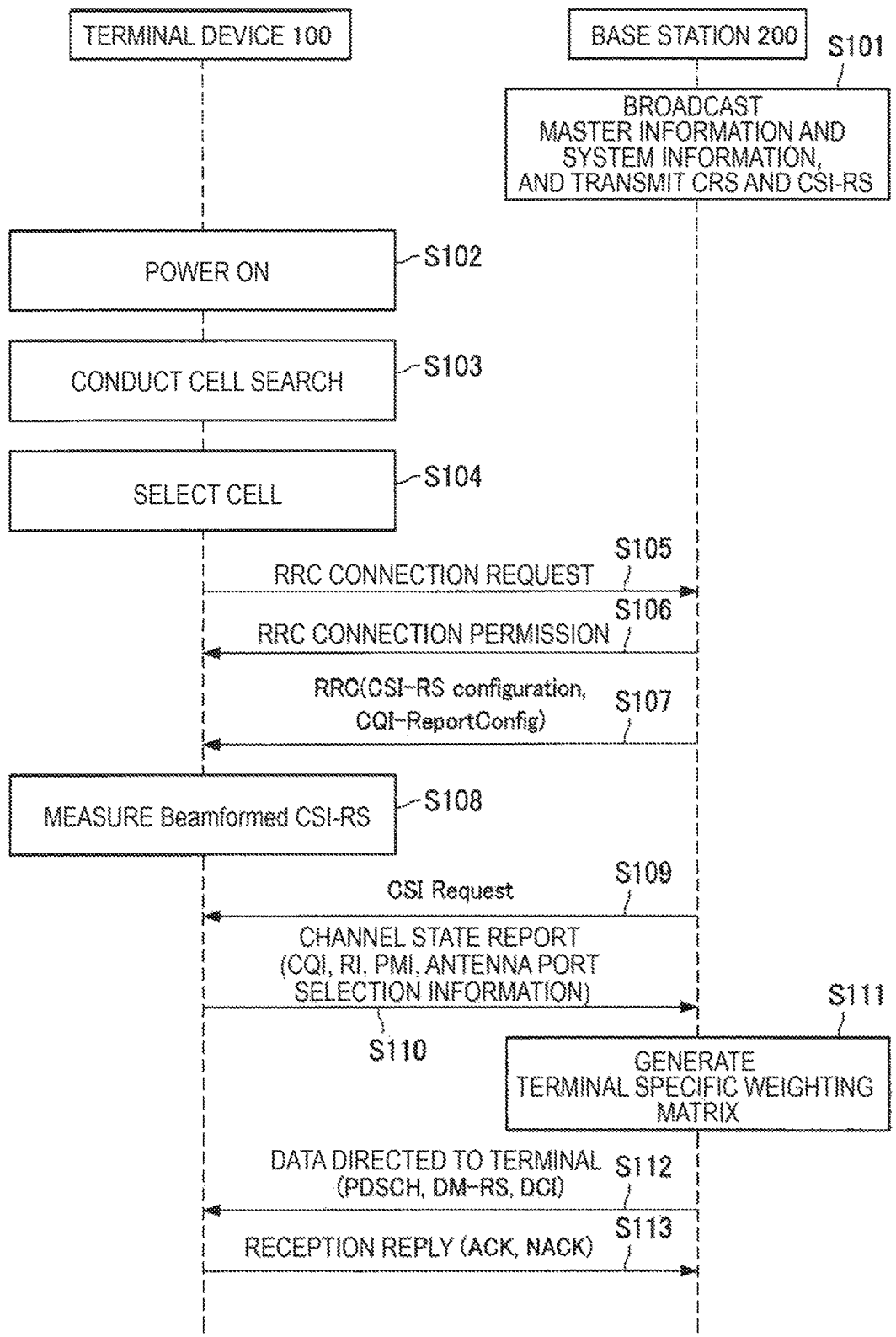
FIG. 17 is a flowchart illustrating operation examples of the terminal device 100 and the base station 200 according to an embodiment of the present disclosure.

FIG. 17 is a flowchart illustrating operation examples of the terminal device 100 and the base station 200 according to an embodiment of the present disclosure. FIG. 17 illustrates an operation example where the terminal device 100 measures a CSI-RS of part of antenna ports on the basis of a request from the base station 200, and the base station 200 generates a terminal specific weighting matrix on the basis of a report from the terminal device 100 and generates a beam directed to the terminal device 100. The following uses FIG. 17 to describe operation examples of the terminal device 100 and the base station 200 according to an embodiment of the present disclosure.

The base station 200 transmits, from the antenna unit 210, cell specific reference signals (CRSs) with a resource element decided on die basis of physical layer cell IDs (PCIs) and the number of transmitting antennas in all the sub frames (step S101). The base station 200 uses different antenna ports to transmit CSI-RSs through cell specific weighting matrices for each TXRU. The base station 200 transmits a CSI-RS at the predefined position of a resource element in a predefined sub frame.

If the terminal device 100 is powered on (step S102), the terminal device 100 conducts a cell search with a frequency channel having high priority (step S103). The terminal device 100 detects a first synchronization signal (PSS) and a second synchronization signal (SSS), and detects a physical layer cell ID (PCI) and frame timing. The terminal device 100 can decode a master information block (MIB) and a system information block (SIB), learn, from the already delected PCI and the number of transmitting antennas included in the base station 200, the position of a resource element into which a cell specific reference signal (CRS) is inserted, and measure the reception strength thereof. The terminal device 100 measures the strength of nearby CRSs with the control unit 143, and selects the optimum cell (step S104).

The terminal device 100 that selects the optimum cell sends an RRC connection request to the base station 200 (step S105). The control unit 143 transmits an RRC connection request in step S105 through the antenna unit 110. The base station 200 that receives the RRC connection request sends an RRC connection permission to the terminal device 100 (step S100). The control unit 253 transmits an RRC connection permission in step S106 through the antenna unit 210. If the base station 200 sends an RRC connection permission to the terminal device 100 that transmits an RRC connection request, the terminal device 100 and the base station 200 enter an RRC connection state (RRC Connected).

Subsequently the base station 2(H) notifies the terminal device 100 which is put into an RRC connection state of a CSI-RS Configuration (CSI-RS configuration information) and CQI-ReportConfig through RRC signaling (step S107). The notification in step S107 is made by the control unit 253 through the antenna unit 210.

The terminal device 100 which receives a notification from the base station 200 measures the beamformed CSI-RS (step S108). The measurement in step S108 is performed by the control unit 143.

Subsequently, the base station 200 notifies the terminal device 100 of a CSI Request (step S109). The notification in step S109 is made by the control unit 253 through the antenna unit 210.

The terminal device 100 which receives a notification of the CSI Request from the base station 200 transmits a report of CQI, RI, PMI and antenna port selection information (channel state report) with respect to the CSI-RS to the base station 200 in response to the notification from the base station 200 (step S110). The transmission of the channel state report in step S110 is performed by the control unit 143 through the antenna unit 110.

The base station 200 that receives the channel state report from the terminal device KM) selects the optimum TXRU for the terminal device 100 in accordance with the report from the terminal device 100, and generates a weighting matrix (terminal specific weighting matrix) specific to the terminal (step S111). The control unit 253 generates a terminal specific weighting matrix in step S111.

When the base station 200 generates the terminal specific weighting matrix in step S111, the base station 200 notifies the terminal device 100 of allocation information of resource blocks with which a PDSCH and a DM-RS are to be transmitted in downlink control information (DCI), and transmits the PDSCH and the DM-RS allocated to the terminal device 100 through the terminal specific weighting matrix and the cell specific weighting matrices with a terminal specific beam (PDSCH beam) (step S112). The transmission in step S112 is performed by the control unit 253 through the antenna unit 210. The control unit 253 transmits in step S112 through the antenna unit 210. When transmitting the PDSCH and the DM-RS, the base station 200 may assign the same resource block to PDSCH beams having different directions to multiplex data for the terminal devices 100.

The terminal device 100 that can receive the PDSCH from the base station 200 transmits a reception reply (ACK) to the base station (step S113). Further, the terminal device 100 that fails to receive the PDSCH from the base station 200 transmits a reception reply (NACK) to the base station (step S113). The control unit 143 transmits a reception reply in step SI 13 through the antenna unit 110.

By the terminal device 100 and the base station 200 executing the above-described series of operation, the terminal device 100 can make only part of antenna ports a measurement target of the CSI-RS. Further, the base station 200 can generate a beam appropriate for the terminal device 100 on the basis of the report from the terminal device 100, and the terminal device 100 can receive a beam appropriate for reception from the base station 200.

The number of antenna ports selected by the terminal device 100 may be one. In the case where the number of antenna ports selected by the terminal device 100 is one, the base station 200 does not use the terminal specific weighting matrix for data to be transmitted to the terminal device 100, and selects the same weighting as that used upon transmission of the CSI-RS using the selected one antenna port.

Figure 18:
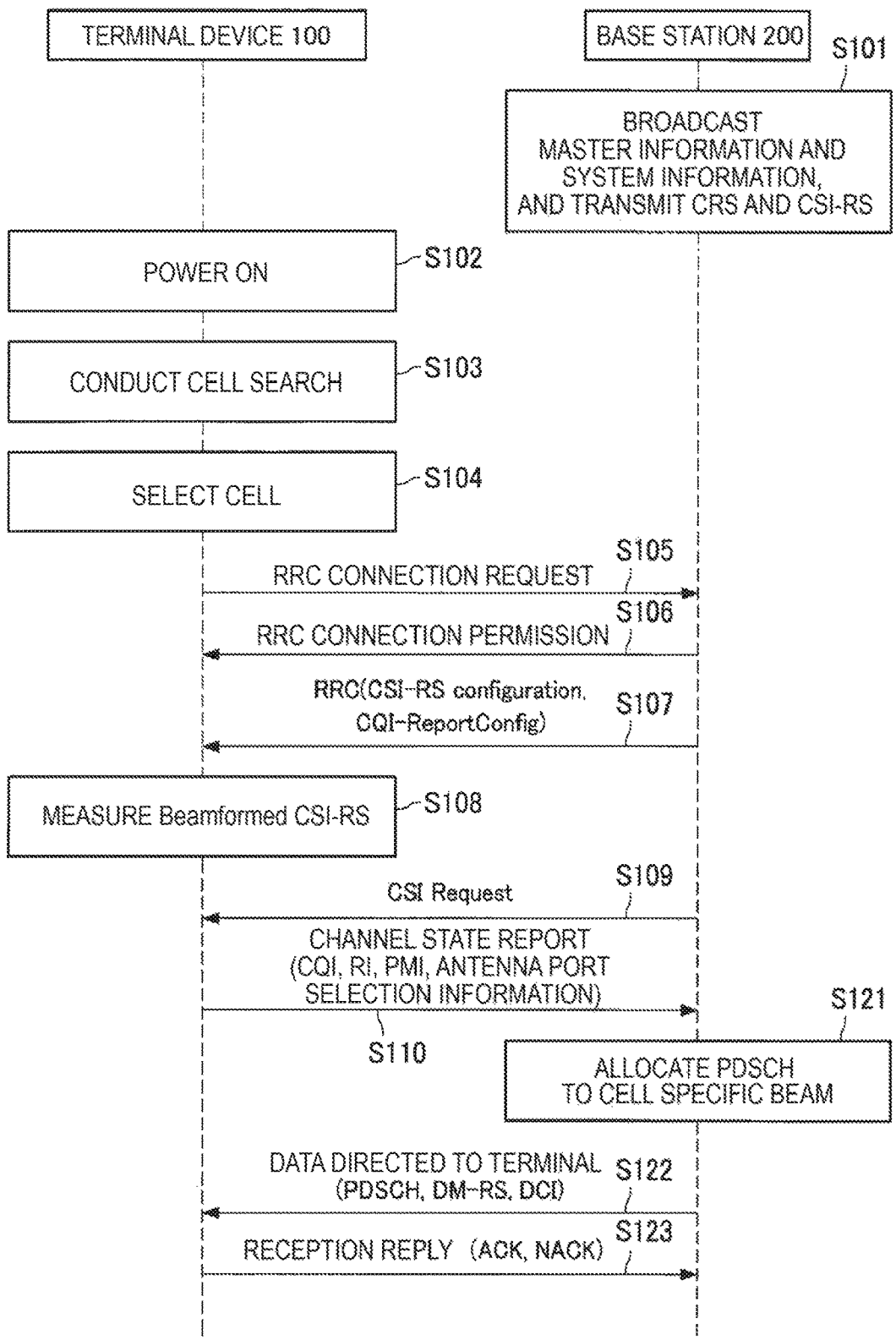
FIG. 18 is a flowchart illustrating operation examples of the terminal device 100 and the base station 200 according to an embodiment of the present disclosure.

FIG. 18 is a flowchart illustrating operation examples of the terminal device 100 and the base station 200 according to an embodiment of the present disclosure. FIG. 18 illustrates an operation example when the terminal device 100 measures a CSI-RS for one antenna port on the basis of the request from the base station 200, and the base station 200 generates a beam directed to the terminal device 100 on the basis of the report from the terminal device 100. The operation examples of the terminal device 100 and the base station 200 according to an embodiment of the present disclosure will be described below using FIG. 18.

Because processing from step S101 to S110 is similar to the processing illustrated in FIG. 17, detailed description will be omitted In this operation example, it is assumed that the terminal device 100 selects only one antenna port and transmits antenna port selection information to the base station 200.

The base station 200 which receives the channel state report from the terminal device 100 allocates a PDSCH to a cell specific beam in accordance with the report from the terminal device 100 (step S121). The allocation in step S121 is performed by the control unit 253.

After the base station 200 allocates the PDSCH to the cell specific beam in step S121, the base station 200 transmits the allocated PDSCH and DM-RS to the terminal device 100 with the cell specific beam (step S122). The transmission in step S122 is performed by the control unit 253 through the antenna unit 210.

The terminal device 100 that can receive the PDSCH from the base station 200 transmits a reception reply (ACK) to the base station (step S123). Further, the terminal device 100 that fails to receive the PDSCH from the base station 200 transmits a reception reply (NACK) to the base station (step S123). The control unit 143 transmits a reception reply in step S123 through the antenna unit 110.

(Operation Example 2) Channel Stale Report in the Case Where Terminal Selects Antenna Ports (16 Antenna Ports)

A channel state report in the case where the terminal device 100 selects antenna ports will be described next. Here, as illustrated in FIG. 3, a case will be described where the antenna unit 210 of the base station 200 is configured such that an antenna array configured with 8×8 antenna elements and 16 transceiver units (TXRUs) are disposed with analog fixed phase shifters put therebetween, and the base station 200 in which the antenna unit 210 is configured in this manner provides FD-MIMO.

The base station 200 beamforms and transmits a CSI-RS from each TXRU with an antenna weighting factor w set for each antenna element using a sub array configured with four antenna elements. In the case where there are more than eight antenna ports, such a case cannot be supported by the CSI Reference Signal Configuration of related an.

There exist 40 resource elements which can be used for a CSI-RS in one subframe. In the present embodiment, in order to support 16 antenna ports, for example, a case of 16 antenna ports is added to CSI Reference Signal Configuration 1, and a frequency offset by antenna ports of CSI-RS resource elements is expanded to 16 antenna ports.

FIG. 19 is an explanatory diagram illustrating an example of CSI Reference Signal Configuration 1 to which a case of 16 antenna ports is added. Further, Table 5 is a table indicating an example where a frequency offset by antenna ports of CSI-RS resource elements is expanded to 16 antenna ports.

TABLE 5

| (Frequency offset value of resource elements) | |
|---|---|
| Antenna Ports | Normal Cyclic Prefix |
| 15, 16 | 0 |
| 17, 18 | −6 |
| 19, 20 | −1 |
| 21, 22 | −7 |
| 23, 24 | −2 |
| 25, 26 | −8 |
| 27, 28 | −3 |
| 29, 30 | −9 |

(Notification of CSI-RS Configuration Information from Base Station to Terminal)

The base station 200 notifies the terminal device 100 which supports FD-MIMO of the CSI Reference Signal Configuration (CSI-RS configuration information) through RRC signaling. In the operation example 2, in a similar manner, the CSI Reference Signal Configuration includes an Antenna port count, a CSI reference Signal configuration, a Subframe configuration, or the like.

The Antenna port count indicates the number of antenna ports forming the CSI-RS. In the operation example 2, it is assumed that tire number of antenna pons forming the beamformed CSI-RS is 16.

The CSI reference Signal configuration is indicated with a value from 0 to 31. and a resource element (k, l) and a time slot to be used by the CSI-RS are determiner from a look-up table defined in 3GPP TS36.211 table 6.10.5.2-1, or the like. In the operation example 2, for example. CSI reference Signal configuration 1 is notified, and resource element positions to be used by the antenna ports 15 to 30 are respectively (11, 2), (11, 2), (5, 2), (5, 2), (10, 2), (10, 2), (4, 2), (4, 2), (9, 2), (9, 2), (3, 2), (3, 2), (8, 2), (8, 2), (2, 2) and (2, 2) on odd-numbered slots.

The Subframe configuration is indicated with a value from 0 to 154, and CSI-RS periodicity and a CSI-RS subframe offset are provided from a look-up table defined in 3GPPTS36.21 1 table 6.10.5.3-1.

In this operation example 2, the base station 200 in which the number of antenna ports forming the CSI-RS is 16, notifies the terminal device 100 of the CSI-RS configuration information indicating a resource with which the CSI-RS is to be transmitted through RRC signaling. Because flow thereafter is similar to that in the case of the operation example 1. detailed description will be omitted.

(Operation Example 3) Channel State Report in the Case Where Base Station Selects Antenna Ports for Each Terminal Device In the operation examples 1 and 2, examples where the terminal device 100 selects antenna ports have been described. In this operation example 3, an example where the base station 200 selects antenna ports for each terminal device 100 in advance will be described.

Here, as illustrated in FIG. 15, a case will be described where the antenna unit 210 of the base station 200 is configured such that an antenna array configured with 8×8 antenna elements and 8 transceiver units (TXRUs) are disposed with analog fixed phase shifters put therebetween, and the base station 200 in which the antenna unit 210 is configured in this manner provides FD-MIMO.

The terminal device 100c illustrated in FIG. 16 is located at a position where a CSI-RS beam 2 (TXRU Beam 2) and a CSI-RS beam 3 (TXRU Beam 3) can be received. The base station 200 can estimate which terminal device can detect each CSI-RS beam.

For example, the terminal device 100c may have delected a CSI-RS as a Discovery Reference Signal and have reported the CSI-RS lo the base station 200. Further, for example, the terminal device 100c may notify the base station 200 of some position information. Still further, for example, the terminal device 100c may notify the base station of a measurement report including a measurement result of the CSI-RS. The terminal device 100c may include information of the antenna ports selected by the terminal device 100c in this measurement report.

Further, for example, the base station 200 can also receive an uplink SRS from the terminal device 100c and infer an angle of the terminal device 100c and proper antenna port selection.

The base station 200 notifies the respective terminal devices 100a to 100e of the CSI-RS configuration information relating to a plurality of selected antenna ports which can be allocated to the respective terminal devices 100a to 100c. For example, the base station 200 may notify the terminal device 100c of a total of three pieces of the CSI-RS configuration information (CSI process) relating to the selected antenna ports of the CSI-RS configuration information (CSI process 0) relating to antenna ports forming all the CSI-RS beams, the CSI-RS configuration information (CSI process 1) relating to antenna ports forming the CSI-RS beam 3, and the CSI-RS configuration information (CSI process 2) relating to antenna ports forming the CSI-RS beams 2 and 3.

The terminal devices 100a to 100c select optimum CSI-RS configuration information relating to the selected antenna ports among the plurality of pieces of CSI-RS configuration information relating to the selected antenna ports and make a channel state report at the antenna ports to the base station 200. For example, the terminal device 100c makes a channel state report relating to the CSI-RS beam 2 and the CSI-RS beam 3 to the base station 200. The base station 200 can know an optimum weighting factor lo be multiplied by a preceding stage of the TXRU 2 and the TXRU 3 for a PDSCH to be allocated to the terminal device 100c from the channel state report from the terminal device 100c. Then, as illustrated in FIG. 4, the base station 200 cart form a PDSCH beam of the terminal device 100c and transmit the PDSCH beam.

(Notification of CSI Reporting Mode from Base Station to Terminal)

The base station 200 notifies the terminal device 100 which supports FD-MIMO and which makes an RRC connection request, of CQI-ReportConfig through RRC signaling. The CQI-ReportContig includes a CSI reporting mode, a CQI-PMI Configuration Index, or the like. Whether Periodic or Aperiodic, whether wideband or sub-band, whether or not a report of PMI is necessary, and whether beamformed CSI-RS or Non-beam formed CSI-RS are indicated by a type of the CSI reporting mode.

In the operation example 3. Reporting mode 4-1 indicated in Table 2 is notified. The Reporting mode 4-1 indicates Aperiodic, wideband, PMI, and higher layer configured beamform CSI-RS. In a case of the Aperiodic CSI reporting, for example, reporting is triggered by the CSI Request by DCI format 0 and 4 on the PDCCH. The terminal device 100 transmits a CSI report four subframes after the CSI request is received.

(Notification of CSI-RS Configuration Information and CSI Process Information from Base Station to Terminal)

The base station 200 notifies the terminal device 100 which supports FD-MIMO of the CSI Reference Signal Configuration (CSI-RS configuration information) through RRC signaling. In the operation example 3, in a similar manner, the CSI Reference Signal Configuration includes an Antenna port count, a CSI reference Signal configuration, a Subframe configuration, or the like.

The Antenna port count indicates the number of antenna ports forming the CSI-RS. In the operation example 3, it is assumed that the number of antenna ports forming the beamformed CSI-RS is eight. For example, a CSI-RS beam 1, a CSI-RS beam 2, a CSI-RS beam 3 and a CSI-RS beam 4 are respectively transmitted at an antenna port 15, an antenna port 16, an antenna port 17 and an antenna port 18. Description of other four antenna ports and CSI-RS beams will be omitted here.

In this operation example 3, the base station 200 notifies, for example, a certain terminal device 100 of combination of three CSI Reference Signal Configurations by notifying the terminal device 100 of three pieces of CSI process information. CSI process 0 is CSI-RS configuration information relating to eight antenna ports (antenna ports 15 to 22) forming ail the CSI-RS beams, CSI process 1 is CSI-RS configuration information relating to one antenna port (antenna port 17) forming the CSI-RS beam 3, and CSI process 2 is CSI-RS configuration information relating to two antenna ports (antenna ports 16 and 17) forming the CSI-RS beam 2 and the CSI-RS beam 3.

The CSI reference Signal configuration is indicated with a value from 0 to 31, and a resource element (k, l) and a time slot to be used by the CSI-RS are determined from a look-up table defined in 3GPP TS36.211 table 6.10.5.2-1, or the like. In the operation example 3, the base station 200 notifies the terminal device 100 that, for example, the number of antenna ports is eight and CSI reference Signal configuration 0 in the CSI-RS configuration information of CSI process 0. The resource element positions to be used by the antenna ports 15 to 22 are respectively (9, 5), (9, 5), (3, 5), (3, 5), (8, 5), (8, 5), (2, 5) and (2, 5). The base station 2(H) makes a notification that the number of antenna ports is one and CSI reference Signal configuration 10 in the CSI-RS configuration information of CSI process 1, and the resource element position to be used by the antenna port 17 is (3, 5).

The base station 200 notifies the terminal device 100 of two CSI reference Signal configurations, (hat the number of antenna ports is one and the CSI reference Signal configuration associated with CSI reference Signal configuration 0, and that the number of antenna ports is one and the CSI reference Signal configuration associated with CSI reference Signal configuration 10, in the CSI-RS configuration information of CSI process 2. The resource element positions to be used by the antenna ports 16 and 17 are respectively (9, 5) and (3, 5).

In this manner, in the operation example 3, the base station 200 infers appropriate combination of antenna ports and the beamformed CSI-RS for each terminal device 100 among eight antenna ports for which the beamformed CSI-RS is actually transmitted, and notifies each terminal device 100 of the combination as CSI process information through RRC signaling. In the case where the CSI process information includes a plurality of pieces of CSI-RS configuration information as in CSI process 2, the terminal device 100 reports CQI, PMI and RI for the CSI-RS transmitted at a plurality of antenna ports, obtained by integrating a plurality of pieces of CSI-RS configuration information.

In the above-described example, a method for notifying the terminal device 100 of the CSI process information including one or a plurality of pieces of CSI-RS configuration information has been described as a method for notifying the terminal of the CSI-RS configuration information relating to the selected antenna ports. The base station 200 may also form the CSI-RS configuration information relating to the selected antenna ports with, for example, configuration information of all antenna ports of the beamformed CSI-RS and antenna port selection information. For example, the base station 200 may form the CSI-RS configuration information relating to two antenna ports (antenna ports 16 and 17) forming the CSI-RS beam 2 and the CSI-RS beam 3 with the CSI-RS configuration information indicating that the number of antenna ports is eight and CSI reference Signal configuration 0, and antenna port selection information indicating selection of antenna ports 16 and 17 in a bit map of eight bits (for example, 01100000).

(Notification of CSI Request from Base Station to Terminal)

A timing of a channel state report is triggered by the CSI Request by, for example, DCI format 0 and 4 on the PDCCH in a case of Aperiodic CSI reporting. For example, as indicated in the above-described Table 4, in the present embodiment, the CSI Request is a total of three bits by bits corresponding to the beamformed CSI-RS being added. The terminal device 100 can recognize that a request is a request with respect to a channel slate report to the beamformed CSI-RS in the case where a most significant bit is "1" by confirming content of the CSI request indicated in Table 4. The terminal device 100 can further discern a plurality of pieces of CSI process with a lower bit.

(Channel State Report)

A channel state report from the terminal device 100 is made four subframes after the CSI Request from the base station 200 in a form in which CQI, PMI, PTI, RI and selection information of antenna ports are included in the UCI, In the case where a plurality pieces of CSI process are allocated to the terminal device 100, the terminal device 100 makes a channel state report for each piece of CSI process. The terminal device 100 may select CSI process information associated with appropriate antenna ports among a plurality of pieces of CSI process information to make a channel state report, or may insert an error code into a channel state report relating to an antenna port at which reception cannot be performed to notify the base station 200 of the error code.

A terminal device which does not support a function of reporting a CSI-RS to be beamformed (hereinafter, such a terminal device will be also referred to as a "legacy terminal") can also make a channel state report without the need for special operation by the base station notifying the terminal of CSI-RS configuration information formed by estimating an antenna port appropriate for the terminal.

The base station 200 may redundantly form the same CSI-RS configuration information for a plurality of pieces of CSI process information. Further, the base station 200 may notify the terminal device 100 of the CSI process information and the CSI-RS configuration information having a different configuration for each terminal device 100 to notify the terminal device 100 of optimum CSI process information and CSI-RS configuration information for each terminal device 100.

In the case where the terminal device 100 in an RRC-_CONNECTED state detects a beamformed CSI-RS as a Discovery reference signal and reports CSI reference signal received power (CSI-RSRP) to the base station 200, the base station 200 may notify the terminal device 100 of CSI-RS configuration information relating to the beam detected by the terminal device 100.

In the case where an error code is inserted into the channel state report from the terminal device 100, the base station 200 may judge whether the CSI-RS configuration information notified to the terminal device 100 is appropriate with reference to the CSI-RSRP measured and reported by the terminal device 100 on the basis of the CSI-RS configuration information notified from the base station 200 to the terminal device 100. In the case where the CSI-RS configuration information notified to the terminal device 100 is not appropriate, the base station 200 can further correct the CSI-RS configuration information and generate an optimum configuration for the terminal device 100.

Figure 20:
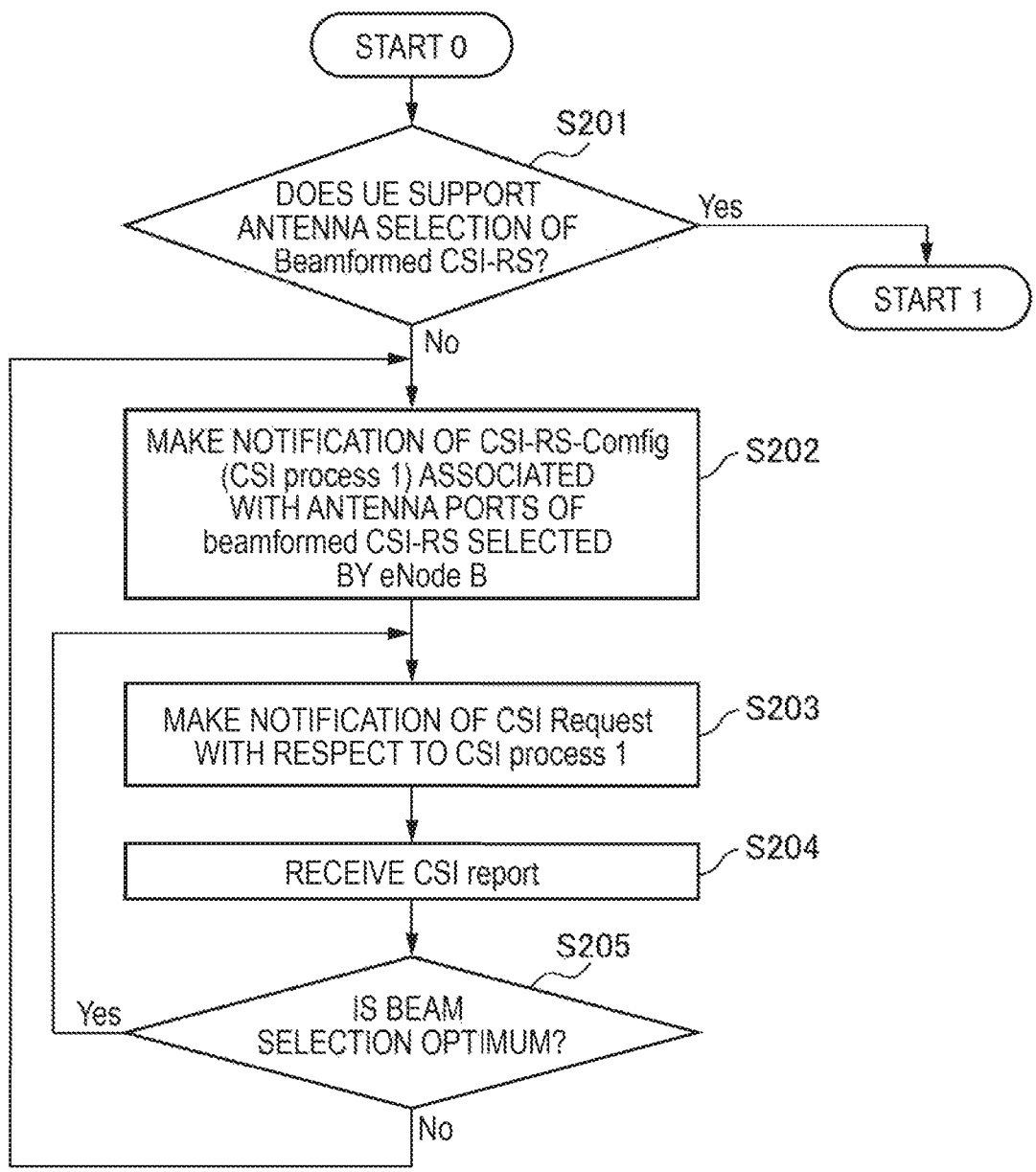
FIG. 20 is a flowchart illustrating an operation example of the base station 200 according to the present embodiment.

FIG. 20 is a flowchart illustrating an operation example of the base station 200 according to the present embodiment. FIG. 20 illustrates an operation example of the base station 200 according to the present embodiment when the base station 200 notifies the terminal device 100 which is a legacy terminal of a CSI request and receives a CSI Report from the terminal device 100. The operation example of the base station 200 according to the present embodiment will be described below using FIG. 20.

The base station 200 judges whether the terminal device 100 which tries to transmit a CSI-RS supports antenna selection of a beamformed CSI-RS (step S201). The judgment in step S201 is executed by, for example, the control unit 253

As a result of the judgment in step S201, if the terminal device 100 which tries to transmit a CSI-RS supports antenna selection of a beamformed CSI-RS (step S201: Yes), the base station 200 shifts the processing to processing supporting antenna selection of a beamformed CSI-RS which will be described later.

On the other hand, as a result of the judgment in step S201, if the terminal device 100 which tries to transmit a CSI-RS does not support antenna selection of a beamformed CSI-RS (step S201: No), the base station 200 notifies the terminal device 100 of the CSI-RS configuration information (CSI process 1) associated with the selected antenna ports of the beamformed CSI-RS (step S202). The notification in step S202 is made by the control unit 253 through the antenna unit 210.

When the terminal device 100 is notified of the CSI-RS configuration information (CSI process 1) associated with the selected antenna ports of the beamformed CSI-RS in the above-described step S202, subsequently, tire base station 200 notifies the terminal device 100 of a CSI request with respect to the CSI process 1 (step S203). The notification in step S203 is made by the control unit 253 through the antenna unit 210.

When the base station 200 notifies the terminal device 100 of tire CSI request with respect to the CSI process 1 in step S203, the base station 200 subsequently receives a CSI report in response to the CSI request from the terminal device 100 (step S204).

Then, when the base station 200 receives the CSI report from the terminal device 100 in step S204, the base station 200 judges whether a beam optimum for the terminal device 100 is selected (step S205). The judgment in step S205 is made by the control unit 253.

As a result of the judgment in the above-described step S205, if a beam optimum for the terminal device 100 is selected (step S205: Yes), the processing of the base station 200 returns to CSI request notification processing in the above-described step S203. On the other hand, as a result of the judgment in the above-described step S205, if a beam optimum for the terminal device 100 is not selected (step S205: No), the processing of the base station 200 returns to CSI-RS configuration (CSI process 1) notification processing in the above-described step S202.

The base station 200 can cause the terminal device 1(H) to make a channel state report by executing the above-described series of operation even if the terminal device 100 which tries to transmit a CSI-RS does not support antenna selection of a beam formed CSI-RS.

(Operation Example 4) Channel State Report Through Transition of CSI Reporting Mode A CSI reporting mode (see. Or example. Table 2) to be notified to a terminal which supports FD-MIMO, may be a UE selected beamform reporting mode or may be a higher layer configured beamform reporting mode.

For example, in the case where the terminal device 100 performs beam selection in the UE selected beamform reporting mode once, the terminal device 100 may shift the mode to the higher layer configured beamform reporting mode next time and thereafter By shifting the mode, the terminal device 100 can lighten the beam selection processing or can reduce overhead.

Further, for example, in the case where an error code is transmitted from the terminal device 100 allocated lo the higher layer configured beamform reporting mode, the base station 200 can cause the terminal device 100 to execute beam selection again by shifting the mode to the UE selected beamform reporting mode.

Figure 21:
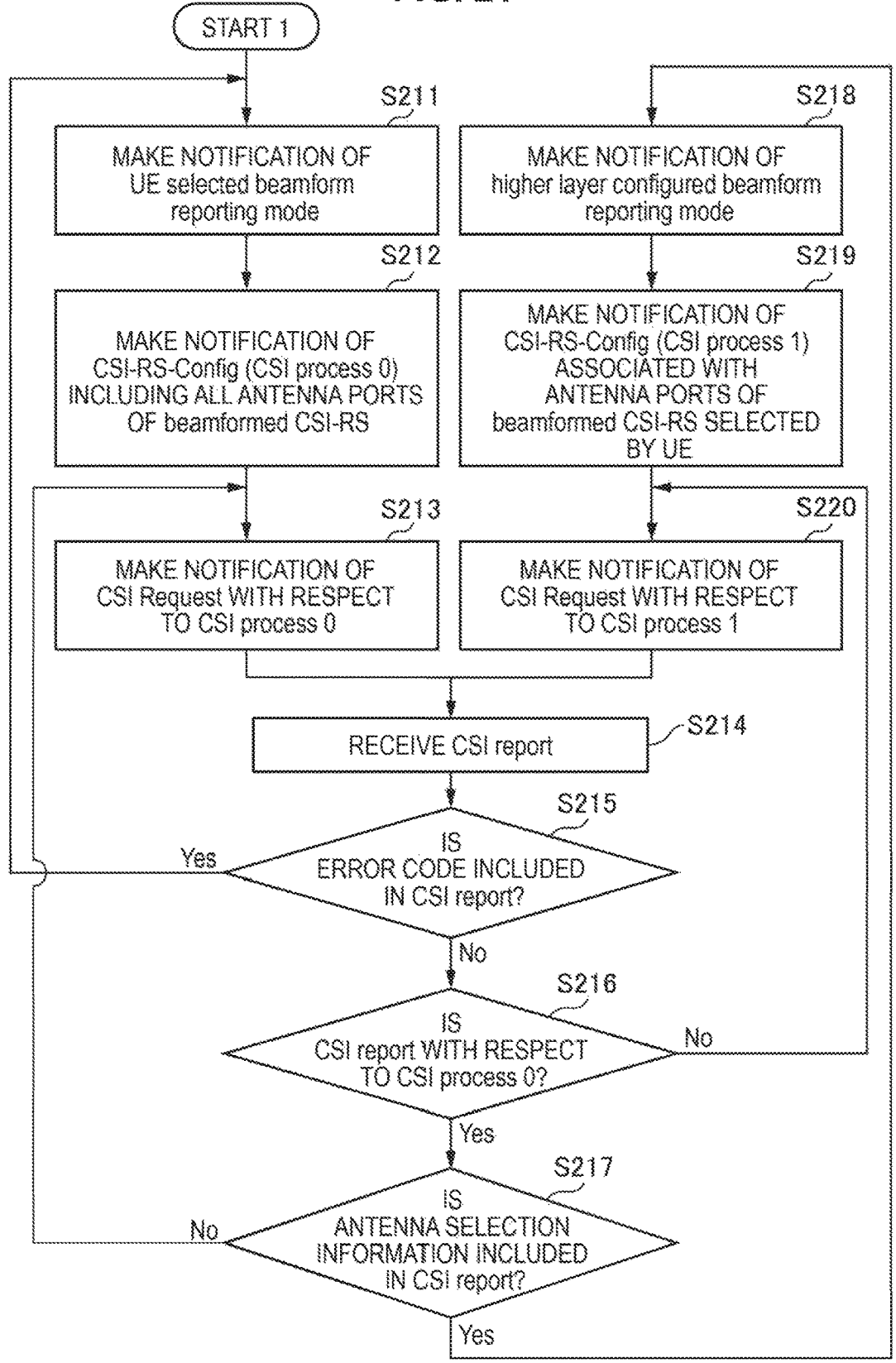
FIG. 21 is a flowchart illustrating an operation example of the base station 200 according to the present embodiment.

FIG. 21 is a flowchart illustrating the operation example of the base station 200 according to the present embodiment. FIG. 21 illustrates an operation example of the base station 200 according to the present embodiment which notifies the terminal device 100 which is not a legacy terminal, of a CSI request and receives a CSI Report from the terminal device 100. The operation example of the base station 200 according to the present embodiment will be described below using FIG. 21.

As a result of the judgment in step S201 in FIG. 20, if the terminal device 100 supports antenna selection of a beamformed CSI-RS, subsequently, the base station 200 first notifies the terminal device 100 of the UE selected beamform reporting mode as the reporting mode (step S211). The notification in step S211 is made by the control unit 253 through the antenna unit 210.

If the terminal device 100 is notified of the reporting mode in step S211, subsequently, the base station 200 notifies the terminal device 100 of the CSI-RS configuration information (CSI process 0) associated with all antenna ports of the beamformed CSI-RS (step S212). The notification in step S212 is made by the control unit 253 through the antenna unit 210.

If the terminal device 100 is notified of the CSI-RS configuration information (CSI process 0) associated with all antenna ports of the beamformed CSI-RS in the above-described step S212 subsequently, the base station 200 notifies the terminal device 100 of a CSI request with respect to CSI process 0 (step S213). The notification in step S213 is made by the control unit 253 through the antenna unit 210.

If the base station 200 notifies the terminal device 100 of the CSI request with respect to CSI process 0 in step S213, subsequently, die base station 200 receives a CSI report in response to the CSI request from the terminal device 100 (step S214).

If the base station 200 receives the CSI report in response to the CSI request from the terminal device 100 in step S214, the base station 200 judges whether an error code is included in the CSI report (step S215). The judgment in step S215 is made by, for example, the control unit 253.

As a result of the judgment in step S215, if an error code is included in the CSI report (step S215: Yes), the processing returns to processing of the base station 200 notifying the terminal device 100 of the UE selected beamform reporting mode as the reporting mode in the above-described step S211.

On the other hand, as a result of the judgment in step S215, if an error code is not included in the CSI report (step S215: No), subsequently, the base station 200 judges whether the CSI report is a report with respect to CSI process 0 (step S216). The judgement in step S216 is made by, for example, the control unit 253.

As a result of the judgment in step S216, if the CSI report is a report with respect to CSI process 0 (step S216: Yes), subsequently, the base station 200 judges whether antenna selection information is included in the CSI report (step S217). The judgment in step S217 is made by, for example, the control unit 253.

As a result of the judgment in step S217, if the antenna selection information is not included in the CSI report (step S217: No), the processing returns to processing of the base station 200 notifying the terminal device 100 of the CSI request with respect to CSI process 0 in the above-described step S213.

On the other hand, as a result of the judgment in step S217, if the antenna selection information is included in the CSI report (step S217: Yes), subsequently, the base station 200 notifies the terminal device 1(H) of the higher layer configured beamform reporting mode as the reporting mode (step S218). The notification in step S218 is made by the control unit 253 through the antenna unit 210.

If the terminal device 100 is notified of the reporting mode in step S218, subsequently, the base station 200 notifies the terminal device 100 of the CSI-RS configuration information (CSI process 1) associated with antenna ports of the beamformed CSI-RS selected by the terminal device 100 (step S219). The notification in step S219 is made by the control unit 253 through the antenna unit 210.

If the terminal device 100 is notified of the CSI-RS configuration information (CSI process 1) associated with antenna ports of the beamformed CSI-RS selected by the terminal device 100 in the above-described step S219, subsequently, the base station 200 notifies the terminal device 100 of a CSI request with respect to the CSI process 1 (step S220). The notification in step S220 is made by the control unit 253 through the antenna unit 210.

If the base station 200 notifies the terminal device 100 of the CSI request with respect to CSI process 1 in step S220, subsequently, the base station 200 receives a CSI report in response to the CSI request from the terminal device 100 (step S214).

Note that, as a result of the judgment in the above-described step S216, if there is no CSI report with respect to CSI process 0 (step S216: No), subsequently, the processing returns lo processing of the base station 200 notifying the terminal device 100 of the CSI request with respect to CSI process 1 in the above-described step S219.

The operation example of the base station 200 has been described above. Subsequently, an operation example of the terminal device 100 will be described.

Figure 22B:
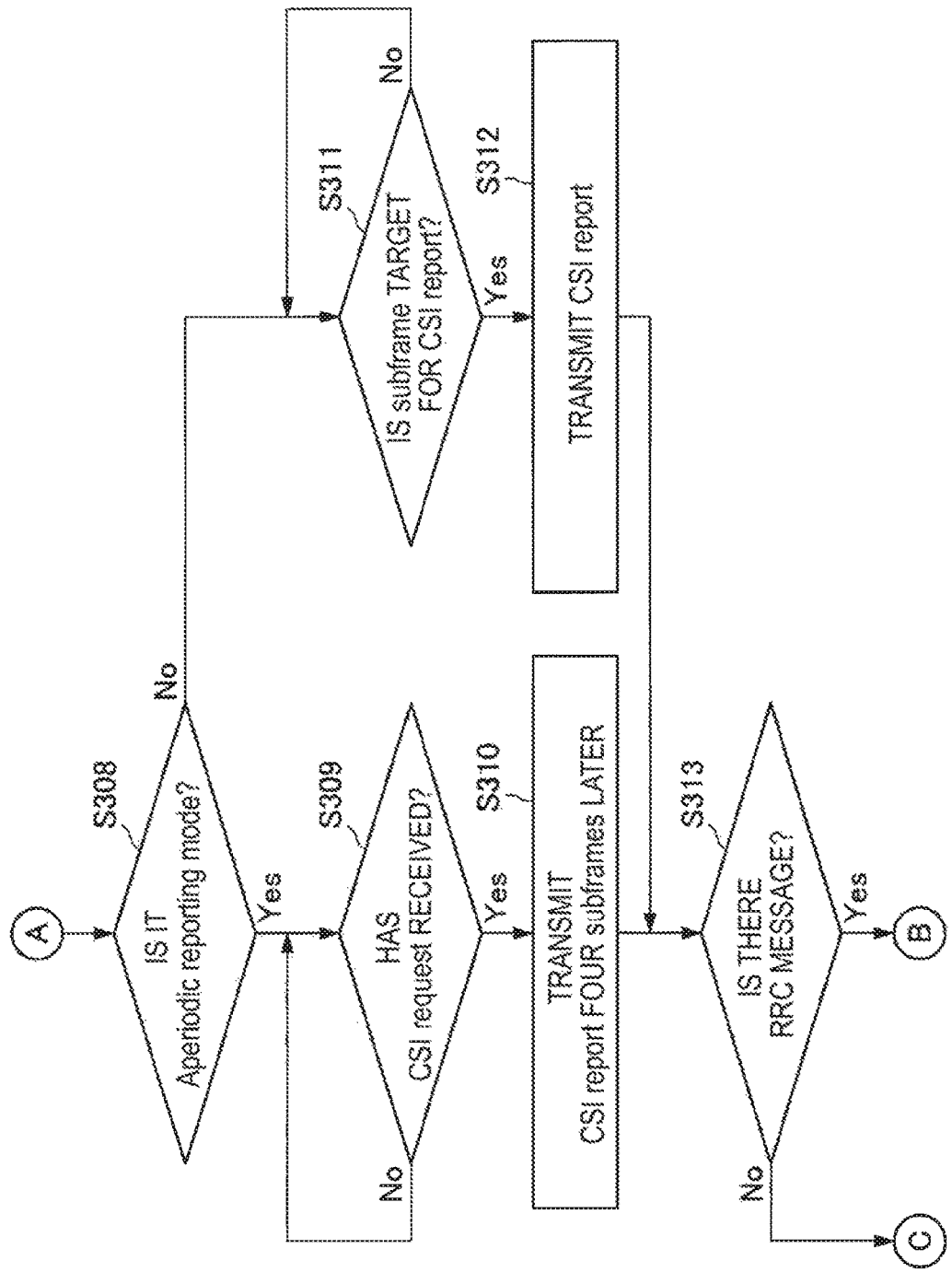
FIG. 22B is a flowchart illustrating an operation example of the terminal device 100 according to the present embodiment.

FIG. 22A and FIG. 22B are flowcharts illustrating the operation example of the terminal device 100. FIG. 22A and FIG. 22B illustrate an operation example of the terminal device 100 when the terminal device 100 receives the reporting mode and the CSI process information from the base station 200 and transmits the CSI report to the base station 200. The operation example of the terminal device 100 will be described below using FIG. 22A and FIG. 22B.

The terminal device 100 in an RRC_CONNECTED state receives the reporting mode of the CSI from the base station 200 (step S301) and receives the CSI process information and the CSI-RS configuration information associated with antenna ports of the beamformed CSI-RS (step S302).

The terminal device 100 which receives the reporting mode of the CSI, the CSI process information and the CSI-RS configuration information associated with antenna ports of the beamformed CSI-RS from the base station 200 measures the beamformed CSI-RS (step S303). The measurement in step S303 is executed by, for example, the control unit 143.

If the beamformed CSI-RS is measured in step S303, subsequently, the terminal device 100 judges whether the reporting mode received in the above-described step S301 is the UE selected beamform reporting mode or the higher layer configured beamform reporting mode (step S304). The judgment in step S304 is executed by. Or example, the control unit 143.

As a result of the judgment in step S304, if the reporting mode is the UE selected beamform reporting mode, the terminal device 100 selects an antenna port to create a channel state report value (step S305). The creation in step S305 is executed by, for example, the control unit 143.

On the other hand, as a result of the judgment in step S304, if the reporting mode is the higher layer configured beamform reporting mode, tire terminal device 100 selects the CSI process information (step S306), and creates channel slate report values for all the antenna ports (step S307). The selection in step S306 and the creation in step S307 are executed by, for example, the control unit 143.

Subsequently, the terminal device 100 judges whether the reporting mode is the Aperiodic reporting mode (step S308). The judgment in step S308 is executed by, for example, the control unit 143.

As a result of the judgment in step S308, if the reporting mode is the Aperiodic reporting mode (step S308: Yes), the terminal device 100 judges whether the CSI request is received (step S309). The judgment in step S309 is executed by, for example, the control unit 143.

As a result of the judgment in the above-described step S309, if it is judged that the CSI request is received (step S309: Yes), the terminal device 100 transmits the CSI report four subframes later (step S310). The transmission in step S210 is performed by, for example, the control unit 143 through the antenna unit 110.

On the other hand, as a result of the judgment in step S308, if the reporting mode is not the Aperiodic reporting mode (step S308: No), that is, the reporting mode is (he Periodic reporting mode, the terminal device 100 judges whether a current subframe is a subframe which is a target for the CSI report (step S311). The judgment in step S311 is executed by, for example, the control unit 143.

As a result of the judgment in the above-described step S311, if it is judged that the current subframe is a subframe which is a target for the CSI report (step S311: Yes), the terminal device 100 transmits the CSI report (step S312). The transmission in step S312 is performed by. Or example, the control unit 143 through the antenna unit 110.

Subsequently, the terminal device 100 judges whether there is an RRC message from the base station 200 (step S313). The judgment in step S313 is executed by, for example, the control unit 143. As a result of the judgment in step S313, if it is judged that there is an RRC message from the base station 200 (step S313: Yes), the processing returns to processing of the terminal device 100 receiving the reporting mode of the CSI in the above-described step S301. On the other hand, as a result of the judgment in step S313, if it is judged that there is no RRC message from the base station 200 (step S313: No), the processing returns to processing of the terminal device 100 measuring the beamformed CSI-RS in the above-described step S303.

(Operation Example 5) Handover from Macro Cell to Beam

In this operation example 5. handover processing from a macro cell to a beam served in an adjacent cell as illustrated in FIG. 8 will be described.

The base station 200 notifies the terminal device 100 in an RRC_CONNECTED state of configuration information of a beamformed CSI-RS to be transmitted from the base station 200, and configuration information of a beamformed CSI-RS to be transmitted from the adjacent cell. The terminal device 100 regularly measures a serving cell indicated in the CSI-RS configuration information and reception strength of the beamformed CSI-RS (CSI-RSRP) of the adjacent cell, in the case where conditions for a trigger event are satisfied, the terminal device 100 reports the measurement result to the base station 200. In the case where it is judged that a criterion for handover is satisfied from the measurement report from the terminal device 100, the base station 200 notifies the adjacent cell of a handover request.

(Notification of CSI Process from Base Station to Terminal)

The base station 200 notifies the terminal device 100 which supports FD-MIMO of the CSI process information through RRC signaling. The CSI process information includes configuration information of the beamformed CSI-RS (Non-zero Power CSI-RS configuration information) to be transmitted from the base station 200, configuration information of resources which are not to be used by the base station 200 for transmission of the CSI-RS (Zero Power CSI-RS configuration information) and configuration information of the beamformed CSI-RS to be transmitted from the adjacent cell (CSI-IM configuration information).

When the terminal device 100 receives the CSI process information including the CSI-RS configuration information of the adjacent cell, the terminal device 100 regularly performs measurement on this CSI process. The terminal device 100 reports the measurement result to the base station 200 in the case where conditions for a trigger event are satisfied. In the case where there are a plurality of adjacent cells which transmit the beamformed CSI-RS, the base station 200 may notify the terminal device 100 of a plurality of pieces of the CSI process information or may notify the terminal device 100 of one piece of the CSI process information in which information of a plurality of adjacent cells is integrated. Because a position and a beam which receives service are different depending on individual terminal devices 100, the CSI process information to be notified may be different for each terminal device 100.

Each of the Non-zero Power CSI-RS configuration information, the Zero Power CSI-RS configuration information and the CSI-IM configuration information includes an Antenna port count, a CSI reference Signal configuration, a Subframe configuration, a CSI-RS configuration ID, or the like.

The Antenna port count indicates the number of antenna ports forming the CSI-RS.

The CSI reference Signal configuration is indicated with a value from 0 to 31. and a resource element (k, l) and a time slot to be used by the CSI-RS are determined from a look-up table defined in 3GPP TS 36.211 table 6.10.5.2-1. or the like.

The subframe configuration is indicated with a value from 0 to 154, and CSI-RS periodicity and a CSI-RS subframe offset are provided in accordance with a look-up table defined in 3GPP TS 36.211 table 6.10.5.3-1.

The CSI-RS configuration ID is used for identifying the CSI-RS configuration information.

(Measurement of CSI-RSRP and CSI-RSRQ by Terminal)

The terminal device 100 regularly measures RSRP for CRSs transmitted from a serving cell and an adjacent cell on the basis of the specification of related art. Further, the terminal device 100 which supports FD-MIMO measures CSI-RSRP (average power per resource element in the whole band) for a CSI-RS at a resource position indicated in the Non-zero Power CSI-RS configuration information. In the case where there are a plurality of antenna ports indicated in tire Non-zero Power CSI-RS configuration information, the terminal device 100 measures a CSI-RS for, for example, an antenna port with maximum reception power. The measurement can be executed by the control unit 143.

Further, the terminal device 100, for example, measures CSI-RSRP (CSI-IM-RSRP) for a CSI-RS at a resource position indicated in the CSI-IM configuration information. The terminal device 100 may measure CSMM-RSRP for a CSI-RS at a resource position where the CSI-IM configuration information overlaps with the Zero Power CSI-RS configuration information. In the case where part of the CSI-RS transmitted from the adjacent cell overlaps with the Non-zero Power CSI-RS, the terminal device 100 can accurately measure a CSI-RS of the adjacent cell at a resource position where the CSI-IM configuration information overlaps with the Zero Power CSI-RS configuration information. In the case where the terminal device 100 is notified of a plurality of pieces of CSI-IM configuration information, the terminal device 100 sets a measurement value relating to an antenna port where the CSI-RS configuration information of an adjacent cell with the largest reception strength is received at maximum reception power, as CSMM-RSRP.

The terminal device 100 obtains CSI reference signal received Quality (CSI-RSRQ) from the CSI-RSRP of the CSI-RS indicated in the Non-zero Power CSI-RS configuration information and the CSMM-RSRP of the CSI-RS indicated in the CSI-IM configuration information as expressed with equation 2.

[Math. 2]

$$CSI\_RSRQ = \frac{CSI\_RSRP}{CSI\_RSRP + CSI\_IM\_RSRP} \quad \text{(equation 2)}$$

An example where a measurement value of the CSI-RS relating lo certain one antenna port with a maximum reception power is set as CSI-RSRP has been described above for measurement of the CSI-RSRP. As another method, for example, in the case where the terminal device 100 selects a plurality of antenna ports which are part of the plurality of antenna ports indicated in the CSI-RS configuration information, RSRP of a CSI-RS calculated assuming that a weighting factor which makes CSI-RS reception power from (he antenna ports selected by the terminal device 100 a maximum is to be multiplied may be set as the CSI-RSRP.

Further, for example, as another method, in the case where a plurality of antenna ports are indicated in the CSI-IM configuration information, and CSI-RSs of a plurality of antenna ports of an adjacent cell are detected by the terminal device 100, RSRP of a CSI-RS calculated assuming that a weighting factor which makes reception power of the plurality of CSI-RSs a maximum is to be multiplied may be set as the CSI-IM-RSRP. Also in this case, in the case where the terminal device 100 is notified of a plurality of pieces of CSI-IM configuration information, the terminal device 100 obtains CSI-IM-RSRP for CSI-RS configuration information of an adjacent cell with the largest reception strength.

(Transmission of Measurement Report from Terminal to Base Station)

The terminal device 100 measures a measurement target and, in the case where the acquired measurement result satisfies, for example, conditions for a trigger event, the terminal device 100 transmits a measurement report to the base station 200. As the measurement target, in addition to RSRP and RSRQ of a CRS of a serving cell which have also existed in related art, and RSRP and RSRQ of a CRS of an adjacent cell, there can be CSI-RSRP and CSI-RSRQ of a CSI-RS indicated in the Non-zero Power CSI-RS configuration information and CSI-IM-RSRP of a CSI-RS to be transmitted from the adjacent cell. In this operation example 5, an example of handover from a macro cell to a beam while RSRP of a CRS of a serving cell is set as a measurement target of a serving cell, and CSI-IM-RSRP of a CSI-RS to be transmitted from the adjacent cell is set as a measurement target of the adjacent cell will be described. Note that the terminal device 100 may set RSRP or RSRP of a CRS of a serving cell as a measurement target of the serving cell and may set RSRP or RSRQ of a beamformed CSI-RS as a measurement target of an adjacent cell.

As the trigger event, for example, the following six events which have been defined in related art are used.

Event A1: Serving cell becomes better than a threshold
Event A2: Serving cell becomes worse than a threshold
Event A3: Neighbour cell becomes better than the serving cell by an offset
Event A4: Neighbour cell becomes better than a threshold
Event A5: Serving cell becomes worse than threshold 1 while neighboring cells becomes better than threshold 2
Event A6: Neighbour cell becomes better than a secondary cell by an offset In this operation example 5, an example of handover from a macro cell to a beam using Event A3 will be described.

Event A3 is a trigger in the case where a measurement value of an adjacent cell becomes greater than a value obtained by adding an offset to a measurement value of a serving cell. Entering condition and Leaving condition are defined as follows.

$$Mn+Ofn+Ocn-Hys>Mp+Ofp+Ocp+Off \quad \text{Inequality A3-1 (Entering condition)}$$

$$Mn+Ofn+Ocn+Hys<Mp+Ofp+Ocp+Off \quad \text{Inequality A3-2 (Leaving condition)}$$

In the above-described two equations, Mn is a measurement value of the adjacent cell. In a case of the operation example 5, Mn indicates CSI-IM-RSRP of a CSI-RS to be transmitted from the adjacent cell.

Further, Ofn indicates an offset value defined by a frequency of the adjacent cell.

Further, Ocn indicates an offset value of the adjacent cell determined for each cell Further, Mp is a measurement value of the serving cell. In a case of the operation example 5, Mp indicates RSRP of a CRS of the serving cell.

Further. Ofp indicates an offset value defined by a frequency of the serving cell.

Further. Ocp indicates an offset value of the service cell determined for each cell.

Further, Hys indicates hysteresis of this event.

Further. Off indicates an offset parameter of tins event.

Mn and Mp indicate RSRP in units of dBm and indicate RSRQ in units of dB. Ofn, Ocn, Ofp, Ocp, Hys and Off are indicated in units of dB.

That is, in the case where a value obtained by adding an offset value determined in advance to CSMM-RSRP of a CSI-RS to be transmitted from the adjacent cell is greater than a value obtained by adding an offset value determined in advance to RSRP of a CRS of the serving cell, the terminal device 100 notifies the base station 200 of the measurement report.

The terminal device 100 includes, for example, a measurement report ID, RSRP of a CRS as a measurement value of the service cell. CSMM-RSRP of a CSI-RS transmitted from the adjacent cell as a measurement value of the adjacent cell, an adjacent cell ID, or the like, in the measurement report which is to be notified to the base station 200. In a case of the measurement report in which CSI-RSRP is made a measurement target, the terminal device 100 may include, for example, a CSI-RS configuration ID in place of the adjacent cell ID.

The base station 200 determines whether the measurement result notified from rite terminal device 100 satisfies handover conditions. This determination can be executed by the control unit 253. In the case where the measurement result notified from the terminal device 100 satisfies the handover conditions, the base station 200 discerns a target cell from the CSI-RS configuration ID and notifies the target cell of a handover request.

In the case where the terminal device 100 reports RSRP calculated assuming that a weighting factor which makes reception power of CSI-RSs from a plurality of antenna ports of the adjacent cell a maximum is to be multiplied as CSMM-RSRP, the terminal device 100 may include, for example, information of the antenna ports selected by the terminal device 100 (for example, information indicating antenna port number) in the measurement report. The terminal device 100 may notify the base station 200 of a list of antenna port number as information of the selected antenna ports (for example, information indicating the antenna port number), or may notify the base station 200 of information indicating the selected antenna ports in a bit map corresponding to the antenna ports.

The base station 200 transmits a plurality of beamformed CSI-RSs using a plurality of antenna ports. When the terminal device 100 detects a CSI-RS and desires handover, the terminal device 100 reports the measurement report including the antenna ports of a CSI-RS at which reception can be performed to the base station 200. By this means, the base station 200 can select an antenna port appropriate for the terminal device 100 and notify the terminal device 100 of the CSI-RS configuration information.

(Operation Example 6) Handover from Beam to Beam

In this operation example 6, handover processing from a beam of a serving cell to a beam served at an adjacent cell as illustrated in FIG. 9 will be described.

Also in this operation example 6, in a similar manner to the operation example 5, the base station 200 notifies the terminal device 100 in an RRC_CONNECTED state of configuration information of a beamformed CSI-RS to be transmitted from the base station 200 and configuration information of a beamformed CSI-RS to be transmitted from the adjacent cell. The terminal device 100 regularly measures a serving cell indicated in the CSI-RS configuration information and reception strength of the beamformed CSI-RS (CSI-RSRP) of the adjacent cell. The terminal device 100 reports the measurement result to the base station 200 in the case where conditions for a trigger event are satisfied. In the case where it is judged that the measurement report from the terminal device 100 satisfies a criterion of handover, the base station 200 notifies the adjacent cell of a handover request.

In this operation example 6, because notification of the CSI process information from the base station to the terminal and measurement of CSI-RSRP and CSI-RSRQ by the terminal are similar to those in the operation example 5, detailed description will be omitted.

(Transmission of Measurement Report from Terminal to Base Station)

The terminal device 100 measures a measurement target, and, in the case where the acquired measurement result satisfies conditions for a trigger event, the terminal device 100 transmits a measurement report to the base station 200. As the measurement target, in addition to RSRP and RSRQ of a CRS of the serving cell which have also existed in related art, and RSRP and RSRQ of a CRS of the adjacent cell, there can be CSI-RSRP and CSI-RSRQ of a CSI-RS indicated in the Non-zero Power CSI-RS configuration information and CSI-IM-RSRP of a CSI-RS to be transmitted from the adjacent cell. In the operation example 6, an example of handover from a beam of the serving cell to a beam of the adjacent cell using Event A3 while CSI-RS-RP of a CSI-RS of the serving cell is set as a measurement target of the serving cell, and CSI-IM-RSRP of a CSI-RS transmitted from the adjacent cell as a measurement target of the adjacent cell will be described.

Event A3 is a trigger in the case where a measurement value of the adjacent cell becomes greater than a value obtained by adding an offset to a measurement value of the serving cell. Entering condition and Leaving condition are the same as those described in the operation example 5. In the case where a value obtained by-adding an offset value determined in advance to CSI-IM-RSRP of a CSI-RS to be transmitted from the adjacent cell is greater than a value obtained by adding an offset value determined in advance to CSI-RSRP of a CSI-RS of the serving cell, the terminal device 100 notifies the base station 200 of the measurement report.

Note that, while this operation example 6 is an example of handover from a beam of the serving cell to a beam while CSI-RSRP of a CSI-RS of the serving cell is set as the measurement target of the serving cell, and CSI-IM-RSRP of a CSI-RS to be transmitted from the adjacent cell is set as the measurement target of the adjacent cell, the terminal device 100 may set RSRP of the CRS of the serving cell or RSRP of the CRS of the adjacent cell as the measurement target of the adjacent cell. In the case where the measurement result at this terminal device 100 satisfies conditions of Event A3, handover from a beam to the serving cell or the adjacent cell is performed.

The terminal device 100 may include, for example, a measurement report ID, CSI-RSRP of a CSI-RS as a measurement value of the serving cell, CSI-IM-RSRP of a CSI-RS transmitted from the adjacent cell as a measurement value of the adjacent cell, an adjacent cell ID, or the like, in the measurement report to be notified to the base station 200. In the case where the terminal device 100 notifies the base station 200 of the measurement report in which CSI-RSRP is made a measurement target, the terminal device 100 may include, for example, a CSI-RS configuration ID in place of the adjacent cell ID. In the case where the measurement result of the terminal device 100 satisfies handover conditions, the base station 200 discerns a target cell from the CSI-RS configuration ID and notifies the target cell of a handover request.

(Operation Example 7) Interference Control Using Measurement Report of CSI-RSRQ

In FD-MIMO, it is assumed that a beam is directed to upper floors of a building. As described using FIG. 10, in the case where beams of FD-MIMO having the same frequency are directed to the same building from a plurality of cells, if the same resource is used by the plurality of beams, large interference occurs. In this operation example 7, in the case where the terminal device 100 which supports FD-MIMO detects other beams which may become interference from the adjacent cell, the terminal device 100 reports a measurement value to the serving cell. The base station 200 which receives the measurement value from the terminal device 100 adjusts scheduling with the adjacent cell so that the beams which may interfere with each other do not use the same resource.

In this operation example 7, because notification of the CSI process information from the base station to the terminal and measurement of CSI-RSRP and CSI-RSRQ by the terminal are similar to those in the operation example 5, detailed description will be omitted. Note that CSI-RSRQ in equation 2 is not a measurement value of an actual interference level. However, the terminal device 100 can predict interference by comparing strength of reference signals respectively transmitted by a plurality of beams. The terminal device 100 can assume that the terminal device 100 is subject to interference in the case where the same resource is used between two beams if CSI-RSRQ becomes smaller than a value determined in advance.

An example has been described where CSI-RSRP is set as a measurement value of the CSI-RS relating to one antenna port with a maximum reception power concerning measurement of CSI-RSRP. As another method, for example, in the case where the terminal device 100 selects a plurality of antenna ports which are part of a plurality of antenna ports indicated in the CSI-RS configuration information, RSRP of a CSI-RS calculated assuming that a weighting factor which makes CSI-RS reception power from antenna ports selected by the terminal device 100 a maximum is to be multiplied may be set as CSI-RSRP.

Further, for example, as still another method, in the case where a plurality of antenna ports are indicated in the CSI-IM configuration information, and CSI-RSs of a plurality of antenna ports of an adjacent cell are detected by the terminal device 100, RSRP of a CSI-RS calculated assuming that a weighting factor which makes reception power of the plurality of CSI-RSs a maximum is to be multiplied may be set as CSI-IM RSRP. Also in this case, in the case where the terminal device 100 is notified of a plurality of pieces of CSI-IM configuration information, the terminal device 100 obtains CSI-IM-RSRP for CSI-RS configuration information of an adjacent cell at which reception strength is the largest.

(Transmission of Measurement Report from Terminal to Base Station)

In the case where the terminal device 1(H) measures a measurement target and the acquired measurement result satisfies, for example, conditions for a trigger event, die terminal device 100 transmits a measurement report to the base station 200. As the measurement target, in addition to RSRP and RSRQ of a CRS of a serving cell which have also existed in related art, and RSRP and RSRQ of a CRS of an adjacent cell, there can be CSI-RSRP of a CSI-RS indicated in the Non-zero Power CSI-RS configuration information and CSI-IM-RSRP of a CSI-RS to be transmitted from the adjacent cell. These are measured by, for example, the control unit 143. In this operation example 7, an example of interference control by a measurement report using Event A2 in which CSI-RSRQ of a CSI-RS is set as a measurement target of the serving cell will be described.

Event A2 is a trigger in the case where the measurement value of the serving cell is smaller than a threshold value. Entering condition and Leaving condition are defined as follows.

$$Ms+Hys<Thresh \quad \text{Inequality A2-1 (Entering condition)}$$

$$Ms-Hys>Thresh \quad \text{Inequality A2-2 (Leaving condition)}$$

In the above-described two equations, Ms indicates a measurement value of the serving cell. In a case of the operation example 7, Ms indicates CSI-RSRQ of the CSI-RS of the serving cell.

Further, Hys indicates hysteresis of this event.

Further, Thresh indicates a threshold value of this event.

Further, Ms indicates RSRP in units of dBm and indicates RSRQ in units of dB. Hys is indicated in units of dB. Thresh is indicated in the same units as those of Ms.

In the case where CSI-RSRQ of the CSI-RS of the serving cell becomes smaller than the threshold value determined in advance, the terminal device 100 notifies the base station of the measurement report.

The terminal device 100 can include, for example, a measurement report ID, CSI-RSRQ of a CSI-RS as the measurement value of the serving cell, a CSI-RS configuration ID, or the like, in the measurement report to be notified to the base station 200. In a case of the measurement report in which CSI-RSRP is set as the measurement target, the terminal device 100 may include, for example, a CSI-RS configuration ID in place of an adjacent cell ID.

The base station 200 can judge that the measurement report is triggered by Event A2 from the measurement report ID notified from the terminal device 100, at, for example, the control unit 253. Because CSI-RSRQ of the CSI-RS is reported from the terminal device 100 as the measurement value of the serving cell, the base station 200 can know that the terminal device 100 detects interference from a beam of an adjacent cell which makes a notification of the CSI-RS configuration information with the CSI-RS configuration ID The terminal device 100 may include, for example, information indicating antenna port number selected by the terminal device 100 in the measurement report to be notified to the base station 200. The terminal device 100 may notify the base station 200 of a list of antenna port number as the information indicating the selected antenna port number or may notify the base station 200 of information of the selected antenna ports in a bit map corresponding to the antenna ports. The terminal device 100 can cause the base station 200 to appropriately control interference of a beam of an adjacent cell by reporting an antenna port of a CSI-RS of the adjacent cell which has been a main cause of degradation of CSI-RSRQ.

(Interference Control Processing by Base Station)

In this manner, the base station 200 can execute scheduling adjustment using an X2 interface with an adjacent base station 200 so that the same resource is not used between a beam allocated to the terminal and a beam of an adjacent cell with the same frequency for which interference is detected, at, for example, the control unit 253. Note that the scheduling adjustment using the X2 interface is not limited to a particular method.

<2. Application Examples>

The technology of the present disclosure can be applied to various products. For example, the control entity 300 may be realized as a server of any type such as a lower server, a rack server, a blade server, or the like. In addition, the control entity 300 may be a control module mounted in a server (e.g., an integrated circuit module configured in one die or a card or a blade inserted into a slot of a blade server).

Further, the base station 200 may be realized as any type of evolved node B (eNB), for example, a macro eNB, a small eNB, or the like. A small eNB may be an eNB that covers a smaller cell than a macro cell, such as a pico eNB, a micro eNB, or a home (femto) eNB. Alternatively, the base station 200 may be realized as another type of base station such as a node B or a base transceiver station (BTS). The base station 200 may include a main body that controls radio communication (also referred to as a base station device) and one or more remote radio heads (RRHs) disposed in a different place from the main body. In addition, various types of terminals to be described below may operate as the base station 200 by temporarily or semi-permanently executing the base station function.

In addition, the terminal device 100 may be realized as, for example, a mobile terminal such as a smartphone, a tablet personal computer (PC), a notebook PC, a portable game terminal, a portable/dongle type mobile router, or a digital camera, or an in-vehicle terminal such as a car navigation device. In addition, the terminal device 100 may be realized as a terminal that performs machine-to-machine (M2M) communication (also referred to as a machine type communication (MTC) terminal). Furthermore, the terminal device 100 may be a wireless communication module mounted in such a terminal (for example, an integrated circuit module configured in one die).

[2-1. Application Example with Regard to Control Entity]

Figure 23:
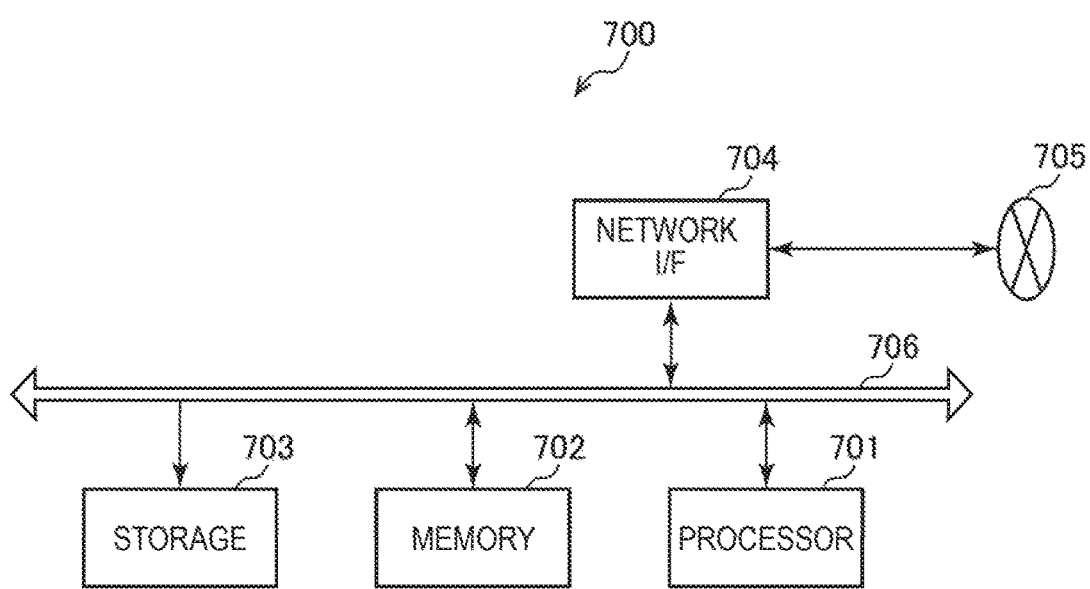
FIG. 23 is a block diagram illustrating an example of a schematic configuration of a server 700 to which the technology of the present disclosure can be applied.

FIG. 23 is a block diagram illustrating an example of a schematic configuration of a server 700 to which the technology of the present disclosure may be applied. The server 700 includes a processor 701, a memory 702, a storage 703, a network interface 704, and a bus 706.

The processor 701 may be, for example, a central processing unit (CPU) or a digital signal processor (DSP) and controls various functions of the server 700. The memory 702 includes a random access memory (RAM) and a read only memory (ROM) and stores programs executed by the processor 701 and data. The storage 703 can include a storage medium such as a semiconductor memory or a hard disk.

The network interface 704 is a wired communication interface for connecting the server 700 to a wired communication network 705. The wired communication network 705 may be a core network such as an evolved packet core (EPC) or a packet data network (PDN) such as the Internet.

The bus 706 connects the processor 701, the memory 702, the storage 703, and the network interface 704 to each other. The bus 706 may include two or more buses that operate at different speeds (e.g., a high-speed bus and a low-speed bus).

In the server 700 illustrated in FIG. 23, one or more constituent elements included in the processing unit 330 described with reference to FIG. 13 (the information acquisition unit 331 and/or the control unit 333) may be implemented by the processor 701. As an example, a program for causing a processor to function as the one or more constituent elements (i.e., a program for causing a processor to execute operations of the one or more constituent elements) may be installed in the server 700 and the processor 701 may execute the program. As another example, a module including the processor 701 and the memory 702 may be mounted in the server 700 and the one or more constituent elements may be implemented by the module. In this case, the module may store a program for causing a processor to function as the one or more constituent elements in the memory 702 and the program may be executed by the processor 701. The server 700 or the module may be provided as devices having the above-described one or more constituent elements as described above, or the program for causing a processor to function as the one or more constituent elements may be provided. In addition, a readable recording medium in which the program is recorded may be provided.

[2-2. Application Example with Regard to Base Station]

(First Application Example)

Figure 24:
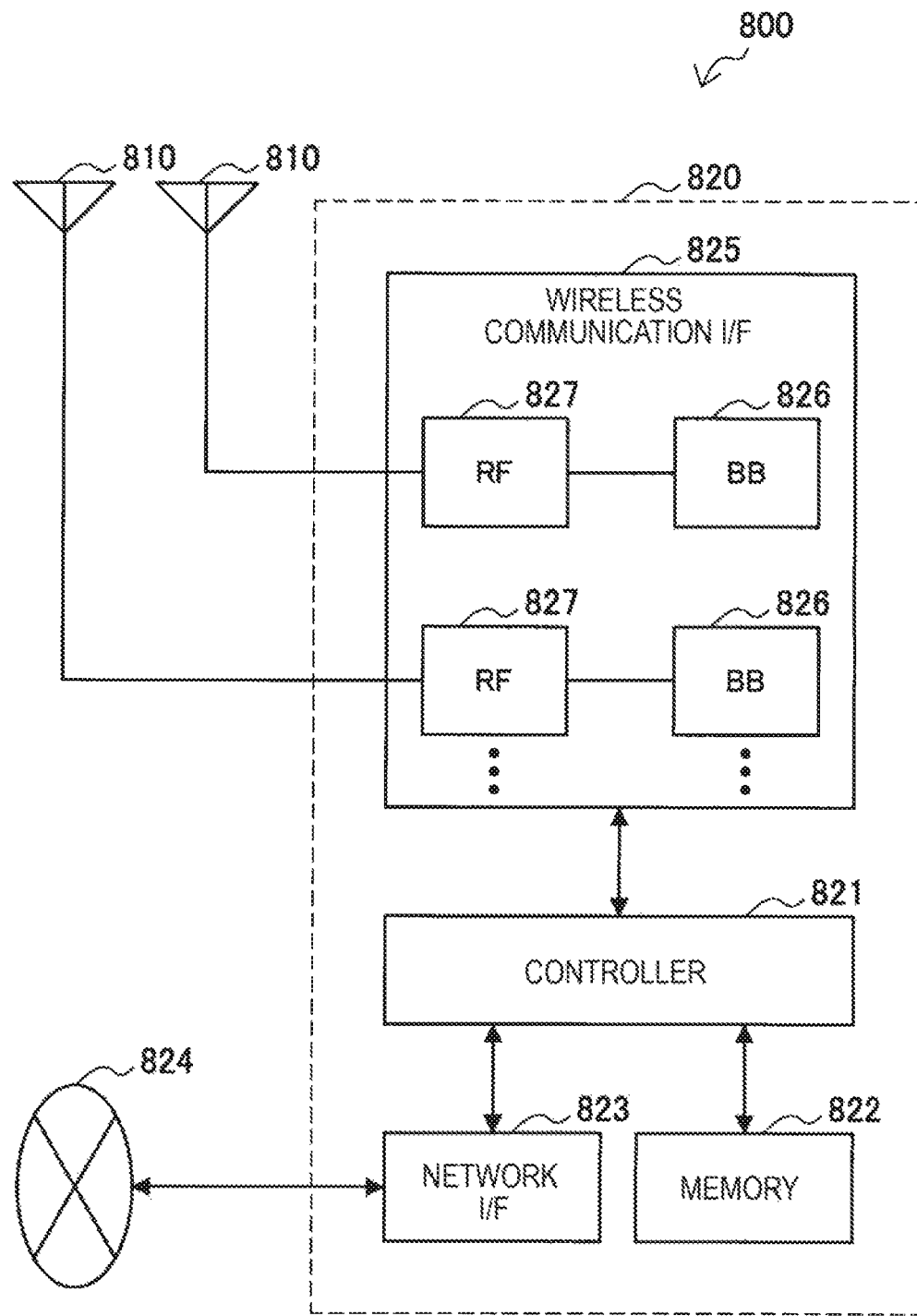
FIG. 24 is a block diagram illustrating a first example of a schematic configuration of an eNB to which the technology of the present disclosure can be applied.

FIG. 24 is a block diagram illustrating a first example of a schematic configuration of an eNB to which the technology of the present disclosure may be applied. An eNB 800 includes one or more antennas 810 and a base station device 820. Each antenna 810 and the base station device 820 may be connected to each other via an RF cable.

Each of the antennas 810 includes a single or multiple antenna elements (such as multiple antenna elements included in an MIMO antenna), and is used for the base station device 820 to transmit and receive radio signals. The eNB 800 may include the multiple antennas 810, as illustrated in FIG. 24. For example, the multiple antennas 810 may be compatible with multiple frequency bands used by the eNB 800. Although FIG. 24 illustrates the example in which the eNB 800 includes the multiple antennas 810, the eNB 800 may also include a single antenna 810.

The base station device 820 includes a controller 821, a memory 822, a network interface 823, and a wireless communication interface 825.

The controller 821 may be, for example, a CPU or a DSP, and operates various functions of a higher layer of the base station device 820. For example, the controller 821 generates a data packet from data in signals processed by the wireless communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station device 820 to a core network 824. The controller 821 may communicate with a core network node or another eNB via the network interface 823. In this case, the eNB 800 may be connected to a core network node or another eNB through a logical interface (e.g. S1 interface or X2 interface). The network interface 823 may also be a wired communication interface or a wireless communication interface for wireless backhaul. If the network interface 823 is a wireless communication interface, the network interface 823 may use a higher frequency band for wireless communication than a frequency band used by the wireless communication interface 825.

The wireless communication interface 825 supports any cellular communication scheme such as Long Term Evolution (LTE) and LTE-Advanced, and provides radio connection to a terminal positioned in a cell of the eNB 800 via the antenna 810. The wireless communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station device 820. Alternatively, the module may also be a chip that is mounted on the card or the blade. Meanwhile, the RF circuit 827 may include, for example, a mixer, a filter, and an amplifier, and transmits and receives radio signals via the antenna 810.

The wireless communication interface 825 may include the multiple BB processors 826, as illustrated in FIG. 24. For example, the multiple BB processors 826 may be compatible with multiple frequency bands used by the eNB 800. The wireless communication interface 825 may include the multiple RF circuits 827, as illustrated in FIG. 24. For example, the multiple RF circuits 827 may be compatible with multiple antenna elements. Although FIG. 24 illustrates the example in which the wireless communication interface 825 includes the multiple BB processors 826 and the multiple RF circuits 827, the wireless communication interface 825 may also include a single BB processor 826 or a single RF circuit 827.

(Second Application Example)

Figure 25:
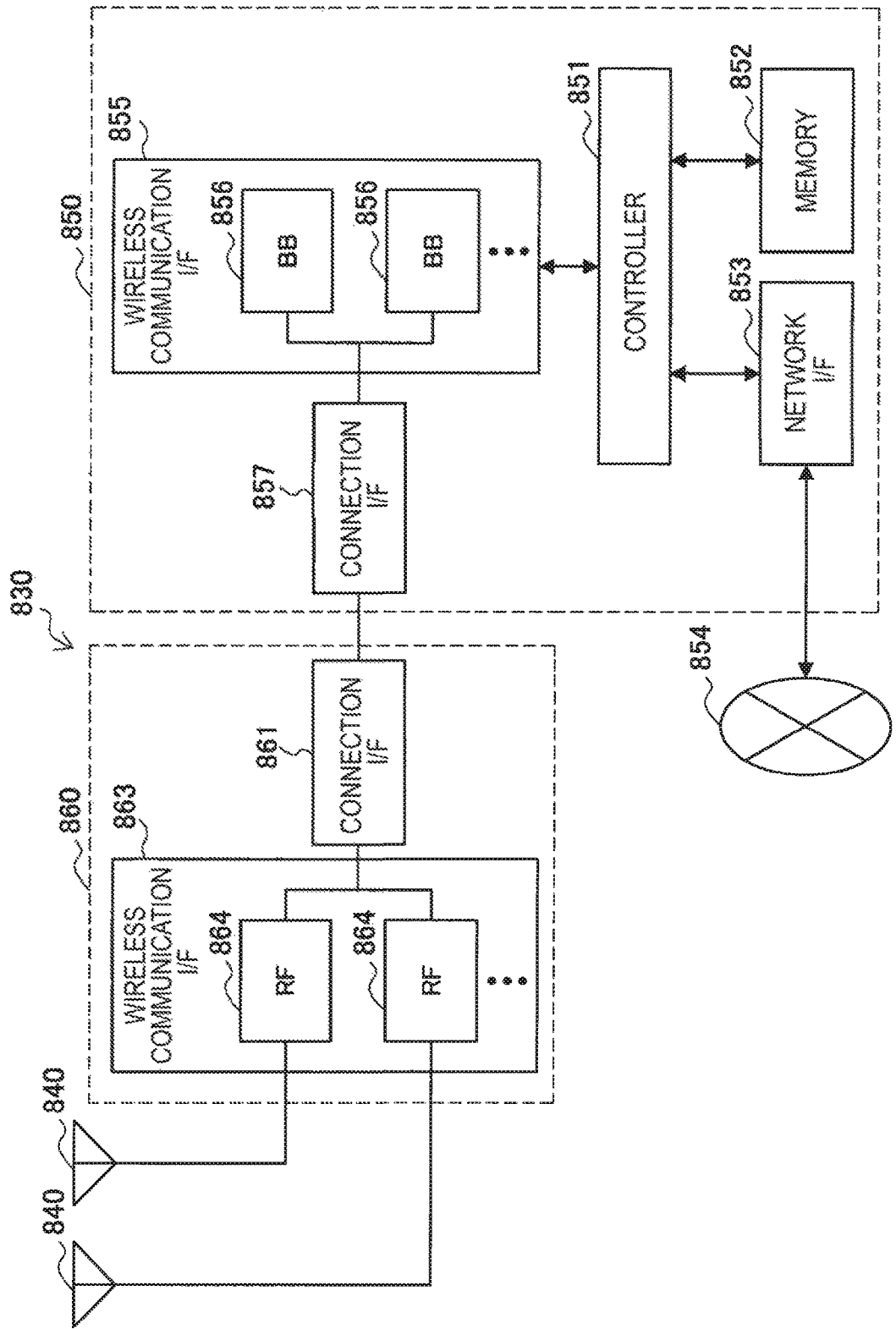
FIG. 25 is a block diagram illustrating a second example of the schematic configuration of the eNB to which the technology of the present disclosure can be applied.

FIG. 25 is a block diagram illustrating a second example of a schematic configuration of an eNB to which the technology of the present disclosure may be applied. An eNB 830 includes one or more antennas 840, a base station device 850, and an RRH 860. Each antenna 840 and the RRH 860 may be connected to each other via an RF cable. The base station device 850 and the RRH 860 may be connected to each other via a high speed line such as an optical fiber cable.

Each of the antennas 840 includes a single or multiple antenna elements (such as multiple antenna elements included in an MIMO antenna), and is used for the RRH 860 to transmit and receive radio signals. The eNB 830 may include the multiple antennas 840, as illustrated in FIG. 25. For example, the multiple antennas 840 may be compatible with multiple frequency bands used by the eNB 830. Although FIG. 25 illustrates the example in which the eNB 830 includes the multiple antennas 840, the eNB 830 may also include a single antenna 840.

The base station device 850 includes a controller 851, a memory 852, a network interlace 853, a wireless communication interface 855, and a connection interface 857. The controller 851, the memory 852, and the network interface 853 are the same as the controller 821, the memory 822, and the network interface 823 described with reference to FIG. 24.

The wireless communication interface 855 supports any cellular communication scheme such as LTE and LTE-Advanced, and provides wireless communication to a terminal positioned in a sector corresponding to the RRH 860 via the RRH 860 and the antenna 840. The wireless communication interface 855 may typically include, for example, a BB processor 856. The BB processor 856 is the same as the BB processor 826 described with reference to FIG. 24, except the BB processor 856 is connected to the RF circuit 864 of the RRH 860 via the connection interface 857. The wireless communication interface 855 may include the multiple BB processors 856, as illustrated in FIG. 25. For example, the multiple BB processors 856 may be compatible with multiple frequency bands used by the eNB 830. Although FIG. 25 illustrates the example in which the wireless communication interface 855 includes the multiple BB processors 856, the wireless communication interface 855 may also include a single BB processor 856.

The connection interface 857 is an interface for connecting the base station device 850 (wireless communication interface 855) to the RRH 860. The connection interface 857 may also lie a communication module for communication in the above-described high speed line that connects the base station device 850 (wireless communication interface 855) to the RRH 860.

The RRH 860 includes a connection interface 861 and a wireless communication interface 863.

The connection interface 861 is an interface for connecting the RRH 860 (wireless communication interface 863) to the base station device 850. The connection interface 861 may also be a communication module for communication in the above-described high speed line.

The wireless communication interface 863 transmits and receives radio signals via the antenna 840. The wireless communication interface 863 may typically include, for example, the RF circuit 864. The RF circuit 864 may include, for example, a mixer, a filter, and an amplifier, and transmits and receives radio signals via the antenna 840. The wireless communication interface 863 may include multiple RF circuits 864, as illustrated in FIG. 25. For example, the multiple RF circuits 864 may support multiple antenna elements. Although FIG. 25 illustrates the example in which the wireless communication interface 863 includes the multiple RF circuits 864, the wireless communication interface 863 may also include a single RF circuit 864.

In the eNB 800 and the eNB 830 shown in FIGS. 24 and 25, one or more constituent elements included in the processing unit 250 (the information acquisition unit 251 and/or the control unit 253) described with reference to FIG. 11 may be implemented by the wireless communication interface 855 and/or the wireless communication interface 863. Alternatively, at least some of these constituent elements may be implemented by the controller 851. As an example, a module which includes a part (for example, the BB processor 856) or all of the wireless communication interface 855 and/or the controller 851 may be mounted in eNB 830, and the one or more constituent elements may be implemented by the module. In this case, the module may store a program for causing the processor to function as the one or more constituent elements (i.e., a program for causing the processor to execute operations of the one or more constituent elements) and may execute the program. As another example, the program for causing the processor to function as the one or more constituent elements may be installed in the eNB 830, and the wireless communication interface 855 (for example, the BB processor 856) and/or the controller 851 may execute the program. As described above, the eNB 830, the base station device 850, or the module may be provided as a device which includes the one or more constituent elements, and the program for causing the processor to function as the one or more constituent elements may be provided. In addition, a readable recording medium in which the program is recorded may be provided.

In addition, in the eNB 830 shown in FIG. 25, the wireless communication unit 220 described, for example, with reference to FIG. 11 may be implemented by the wireless communication interface 863 (for example, the RF circuit 864). Moreover, the antenna unit 210 may be implemented by the antenna 840. Further, the network communication unit 230 may be implemented by the controller 851 and/or the network interface 853.

[2-3. Application Example with Regard to Terminal Device] (First Application Example)

Figure 26:
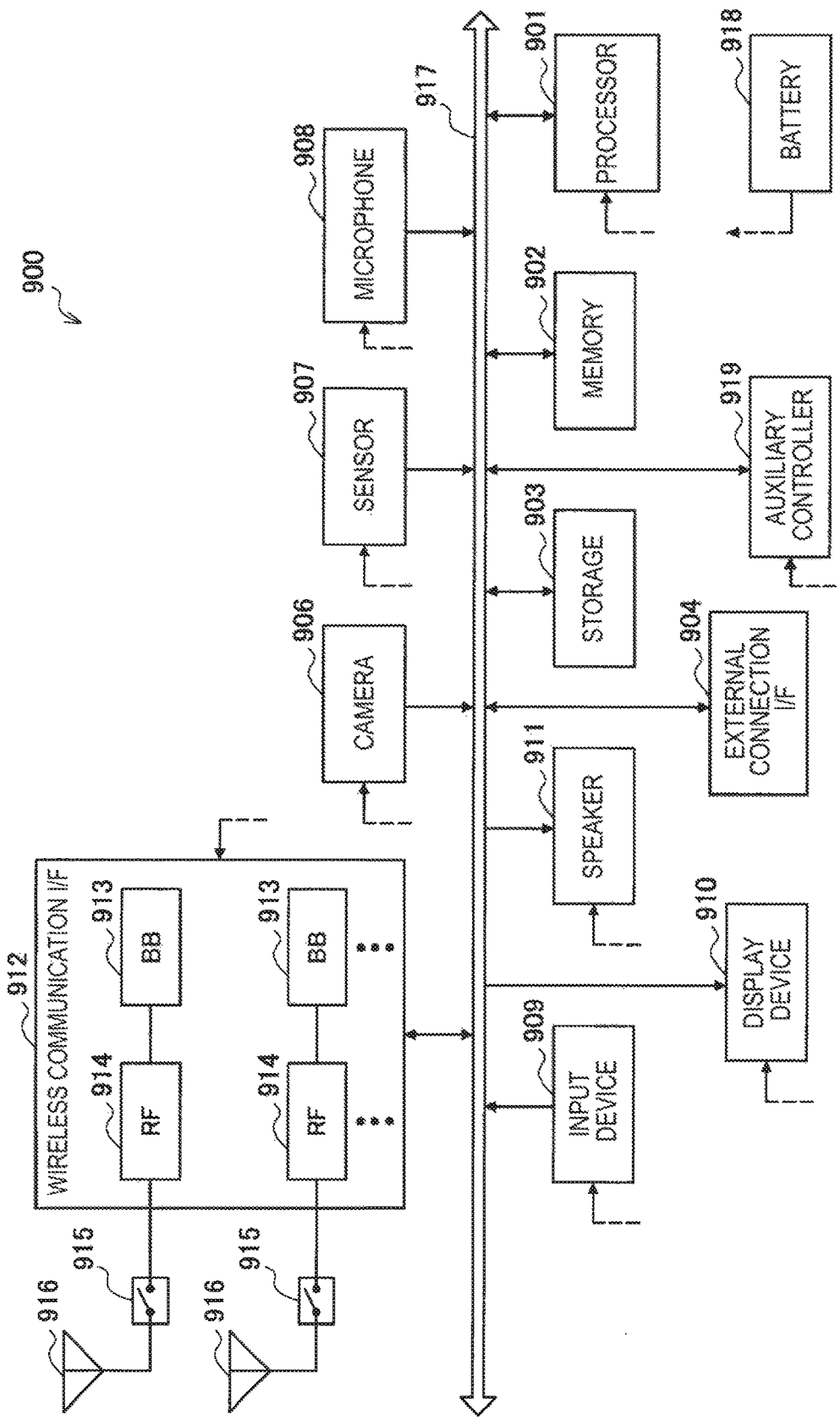
FIG. 26 is a block diagram illustrating an example of a schematic configuration of a smartphone 900 to which the technology of the present disclosure can be applied.

FIG. 26 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals.

The input device 909 includes, for example, a touch sensor configured to detect touch onto a screen of the display device 910, a keypad, a keyboard, a button, or a switch, and receives an operation or an information input from a user. Tire display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The wireless communication interface 912 supports any cellular communication scheme such as LTE and LTE-Advanced, and performs wireless communication. The wireless communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for wireless communication. Meanwhile, the RF circuit 914 may include, for example, a mixer, a filter, and an amplifier, and transmits and receives radio signals via the antenna 916. The wireless communication interface 912 may also be a one chip module that has the BB processor 913 and the RF circuit 914 integrated thereon. The wireless communication interface 912 may include the multiple BB processors 913 and the multiple RF circuits 914, as illustrated in FIG. 26. Although FIG. 26 illustrates the example in which the wireless communication interface 912 includes the multiple BB processors 913 and the multiple RF circuits 914, the wireless communication interface 912 may also include a single BB processor 913 or a single RF circuit 914.

Furthermore, in addition to a cellular communication scheme, the wireless communication interface 912 may support another type of wireless communication scheme such as a short-distance wireless communication scheme, a near field communication scheme, and a wireless local area network (LAN) scheme. In that case, the wireless communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the wireless communication interlace 912.

Each of the antennas 916 includes a single or multiple antenna elements (such as multiple antenna elements included in an MIMO antenna), and is used for the wireless communication interface 912 to transmit and receive radio signals. The smartphone 900 may include the multiple antennas 916, as illustrated in FIG. 26. Although FIG. 26 illustrates the example in which the smartphone 900 includes the multiple antennas 916, the smartphone 900 may also include a single antenna 916.

Furthermore, the smartphone 900 may include the antenna 916 for each wireless communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, tire speaker 911, the wireless communication interface 912, and tire auxiliary controller 919 to each other. The battery 918 supplies power to blocks of the smartphone 900 illustrated in FIG. 26 via feeder lines, which are partially shown as dashed lines in the figure. The auxiliary controller 919 operates a minimum necessary function of the smartphone 900, for example, in a sleep mode.

In the smartphone 900 shown in FIG. 26, one or more constituent elements included in the processing unit 140 (the information acquisition unit 141 and/or the control unit 143) described with reference to FIG. 10 may be implemented by the wireless communication interface 912. Alternatively, at least some of these constituent elements may be implemented by the processor 901 or the auxiliary controller 919. As an example, a module which includes a part (for example, the BB processor 913) or all of the wireless communication interface 912, the processor 901 and/or the auxiliary controller 919 may be mounted in the smartphone 900, and the one or more constituent elements may be implemented by the module. In this case, the module may store a program for causing the processor to function as the one or more constituent elements (i.e., a program for causing the processor to execute operations of the one or more constituent elements) and may execute the program. As another example, the program for causing the processor to function as the one or more constituent elements may be installed in the smartphone 900, and the wireless communication interface 912 (for example, the BB processor 913), the processor 901 and/or the auxiliary controller 919 may execute the program. As described above, the smartphone 900 or the module may be provided as a device which includes the one or more constituent elements, and the program for causing the processor to function as the one or more constituent elements may be provided. In addition, a readable recording medium in which the program is recorded may be provided.

In addition, in the smartphone 900 shown in FIG. 26, the wireless communication unit 120 described, for example, with reference to FIG. 10 may be implemented by the wireless communication interface 912 (for example, the RF circuit 914). Moreover, the antenna unit 110 may be implemented by the antenna 916.

(Second Application Example)

Figure 27:
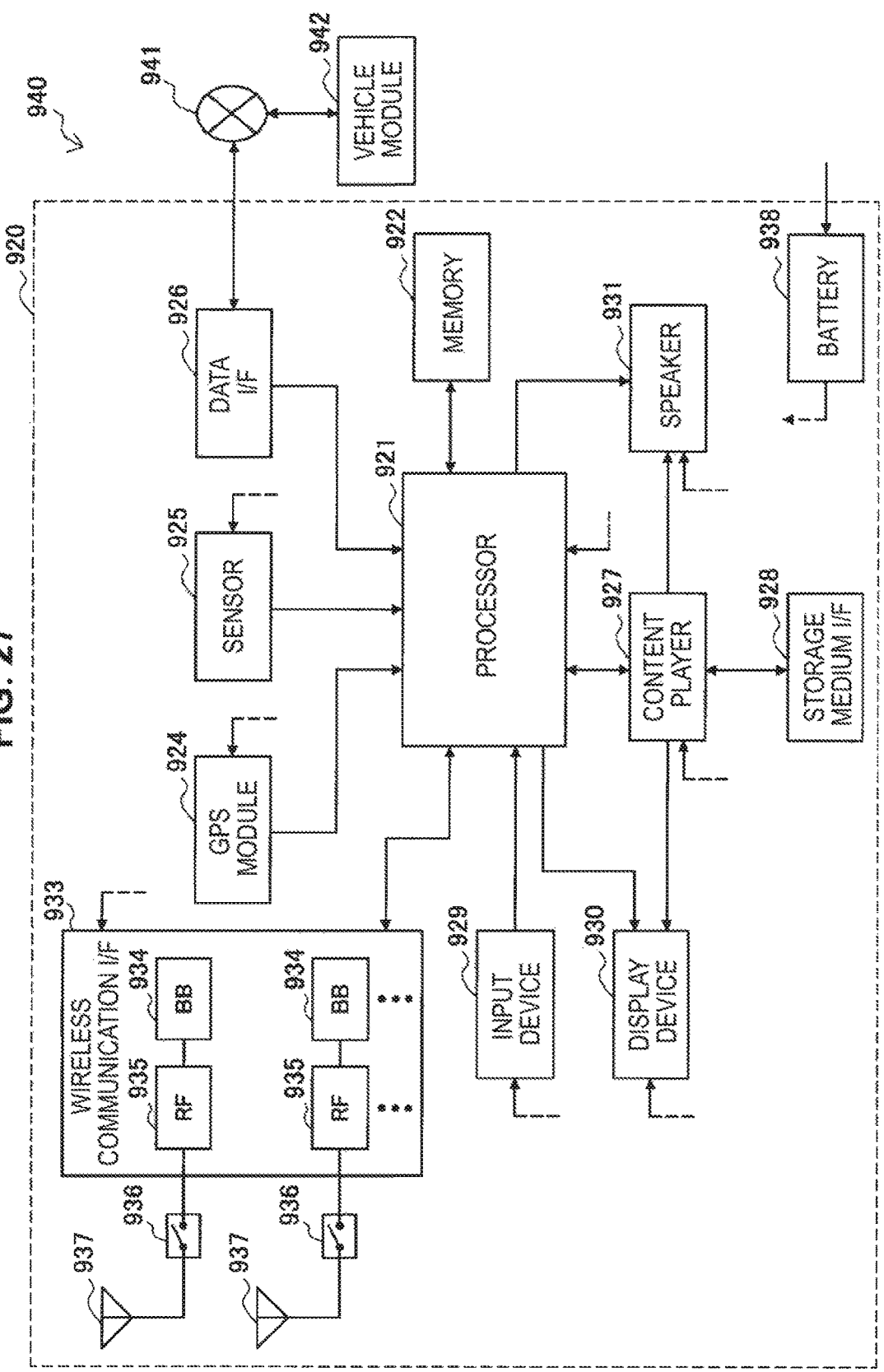
FIG. 27 is a block diagram illustrating an example of a schematic configuration of a car navigation device 920 to which the technology of the present disclosure can be applied.

FIG. 27 is a block diagram illustrating an example of a schematic configuration of a car navigation device 920 to which the technology of the present disclosure may be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or a SoC, and controls a navigation function and another function of the car navigation device 920. The memory 922 includes RAM and ROM, and stores a program that is executed by the processor 921, and data.

The GPS module 924 uses GPS signals received from a GPS satellite to measure a position (such as latitude, longitude, and altitude) of the ear navigation device 920. The sensor 925 may include a group of sensors such as a gyro sensor, a geomagnetic sensor, and a barometric sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The wireless communication interface 933 supports any cellular communication scheme such as LET and LTE-Advanced, and performs wireless communication. The wireless communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for wireless communication. Meanwhile, the RF circuit 935 may include, for example, a mixer, a filter, and an amplifier, and transmits and receives radio signals via the antenna 937. The wireless communication interface 933 may be a one chip module having the BB processor 934 and the RF circuit 935 integrated thereon. The wireless communication interface 933 may include the multiple BB processors 934 and the multiple RF circuits 935, as illustrated in FIG. 27. Although FIG. 27 illustrates the example in which the wireless communication interface 933 includes the multiple BB processors 934 and the multiple RF circuits 935, the wireless communication interface 933 may also include a single BB processor 934 or a single RF circuit 935.

Furthermore, in addition to a cellular communication scheme, the wireless communication interface 933 may support another type of wireless communication scheme such as a short-distance wireless communication scheme, a near field communication scheme, and a wireless LAN scheme. In that case, the wireless communication interface 933 may include the BB processor 934 and the RF circuit 935 for each wireless communication scheme.

Each of the antenna switches 936 switches connection destinations of the antennas 937 among multiple circuits (such as circuits for different wireless communication schemes) included in the wireless communication interface 933.

Each of the antennas 937 includes a single or multiple antenna elements (such as multiple antenna elements included in an MIMO antenna), and is used for the wireless communication interface 933 to transmit and receive radio signals. The car navigation device 920 may include the multiple antennas 937, as illustrated in FIG. 27. Although FIG. 27 illustrates the example in which the car navigation device 920 includes the multiple antennas 937, the car navigation device 920 may also include a single antenna 937.

Furthermore, the car navigation device 920 may include the antenna 937 for each wireless communication scheme. In that case, the antenna switches 936 may be omitted from the configuration of the car navigation device 920.

The battery 938 supplies power to blocks of the car navigation device 920 illustrated in FIG. 27 via feeder lines that are partially shown as dashed lines in the figure. The battery 938 accumulates power supplied form the vehicle.

In the car navigation device 920 shown in FIG. 27, one or more constituent elements included in the processing unit 140 (the information acquisition unit 141 and/or the control unit 143) described with reference to FIG. 10 may be implemented by the wireless communication interface 933. Alternatively, at least some of these constituent elements may be implemented by the processor 921. As an example, a module which includes a part (for example, the BB processor 934) or all of the wireless communication interface 933 and/or the processor 921 may be mounted in the car navigation device 920, and the one or more constituent elements may be implemented by the module. In this case, the module may store a program for causing the processor to function as the one or more constituent elements (i.e., a program for causing the processor to execute operations of the one or more constituent elements) and may execute the program. As another example, the program for causing the processor to function as the one or more constituent elements may be installed in the car navigation device 920, and the wireless communication interface 933 (for example, the BB processor 934) and/or the processor 921 may execute the program. As described above, the car navigation device 920 or the module may be provided as a device which includes the one or more constituent elements, and the program for causing the processor to function as the one or more constituent elements may be provided. In addition, a readable recording medium in which the program is recorded may be provided.

In addition, in the car navigation device 920 shown in FIG. 27, the wireless communication unit 120 described with reference to FIG. 10, for example, may be implemented by the wireless communication interface 933 (for example, the RF circuit 935). Moreover, the antenna unit 110 may be implemented by the antenna 937.

The technology of the present disclosure may also be realized as an in-vehicle system (or a vehicle) 940 including one or more blocks of the car navigation device 920, the in-vehicle network 941, and a vehicle module 942. In other words, the in-vehicle system (or a vehicle) 940 may be provided as a device which includes the one or more constituent elements included in the processing unit 140. The vehicle module 942 generates vehicle data such as vehicle speed, engine speed, and trouble information, and outputs the generated data to the in-vehicle network 941.

<3. Conclusion>

As described above, according to an embodiment of the present disclosure, it is possible to solve an event which can occur by a reference signal being beamformed, and make communication processing efficient in the case where a reference signal is beamformed.

The terminal device 100 selects part of antenna ports among antenna ports of a reference signal beamformed from the base station 200 and generates a channel slate report which reports states of channels at the selected antenna ports to the base station 200.

The base station 200 acquires a channel state report which reports states of channels at part of antenna ports among all the antenna ports of the beamformed reference signal and beamforms downlink data to the terminal device 100 using the antenna ports selected by the terminal device 100.

By the terminal device 100 selecting part of antenna ports and generating a channel state report which reports states of channels at the selected antenna ports to the base station 200. It is possible to reduce processing. Further, by the base station 200 beam forming downlink data to the terminal device 100 using the antenna ports selected by the terminal device 100, it is possible to improve reception efficiency at the terminal device 100.

Further, the terminal device 100 performs measurement including measurement of reception power or reception quality of a reference signal relating to reference signal configuration information transmitted from the base station 200, and, in the case where predetermined conditions for a trigger event are satisfied, transmits a measurement result to the base station 200.

Further, the base station 200 notifies the terminal device 100 in a connected state (RRC_CONNECTED state with the base station 200) of configuration information of the reference signal beamformed by the base station 200 and configuration information of a reference signal to be beamformed by an adjacent cell.

The base station 200 can cause the terminal device 100 to detect occurrence of interference by notifying the terminal device 100 in a connected state of the configuration information of the reference signal beamformed by the base station 200 and the configuration information of the reference signal to be beamformed by the adjacent cell.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Although the example in which the control entity and the base station are different devices has been described, for example, the present disclosure is not limited thereto. For example, the control entity may be implemented in the base station.

In addition, for example, although the example in which the communication system complies with LTE or LTE-A has been described in the embodiment of the present disclosure, the present disclosure is not limited thereto. The communication system may be, for example, a system complying with another communication standard.

Further, MIMO communication according to an embodiment of the present disclosure may be multi-user MIMO or single-user MIMO.

In addition, processing steps in processes of the present specification may not necessarily be executed in a time series manner in the order described in the flowcharts or sequence diagrams. The processing steps in the processes may also be executed in, for example, a different order from the order described in the flowcharts or sequence diagrams, or may be executed in parallel.

Furthermore, a computer program for causing a processor (e.g., a CPU, a DSP, etc.) provided in a device (e.g., the terminal device, the base station, the control entity, or a module thereof) of the present specification to function as the device (i.e., a computer program for causing the processor to execute operations of constituent elements of the above-described device) can also be created. In addition, a recording medium in which the computer program is recorded may be provided. Moreover, a device that includes a memory storing the computer program and one or more processors that can execute the computer program (e.g., a finished product or a module for a finished product (a component, a processing circuit, a chip, or the like) may also be provided. In addition, a method including operations of one or more constituent elements of the device (e.g., the information acquisition unit and/or the control unit) is also included in the technology of the present disclosure.

Further, the effects described in this specification are merely illustrative or exemplified effects, and are not limitative. That is, with or in the place of the above effects, the technology according to the present disclosure may achieve other effects that are dear to those skilled in the art from the description of this specification.

Additionally, the present technology may also be configured as below.

(1)

A terminal device including:

a control unit configured to select part of antenna ports among antenna ports of a reference signal beamformed with a plurality of beams from a wireless communication device and generate a channel state report which response states of channels at the selected antenna pons to the wireless communication device.

(2)

The terminal device according to (1), in which the control unit selects part of antenna pons among the antenna ports of the beamformed reference signal transmitted by the wireless communication device with a plurality of beams and report a channel state report at the selected antenna ports and antenna port selection information to the wireless communication device.

(3)

The terminal device according to (2), in which the control unit reports the antenna port selection information to the wireless communication device using uplink control information (UCI).

(4)

The terminal device according to (2), in which the control unit reports the antenna port selection information to the wireless communication device using a radio resource control (RRC) message.

(5)

The terminal device according to (1), in which the control unit selects reference signal configuration information from reference signal configuration information relating to the antenna pons selected by the wireless communication device and generates the channel state report at the antenna ports.

(6)

The terminal device according to (1), in which the control unit receives process information including a plurality of pieces of reference signal configuration information and generates one channel state report relating to a plurality of antenna ports indicated in the plurality of pieces of reference signal configuration information.

(7)

The terminal device according to (1), in which the control unit generates the channel state report of the selected antenna ports in a case where the control unit is notified through RRC signaling that a mode is a reporting mode of the reference signal beamformed from the wireless communication device.

(8)

The terminal device according to (1), in which the control unit discerns from notification through RRC signaling that a mode is a reporting mode of the reference signal beamformed from the wireless communication device and generates the channel state report of the selected antenna ports.

(9)

A wireless communication device including:

a control unit configured to acquire from a terminal device a channel stale report reporting states of channels at part of antenna ports among all antenna ports of a reference signal beamformed with a plurality of beams and beamform downlink data to the terminal device using antenna ports selected by the terminal device.

(10)

The wireless communication device according to (9), in which the control unit acquires from the terminal device the channel state report at the antenna ports selected by the terminal device from reference signal configuration information relating to the antenna ports.

(11)

The wireless communication device according to (9), in which the control unit selects part of the antenna ports for each terminal device and notifies the terminal device of reference configuration information relating to the selected antenna ports.

(12)

The wireless communication device according to (11), in which the reference signal configuration information relating to the selected antenna port includes configuration information of all the antenna ports of the beamformed reference signal and information of the antenna ports selected by the control unit.

(13)

The wireless communication device according to (11), in which the reference signal configuration information relating to the selected antenna ports is reference signal configuration information relating to a plurality of the selected antenna ports.

(14)

The wireless communication device according to (11), in which the reference signal configuration information relating to the selected antenna ports is process information including reference signal configuration information relating to a plurality of the selected antenna ports.

(15)

The wireless communication device according to any one of (9) to (14), in which the control unit notifies the terminal device of reference signal configuration information relating to the selected antenna ports using an RRC message.

(16)

The wireless communication device according lo any one of (9) to (14), in which the control unit makes a notification that a mode is a reporting mode of a beamformed reference signal through RRC signaling.

(17)

A terminal device including:

a control unit configured to perform measurement including measurement of reception power or reception quality of a reference signal relating to reference signal configuration information transmitted from a wireless communication device which beamforms a reference signal with a plurality of beams, and transmit a measurement result to the wireless communication device in a case where a predetermined condition for a trigger event is satisfied.

(18)

The terminal device according to (17), in which the control unit includes, in the measurement result, maximum reception power among a reference signal which includes the reference signal configuration information and which is transmitted from antenna ports.

(19)

The terminal device according to (17).

in which the control unit includes, in the measurement result, reception power calculated assuming that a weighting factor is to be multiplied, the weighting factor making reception power of a reference signal transmitted from selected antenna ports among a reference signal a maximum, the reference signal including the reference signal configuration information and being transmitted from antenna ports.

(20)

The terminal device according to (19), in which the control unit includes information of the selected antenna ports in the measurement result.

(21)

The terminal device according to any one of (17) to (20), in which the control unit sets reception power or reception quality of a cell specific reference signal of a serving cell as a measurement target of the serving cell and sets reception power or reception quality of a reference signal notified in non-zero power reference signal configuration information as a measurement target of an adjacent cell.

(22)

The terminal device according to any one of (17) to (20).

in which the control unit sets reception power or reception quality of a cell specific reference signal of a serving cell as a measurement target of the serving cell and sets reception power or reception quality of a beamformed reference signal as a measurement target of an adjacent cell.

(23)

The terminal device according to any one of (17) to (20), in which the control unit sets reception power or reception quality of a reference signal notified in non-zero power reference signal configuration information as a measurement target of a serving cell.

(24)

The terminal device according lo (23), in which the control unit sets reception power or reception quality of a cell specific reference signal of a serving cell as a measurement target of an adjacent cell.

(25)

The terminal device according to (23), in which the control unit sets reception power or reception quality of a cell specific reference signal of an adjacent cell as a measurement target of an adjacent cell.

(26)

The terminal device according to any one of (17) to (20), in which the control unit sets reception power of a reference signal notified in non-zero power reference signal configuration information as a measurement target of a serving cell and sets reception power of a reference signal notified in non-zero power reference signal configuration information or interference measurement configuration information as a measurement target of an adjacent cell, (27)

The terminal device according to any one of (17) to (20), in which the control unit calculates the reception quality from a measurement value of reception power of a reference signal notified in non-zero power reference signal configuration information and a measurement value of reception power of a reference signal notified in non-zero power reference signal configuration information or interference measurement configuration information.

(28)

The terminal device according to any one of (17) to (27), in which the control unit causes a reference signal configuration ID to be included in the measurement result.

(29)

A wireless communication device including:

a control unit configured to notify a terminal device in a connected state of configuration information of a reference signal beamformed by the wireless communication device with a plurality of beams and configuration information of a reference signal to be beamformed by an adjacent cell with a plurality of beams.

(30)

The wireless communication device according to (29), in which the control unit notifies the terminal device of configuration information of a reference signal beamformed by the wireless communication device in non-zero power reference signal configuration information and notifies the terminal device of configuration information of a reference signal to be beamformed by an adjacent cell in non-zero power reference signal configuration information or interference measurement configuration information.

(31)

The wireless communication device according to (29) or (30), in which the control unit acquires a measurement result relating to a reference signal to be beamformed by an adjacent cell from the terminal device and performs handover processing on the terminal device.

(32)

The wireless communication device according to (29) or (30).

in which the control unit acquires a measurement result relating to a reference signal to be beamformed by an adjacent cell from the terminal device and performs processing of adjusting scheduling with the adjacent cell.

(33)

A method including:

selecting part of antenna ports among antenna ports of a reference signal beamformed with a plurality of beams from a wireless communication device and generating a channel state report which reports states of channels at the selected antenna ports to the wireless communication device.

(34)

A method including:

acquiring from a terminal device a channel state report reporting stales of channels at part of antenna ports among all antenna ports of a reference signal beamformed with a plurality of beams and causing downlink data to the terminal device to be beamformed using antenna ports selected by the terminal device.

(35)

A method including:

performing measurement including measurement of reception power or reception quality of a reference signal relating to reference signal configuration information transmitted with a plurality of beams from a wireless communication device which beamforms a reference signal with a plurality of beams, and transmitting a measurement result to the wireless communication device in a case where a predetermined condition for a trigger event is satisfied.

(36)

A method including:

notifying a terminal device in a connected state of configuration information of a reference signal beamformed by the wireless communication device with a plurality of beams and configuration information of a reference signal to be beamformed by an adjacent cell with a plurality of beams.

(37)

A computer program for causing a computer to execute:

selecting part of antenna ports among antenna ports of a reference signal beamformed with a plurality of beams from a wireless communication device and generating a channel state report which reports states of channels at the selected antenna ports to the wireless communication device.

(38)

A computer program for causing a computer to execute:

acquiring from a terminal device a channel state report reporting states of channels at part of antenna ports among all antenna ports of a reference signal beamformed with a plurality of beams and causing downlink data to the terminal device to be beamformed using antenna ports selected by the terminal device.

(39)

A computer program for causing a computer to execute:
performing measurement including measurement of reception power or reception quality of a reference signal relating to reference signal configuration information transmitted from a wireless communication device which beamforms a reference signal with a plurality of beams, and transmitting a measurement result to the wireless communication device in a case where a predetermined condition for a trigger event is satisfied.

(40)

A computer program for causing a computer to execute:
notifying a terminal device in a connected state of configuration information of a reference signal beamformed by the wireless communication device with a plurality of beams and configuration information of a reference signal to be beamformed by an adjacent cell with a plurality of beams.

REFERENCE SIGNS LIST 1 communication system
100 terminal device
200 base station
300 control entity

The invention claimed is:

1. A terminal device comprising:
processing circuitry is configured to
while in an Radio Resource Control (RRC) connected state, receive Channel State Information (CSI) reporting mode notification indicating a UE-selected-beamform-CSI-RS mode;
receive CSI process information and Channel State information Reference Signal (CSI-RS) configuration information associated with antenna ports of beamformed CSI-RS;
measure the beamformed CSI-RS;
judge whether the received reporting mode is the UE-selected-beamform-CSI-RS mode;
in accordance with the mode notification indicating the UE-selected-beamform-CSI-RS mode, select part of antenna ports among antenna ports of a reference signal beamformed with a plurality of beams from a wireless communication device andgenerate a channel state report which reports states of channels at the selected antenna ports to the wireless communication device.

2. The terminal device according to claim 1, wherein the processing circuitry is further configured to
select part of antenna ports among the antenna ports of the beamformed reference signal transmitted by the wireless communication device with a plurality of beams and report a channel state report at the selected antenna ports and antenna port selection information to the wireless communication device.

3. The terminal device according to claim 2, wherein the processing circuitry is further configured to
report the antenna port selection information to the wireless communication device using uplink control information (UCI).

4. The terminal device according to claim 2, wherein the processing circuitry is further configured to
report the antenna port selection information to the wireless communication device using a radio resource control (RRC) message.

5. The terminal device according to claim 1, wherein the processing circuitry is further configured to
select reference signal configuration information from reference signal configuration information relating to the antenna ports selected by the wireless communication device and generates the channel state report at the antenna ports.

6. The terminal device according to claim 1, wherein the processing circuitry is further configured to
receive process information including a plurality of pieces of reference signal configuration information and generates one channel state report relating to a plurality of antenna ports indicated in the plurality of pieces of reference signal configuration information.

7. The terminal device according to claim 1, wherein the processing circuitry is further configured to
generate the channel slate report of the selected antenna ports in a case where the controller is notified through RRC signaling that a mode is a reporting mode of the reference signal beamformed from the wireless communication device.

8. The terminal device according to claim 1, wherein the processing circuitry is further configured to
discern from notification through RRC signaling that a mode is a reporting mode of the reference signal beamformed from the wireless communication device and generates the channel state report of the selected antenna ports.

9. A wireless communication device comprising:
processing circuitry is configured to
determine when a terminal device is in an Radio Resource Control (RRC) connected state,
while the terminal device is in the RRC connected state, transmit a Channel State Information (CSI) reporting mode notification indicating UE-selected-beamform-Channel State information Reference Signal (CSI-RS) to the terminal device;
transmit CSI process information and CSI-RS configuration information associated with antenna ports of beamformed CSI-RS;
acquire from the terminal device a channel state report reporting states of channels at part of antenna ports among all antenna ports of a reference signal beamformed with a plurality of beams and cause downlink data to the terminal device to be beamformed using antenna ports selected by the terminal device.

10. The wireless communication device according to claim 9, wherein
the processing circuitry is further configured to
acquire from the terminal device the channel state report at the antenna ports selected by the terminal device from reference signal configuration information relating to the antenna ports.

11. The wireless communication device according to claim 9, wherein
the processing circuitry is further configured to select part of the antenna ports for each terminal device and notifies the terminal device of reference configuration information relating to the selected antenna port.

12. The wireless communication device according to claim 11,
wherein the reference signal configuration information relating to the selected antenna port includes configuration information of all the antenna port of the beamformed reference signal and information of the antenna ports selected by the processing circuitry.

13. The wireless communication device according to claim 11,
wherein the reference signal configuration information relating to the selected antenna ports is reference signal configuration information relating to a plurality of the selected antenna ports.

14. The wireless communication device according to claim 11,
wherein the reference signal configuration information relating to the selected antenna ports is process information including reference signal configuration information relating to a plurality of the selected antenna ports.

15. The wireless communication device according to claim 9, wherein
the processing circuitry is further configured to
notify the terminal device of reference signal configuration information relating to the selected antenna ports using an RRC message.

16. The wireless communication device according to claim 9, wherein
processing circuitry is further configured to
make a notification that a mode is a reporting mode of a beamformed reference signal through RRC signaling.

17. A wireless communication device including:
processing circuitry configured to
determine when a terminal device is in an Radio Resource Control (RRC) connected state;
while the terminal device is in the RRC connected state, transmit a Channel State Information (CSI) reporting mode notification indicating UE-selected-beamform-Channel State information Reference Signal (CSI-RS) to the terminal device;
transmit CSI process information and CSI-RS configuration information associated with antenna ports of beamformed CSI-RS;
notify the terminal device, in the RRC connected state, of configuration information of a reference signal beamformed by the wireless communication device with a plurality of beams and configuration information of a reference signal to be beamformed by an adjacent cell with a plurality of beams.

18. The wireless communication device according to claim 17, wherein the processing circuitry is further configured to
notify the terminal device of configuration information of a reference signal beamformed by the wireless communication device in non-zero power reference signal configuration information and notifies the terminal device of configuration information of the reference signal to be beamformed by the adjacent cell in non-zero power reference signal configuration information or interference measurement configuration information.

19. The wireless communication device according to claim 17, wherein the processing circuitry is further configured to
acquire a measurement result relating to the reference signal to be beamformed by the adjacent cell from the terminal device and performs handover processing on the terminal device.

20. The wireless communication device according to claim 17, wherein the processing circuitry is further configured to
acquire a measurement result relating to the reference signal to be beamformed by the adjacent cell from the terminal device and performs processing of adjusting scheduling with the adjacent cell.

* * * * *